United States Patent [19]

Sakkab

[11] 4,255,273
[45] Mar. 10, 1981

[54] FABRIC BLEACHING AND STAIN REMOVAL COMPOSITIONS

[75] Inventor: Nabil Y. Sakkab, Maineville, Ohio

[73] Assignee: The Procter & Gamble Company, Cincinnati, Ohio

[21] Appl. No.: 2,415

[22] Filed: Jan. 10, 1979

[30] Foreign Application Priority Data

Jan. 11, 1978 [PH] Philippines ................. 20642

[51] Int. Cl.$^3$ ................................. C11D 7/54
[52] U.S. Cl. ................................. 252/102; 252/95; 252/99; 8/101; 8/103
[58] Field of Search ........ 252/95, 99, 102; 8/101, 8/103, 1 XA

[56] References Cited

U.S. PATENT DOCUMENTS

| | | |
|---|---|---|
| 2,670,265 | 2/1954 | Heyna . |
| 2,706,199 | 4/1955 | Bretano . |
| 2,951,797 | 9/1960 | Sharp . |
| 2,951,798 | 9/1960 | Sharp . |
| 2,951,799 | 9/1960 | Sharp . |
| 2,951,800 | 9/1960 | Sharp . |
| 3,927,967 | 12/1975 | Speakman ............... 252/95 X |
| 4,033,718 | 7/1977 | Holcombe et al. ........ 252/95 X |
| 4,077,768 | 3/1978 | Johnson et al. .............. 252/95 |
| 4,094,806 | 6/1978 | Wiers ........................... 252/95 |

FOREIGN PATENT DOCUMENTS

| | | |
|---|---|---|
| 1266094 | 5/1961 | France . |
| 7803093 | 9/1978 | Netherlands . |
| 471418 | 8/1937 | United Kingdom . |
| 613781 | 12/1948 | United Kingdom . |
| 876691 | 9/1961 | United Kingdom . |

OTHER PUBLICATIONS

Lubs–"The Chemistry of Synthetic Dyes & Pigments" Kriegar Pub. Co., 1972, pp. 577-626.
Moser and Thomas "Phthalocyamine Compounds" Reinhold Pub., 1963, pp. 308-327.
Color Index pp. 4617-4622.
Dent–Journal of the Chemical Soc. 1938, pp. 1-6.

*Primary Examiner*—Mayer Weinblatt
*Attorney, Agent, or Firm*—William H. Gould; Thomas H. O'Flaherty; Richard C. Witte

[57] ABSTRACT

Improved fabric bleaching and stain removal are achieved by use of a composition comprising a photoactivator and a cationic substance. The photoactivator is a porphine or a mono-, di-, tri-, or tetra-aza porphine, solubilized with anionic, nonionic and/or cationic substitutent groups, and metal free or metallated with Zn(II), Ca(II), Cd(II), Mg(II), Sc(III), Al(III) or Sn(IV). The cationic substance is preferably one that, in a laundry bath, itself performs a desired function such as acting as fabric softener, electrostatic control agent, surfactant, or germicide.

45 Claims, 1 Drawing Figure

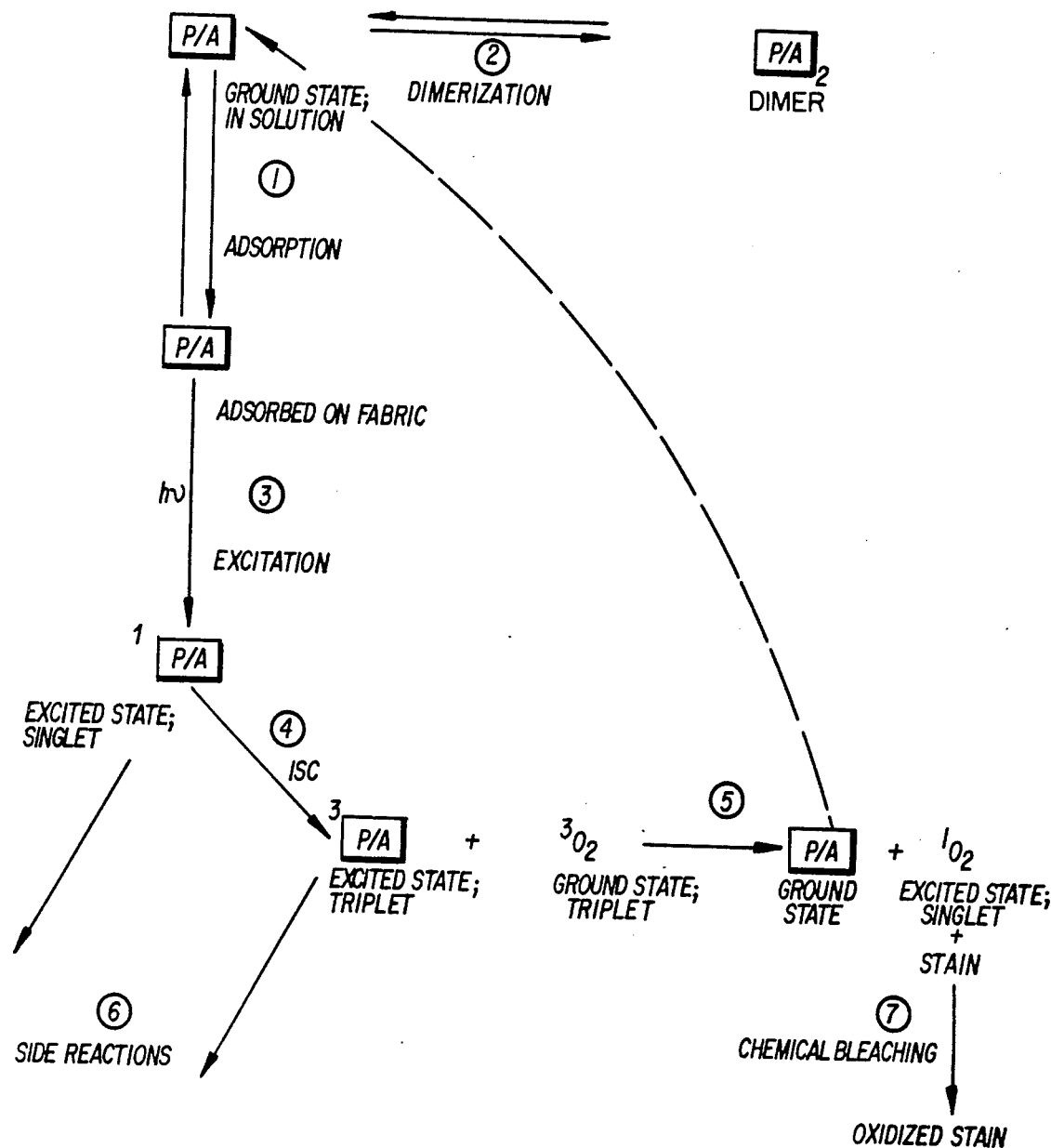

FABRIC BLEACHING AND STAIN REMOVAL COMPOSITIONS

BACKGROUND OF THE INVENTION

This invention relates to household laundry processes having improved effectiveness for fabric bleaching and for simultaneous removal of stains and fugitive dyes.

U.S. Pat. No. 3,927,967 granted to Speakman on Dec. 23, 1975 related to a household washing and bleaching process for cotton fabrics utilizing photoactivating compounds, principally sulfonated zinc phthalocyanine, in the presence of visible light and atmospheric oxygen. Japanese Patent application OPI 50-113,479 assigned to the Proctor & Gamble Company, laid open to the public on Sept. 5, 1975, invented by Holcombe and Schultz, teaches the use of specific mixtures of sulfonated zinc phthalocyanine species, principally tri- and tetra-sulfonates, as preferred bleach photoactivators. In the foregoing references the detergent compositions utilizing sulfonated zinc phthalocyanine contained organic surfactant, anionic or nonionic and alkaline builder salt.

Belgian Pat. No. 840,348 invented by Wiers, granted on Oct. 4, 1976 discloses the use of zinc phthalocyanine tri- and tetra-sulfonates as bleach photoactivators in unbuilt liquid detergent compositions containing nonionic, anionic, zwitterionic, or ampholytic surfactants.

British Pat. No. 1,372,036 invented by Speakman and available to the public on Oct. 30, 1974 describes a washing machine provided with a source of visible light which irradiates wash liquor containing phthalocyanine photoactivator and fabrics.

U.S. Pat. Nos. 2,951,797; 2,951,798; 2,951,799 and 2,951,800, assigned to Monsanto Chemical Company and issued on Sept. 6, 1960 describe certain porphines as catalysts for the photo-oxidation of olefins.

References to carboxylated porphines have appeared in U.S. Pat. No. 2,706,199 issued Apr. 12, 1955, invented by Brentano et al, and C. R. Acad. Sci., Ser. C 1972, 275(11), 573-6 authored by Gaspard et al. See also Color Index No. 74320. References to aminosulfonyl porphines are West German OLS No. 2,057,194 laid open June 8, 1972, invented by Von der Eltz et al; British Pat. No. 613,781 accepted Dec. 2, 1948, invented by Mayhew; and British Pat. No. 876,691 published Sept. 6, 1961, issued to Geigy A.G. See also Color Index No. 74350. Other substituted porphines are disclosed in Austrian Pat. No. 267,711 issued Jan. 10, 1969, invented by Wimmer; French Pat. No. 1,226,094 published May 29, 1961, invented by Tartter et al; U.S. Pat. No. 2,670,265 issued Feb. 23, 1954, invented by Heyna et al; British Pat. No. 471,418 accepted Aug. 30, 1937, invented by Groves; and JCS 1938, 1-6 authored by Dent.

Two copending, commonly assigned patent applications filed in the name of the inventor of the instant invention disclose the use of many species of porphine photoactivators other than sulfonated phthalocyanines in combination with anionic, nonionic, semi-polar, ampholytic or zwitterionic surfactants. These are Philippine patent applications Nos. 20643 and 20644, both filed on Jan. 11, 1978. Both of these applications are hereby incorporated herein by reference.

The two applications referred to supra disclose new compositions that provide improved fabric whiteness by three different means: stain removal; oxygen bleaching of overall discoloration; and removal of fugitive dyes.

It has now been found that porphine photoactivators are especially useful in laundry baths in combination with cationic substances. These cationic substances are known to the laundry arts and, depending on the nature of their chemical structures, are useful in one or more of the following ways: as softeners or as electrostatic control agents for fabrics, as surfactants, or as germicidal or sanitation agents.

It is well known that cotton surfaces are negatively charged; and hence positively charged, i.e. cationic substances have a strong affinity for cotton fabrics and a strong tendency to adsorb or deposit thereon. In so doing they tend to bring down or co-adsorb other substances present in the laundry bath, such as the photoactivators of this invention. Greater deposition of photoactivator means greater effectiveness of a given amount of photoactivator which represents an economic advantage to both producer and consumer and more efficient utilization of natural resources, and which after use and waste disposal has a reduced impact upon the ecology of the environment.

The foregoing objects of this invention can be accomplished by any convenient laundry process which involves exposure of fabrics to a composition of this invention, and exposure to visible light and oxygen either simulaneously or thereafter. For example, photoactivator and cationic surfactant can be present together in the laundry pre-soak or alternatively in the laundry wash; or the photoactivator and a cationic fabric softener or antistatic agent can be present together in the laundry rinse; or the photoactivator and a cationic germicide can be present together in one of the foregoing washes or in a separate treatment bath. Exposure to light and oxygen can take place during the above recited processing step or can occur during a separate, subsequent, processing step such as drying out of doors, especially in direct sunlight as on a clothesline.

SUMMARY OF THE INVENTION

This invention relates to a bleach composition comprising a cationic substance and from 0.001% to 0.5% by weight of the composition of a water soluble photoactivator having the formula

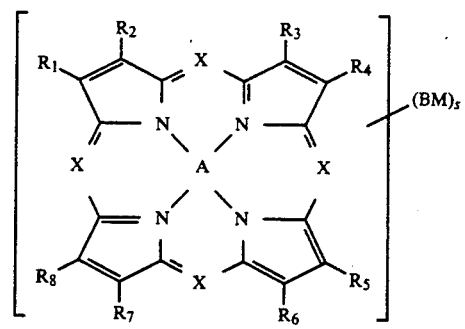

wherein each X is (=N—) or (=CY—), and the total number of (=N—) groups is 0, 1, 2, 3 or 4; wherein each Y, independently, is hydrogen or meso substituted alkyl, cycloalkyl, aralkyl, aryl, alkaryl or heteroaryl; wherein each R, independently, is hydrogen or substituted alkyl, cycloalkyl, aralkyl, aryl, alkaryl or heteroaryl, or wherein adjacent pairs of R's are joined together with ortho-arylene groups to form pyrrole substituted alicyclic or heterocyclic rings; wherein A is 2(H) atoms bonded to diagonally opposite nitrogen atoms, or Zn(II), Ca(II), Cd(II), Mg(II), Sc(III), Al(III) or Sn(IV); wherein B is an anionic, nonionic or cationic-solubilizing group substituted into Y or R; wherein M is a counterion to the solubilizing groups; and wherein s is the number of solubilizing groups.

Preferred cationic solubilizing groups are quaternary pyridinium and quaternary ammonium groups. Preferred anionic solubilizing groups are carboxylate, polyethoxy carboxylate, sulfate, polyethoxy sulfate, phosphate, polyethoxy phosphate, and sulfonate. Preferred nonionic solubilizing groups are polyethoxylates.

For cationic solubilizing groups M, the counterion, is an anion such as halide and s is from 1 to about 8. For polyethoxylate nonionic solubilizing groups $-(CH_2CH_2O)_mH$, M is zero, s is from 1 to about 8, and N =(sn)= the number of (condensed ethylene oxide molecules per porphine molecule) is from about 8 to about 50. For anionic groups M, the counterion, is cationic. For anionic groups attached to atoms no more than 5 atoms displaced from the porphine core, i.e. for "proximate" anionic groups as defined herein, s is from 3 to about 8. For anionic groups attached to atoms more than 5 atoms displaced from the porphine core, i.e. for "remote" anionic groups as defined herein, s is from 2 to about 8. For sulfonate groups their number is no greater than the number of aromatic and heterocyclic substituent groups.

The solubilizing groups on a given porphine photoactivator of this invention can be, but need not be, all alike; they can be different not only as to their precise structure but also as to their electrical charge. Thus cationic, anionic, and/or nonionic solubilizing groups can be present on an individual photoactivator molecule.

In the foregoing description, the term "alkyl" is defined to be not only a simple carbon chain but also a carbon chain interrupted by other chain-forming atoms, such as O, N or S. Non-limiting examples of such interruptions are those of the following groups:

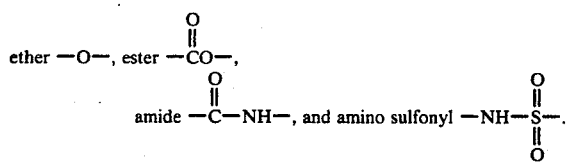

The cationic substance which is a part of the compositions of this invention is preferably one that, in a laundry bath, itself performs a desired function such as acting as fabric softener, electrostatic control agent, surfactant, or germicide.

DETAILED DESCRIPTION OF THE INVENTION

The essential components of the instant invention are two in number. One is a cationic substance. The cationic substance is preferably used at levels from about 0.5% to about 50% of the composition by weight, more preferably at levels from about 2% to about 30%. The weight ratio of cationic substance to the photoactivator, the other essential component of this invention, is preferably from about 1 1 to about 50,000 1 more preferably from about 20 1 to about 5,000 1.

The cationic substance is preferably one that, in a laundry bath, itself performs a desired function such as active as fabric softener, electrostatic control agent for fabrics, surfactant, or germicide. These functions are well known in the prior art, and one skilled in the art can select them in the usual manner.

Cationic substances having the capacity to condition fabrics as by softening and/or by controlling electrostatic effects on fabrics during laundering have been described in numerous patent disclosures, for example U.S. Pat. No. 3,756,950 issued to Gluck on Sept. 4, 1973; U.S. Pat. No. 3,904,533 issued to Neiditch on Sept. 9, 1975, and Okamoto et al, Japanese patent publication, No. 42-15596 published Aug. 28, 1967. The foregoing three publications are hereby incorporated herein by reference.

Preferred cationic fabric conditioners and antistatic agents include:

(a) quaternary ammonium salts having the following structure:

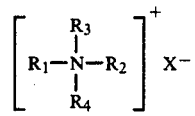

wherein $R_1$ is hydrogen or an aliphatic group having from 1 to 22 carbon atoms; $R_2$ is an aliphatic group having from 10 to 22 carbon atoms; $R_3$ and $R_4$ are each alkyl groups having from 1 to 3 carbon atoms; and X is an anion selected from the halogen, acetate, phosphate, nitrate and methylsulfate radicals.

Representative examples of quaternary ammonium softeners of the invention include tallow trimethyl ammonium chloride; ditallow dimethyl ammonium chloride; ditallow dimethyl ammonium methyl sulfate; dihexadecyl dimethyl ammonium chloride; di(hydrogenated tallow) dimethyl ammonium chloride; dioctadecyl dimethyl ammonium chloride; dieicosyl dimethyl ammonium chloride; didocosyl dimethyl ammonium chloride; di(hydrogenated tallow) dimethyl ammonium methyl sulfate; dihexadecyl diethyl ammonium chloride; dihexadecyl dimethyl ammonium acetate; ditallow dipropyl ammonium phosphate; ditallow dimethyl ammonium nitrate; and di(coconut-alkyl) dimethyl ammonium chloride.

An especially preferred quaternary ammonium fabric conditioning agent is ditallow dimethyl ammonium chloride that is commercially available from General Mills, Inc. under the tradename ALIQUAT-2HT and from Ashland Oil, Inc. as ADOGEN 448.

(b) quaternary imidazolinium salts having the following structure:

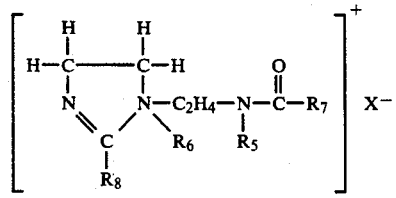

wherein $R_6$ is an alkyl group having from 1 to 4, preferably from 1 to 2 carbon atoms, $R_5$ is an alkyl group having from 1 to 4 carbon atoms or a hydrogen radical, $R_8$ is an alkyl group having from 1 to 22, preferably at least 15 carbon atoms or a hydrogen radical, $R_7$ is an alkyl group having from 8 to 22, preferably at least 15 carbon atoms, and X is an anion, preferably methylsulfate or chloride ions. Other suitable anions include those disclosed with reference to the cationic quaternary ammonium fabric antistat/softeners described hereinbefore. Particularly preferred are those imidazolinium compounds in which both $R_7$ and $R_8$ are alkyl groups having from 12 to 22 carbon atoms, e.g., 1-methyl-1-[(stearoylamide)ethyl]-2-heptadecyl-4,5-dihydroimidazolinium methylsulfate and 1-methyl-1-[(palmitoylamide)ethyl]-2-octadecyl-4,5-dihydroimidazolinium chloride.

An especially preferred quaternary imidazolinium fabric conditioning agent is 2-tallow-1-methyl-1-(tallow-amidoethyl) imidazoline methylsulfate having the structure:

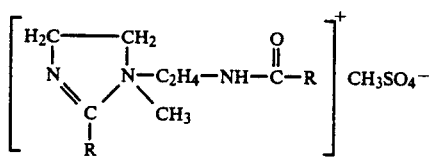

where R is an alkyl group derived from tallow. This material is commercially available from the Ashland Oil Co. under the trade name VARISOFT-445.

(c) Polyamido quaternized biurets having the following structure:

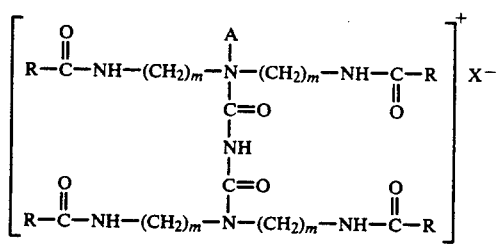

wherein R is an aliphatic hydrocarbyl group (saturated or unsaturated), a substituted aliphatic hydrocarbyl group, or an alkoxylated aliphatic hydrocarbyl group having from about 10 to 30 carbon atoms. Preferably, the number of carbon atoms is from about 12 to about 22 with R being an aliphatic hydrocarbyl group. Most preferably, R is derived from fatty acids, particularly from tallow fatty acid, which acid has predominately 16 to 18 carbon atoms.

A is a vicinal dihydroxy alkyl group containing at least 3 carbon atoms, preferably from 3 to about 8 carbon atoms; especially preferred is the 2,3-dihydroxy propyl group. Values of m range from 1 to about 8, preferably 2 or 3. X is an anion selected from the halogen, acetate, phosphate, nitrate and methylsulfate radicals.

Materials fitting the above-given formula where A is 2,3-dihydroxy propyl, R is an alkyl group derived from tallow, m is 2, and X is Cl, and containing minor amounts of starting materials and other reaction products, are sold under the name TAFLON-320A by Daiichi Kogyo Seiyaku Co., Ltd. of Japan. The manufacture of such materials is described in Okamoto's Japanese Patent Publication No. 42-15596 referred to hereinbefore.

(d) alkyl ($C_{12}$ to $C_{22}$)-pyridinium chlorides,
(e) alkyl ($C_{12}$ to $C_{22}$)-alkyl ($C_1$ to $C_3$)-morpholinium chlorides, and
(f) quaternary derivatives of amino acids and amino esters.

As disclosed in U.S. Patent applications U.S. Ser. No. 811,221 invented by Cockrell and U.S. Ser. No. 811,220 invented by Murphy, both filed on June 29, 1977 and both hereby incorporated herein by reference, under appropriate circumstances cationic surfactants are highly effective soil removal agents. As described in the two disclosures cited above, cationic surfactants can be advantageously used in combination with nonionic surfactants: this fact is however not material to the practice of the instant invention. The enhancement of photoactivator deposition takes place in the presence of cationic surfactant and is essentially independent of the presence or absence of nonionic surfactants: for purposes of this invention the latter can therefore be considered merely an optional component.

The cationic surfactants of Cockrell and Murphy applicable to the instant invention have the formula $$R^1{}_m R^2{}_x Y_L Z$$

wherein each $R^1$ is an organic group containing a straight or branched alkyl or alkenyl group optionally subsituted with up to 3 phenyl groups and optionally interrupted by up to 4 structures selected from the group consisting of

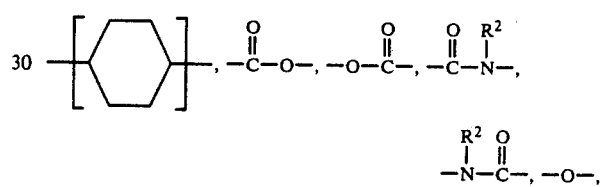

and mixtures thereof, and which contains from about 8 to 22 carbon atoms, and which may additionally contain up to 20 ethoxy groups, m is a number from one to three, no more than one $R^1$ in a molecule can have more than 12 carbon atoms when m is 3, each $R^2$ is an alkyl or hydroxyalkyl group containing from 1 to 4 carbon atoms or a benzyl group with no more than one $R^2$ in a molecule being benzyl, x is a number from 0 to 3, the remainder of any carbon, nitrogen, sulfur or phosphorus atom positions being filled by hydrogens, Y is selected from the group consisting of

   (1)

   (2)

   (3)

   (4)

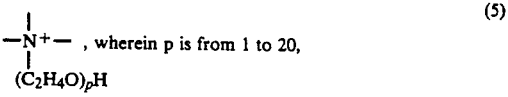   (5)

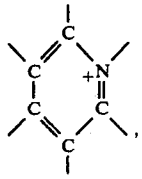

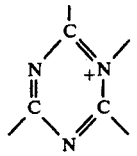, and (8) mixtures thereof,

L is a number from 1 to 10, Z is an anion in a number to give electrical neutrality.

In cationic surfactants preferred in the practice of the instant invention, Z is a halide, methylsulfate, toluene sulfonate, hydroxide or nitrate ion, particularly preferred being chloride, bromide or iodide anions. In certain preferred cationic surfactants, L is equal to 1 and Y is as defined in paragraph (1), (2) or (5) supra; in other preferred cationic surfactants more than one cationic charge center is present and L is greater than 1, as in the substance

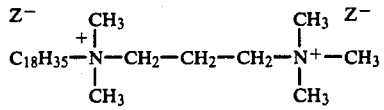

In preferred cationic materials, described above, where m is equal to 1, it is preferred that x is equal to 3, and $R^2$ is a methyl group. Preferred compositions of this monolong chain type include those in which $R^1$ is a $C_{10}$ to $C_{20}$ alkyl group. Particularly preferred components of this class include $C_{16}$ (palmityl) trimethyl ammonium halide and $C_{12}$ (coconut alkyl) trimethyl ammonium halide.

Where m is equal to 2 it is preferred that x is equal to 2, and that $R^2$ is a methyl group. In this instance it is also preferred that $R^1$ is a $C_{10}$ to $C_{20}$ alkyl group. Particularly preferred cationic materials of this class include distearyl ($C_{18}$) dimethyl ammonium halide and ditallow alkyl ($C_{18}$) dimethyl ammonium halide materials.

Where m is equal to 3, only one of the $R^1$ chains can be greater than 12 carbon atoms in length. The reason for this chain length restriction is the relative insolubility in water of these tri-long chain materials. Where tri-long chain materials are used, it is preferred that x is equal to 1 and that $R^2$ is a methyl group. In these compositions it is preferred that $R^1$ is a $C_8$ to $C_{11}$ alkyl group. Particularly preferred tri-long chain cationic materials include trioctyl ($C_8$) methyl ammonium halide and tridecyl ($C_{10}$) methyl ammonium halide.

Another particularly preferred type of cationic surfactant useful in the compositions of the present invention is of the imidazolinium variety. A particularly preferred surfactant of this type is one having the structural formula

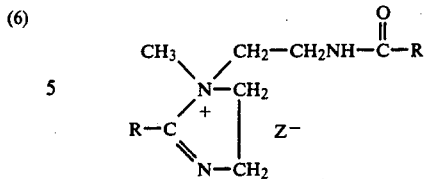

wherein R is $C_{10}$ to $C_{20}$ alkyl, particularly $C_{14}$ to $C_{20}$ alkyl.

Another type of preferred cationic surfactant for use in the compositions of the present invention are the alkoxylated alkyl quaternaries. Examples of such compounds are given below:

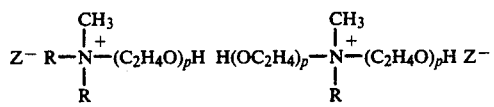

wherein p is from 1 to 20 and each R is a $C_{10}$ to $C_{20}$ alkyl group.

A particularly preferred type of cationic component, which is described in U.S. Patent Application Ser. No. 811,218, Letton, filed June 29, 1977, and incorporated herein by reference, has the formula:

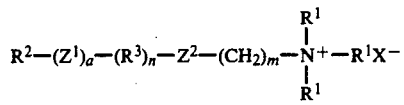

wherein $R^1$ is $C_1$ to $C_4$ alkyl or hydroxyalkyl; $R^2$ is $C_5$ to $C_{30}$ straight or branched chain alkyl or alkenyl, alkyl phenyl, or

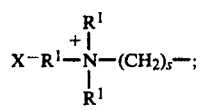

$R^3$ is $C_1$ to $C_{20}$ alkyl or alkenyl; a is 0 or 1; n is 0 or 1; m is from 1 to 5; $Z^1$ and $Z^2$ are each selected from the group consisting of

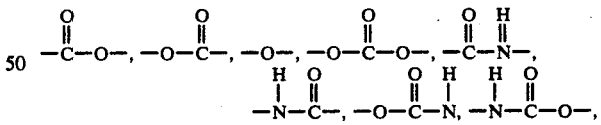

and wherein at least one of said groups is an ester, reverse ester, amide or reverse amide; and X is an anion which makes the compound at least water-dispersible, preferably selected from the group consisting of halide, methyl sulfate, and nitrate, preferably chloride, bromide or iodide.

Other preferred cationic surfactants of this type are the chlorine ester derivatives having the following formula:

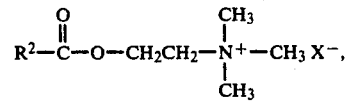

as well as thos compounds wherein the ester linkage in the above formula is replaced with a reverse ester, amide or reverse amide linkage.

Particularly preferred examples of this type of cationic surfactant include stearoyl choline ester quaternary ammonium halides ($R^2=C_{17}$ alkyl), palmitoyl choline ester quaternary ammonium halides ($R^2=C_{15}$ alkyl), myristoyl choline ester quaternary ammonium halides ($R^2=C_{13}$ alkyl), lauroyl choline ester ammonium halides ($R^2=C_{11}$ alkyl), and tallowyl choline ester quaternary ammonium halides ($R^2=C_{15}-C_{17}$ alkyl).

Additional preferred cationic components of the choline ester variety are given by the structural formulas below, wherein p may be from 0 to 20.

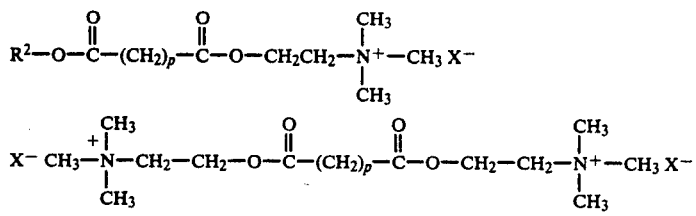

The preferred choline-derivative cationic substances, discussed above, may be prepared by the direct esterification of a fatty acid of the desired chain length with dimethylaminoethanol, in the presence of an acid catalyst. The reaction product is then quaternized with a methyl halide, forming the desired cationic material. The choline-derived cationic materials may also be prepared by the direct esterification of a long chain fatty acid of the desired chain length together with 2-haloethanol, in the presence of an acid catalyst material. The reaction product is then used to quaternize trimethylamine, forming the desired cationic component.

Another type of novel, particularly preferred cationic material, described in U.S. Patent Application Ser. No. 811,219, Letton, filed June 29, 1977, and incorporated herein by reference, has the formula:

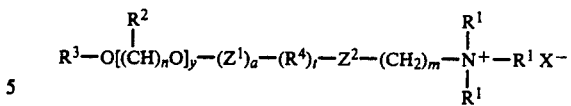

In the above formula, each $R^1$ is a $C_1$ to $C_4$ alkyl or hydroxyalkyl group, preferably a methyl group. Each $R^2$ is either hydrogen or $C_1$ to $C_3$ alkyl, preferably hydrogen. $R^3$ is a $C_4$ to $C_{30}$ straight or branched chain alkyl, alkenylene, or alkyl benzyl group, preferably a $C_8$ to $C_{18}$ alkyl group, most preferably a $C_{12}$ alkyl group. $R^4$ is a $C_1$ to $C_{10}$ alkylene or alkenylene group. n is from 2 to 4, preferably 2; y is from 1 to 20, preferably about 1 to 10, most preferably about 7; a may be 0 to 1; t may be 0 to 1; and m is from 1 to 5, preferably 2. $Z^1$ and $Z^2$ are each selected from the group consisting of

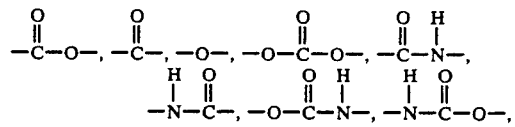

and wherein at least one of said groups is selected from the group consisting of ester, reverse ester, amide and reverse amide. X is an anion which will make the compound at least water-dispersible, and is selected from the group consisting of halides, methyl sulfate, and nitrate, particularly chloride, bromide and iodide. Mixtures of the above structures can also be used.

Preferred embodiments of this type of cationic component are the choline esters ($R^1$ is a methyl group and $Z^2$ is an ester or reverse ester group), particularly examples of which are given below, in which t is 0 or 1 and y is from 1 to 20.

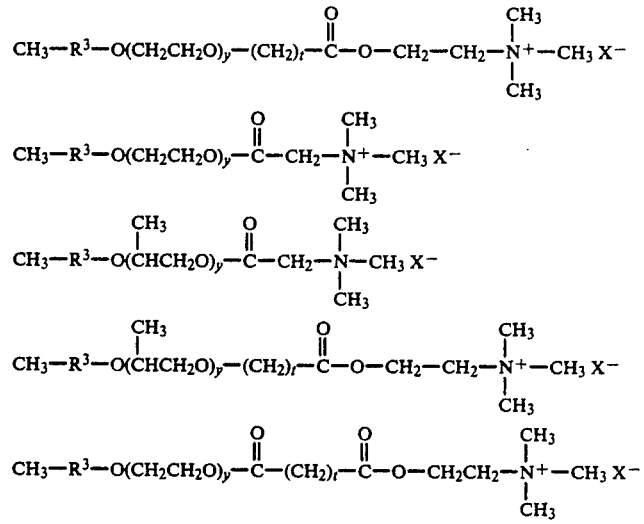

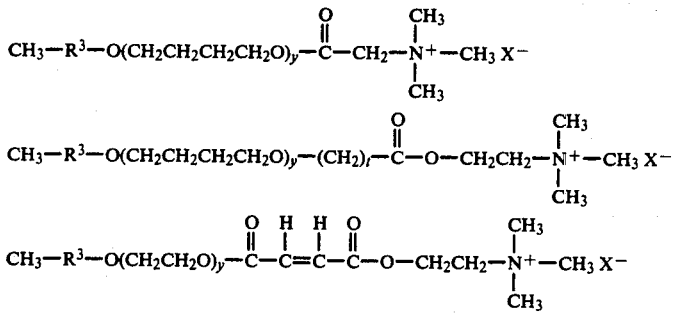

The preferred choline derivatives, described above, may be prepared by the reaction of a long chain alkyl polyalkoxy (preferably polyethoxy) carboxylate, having an alkyl chain of desired length, with oxalyl chloride, to form the corresponding acid chloride. The acid chloride is then reacted with dimethylaminoethanol to form the appropriate amine ester, which is then quaternized with a methyl halide to form the desired choline ester compound. Another way of preparing these compounds is by the direct esterification of the appropriate long chain ethoxylated carboxylic acid together with 2-haloethanol or dimethyl aminoethanol, in the presence of heat and an acid catalyst. The reaction product formed is then quaternized with methylhalide or used to quaternize trimethylamine to form the desired choline ester compound.

Cationic substances are also well known for their biological properties for control of microorganisms such as bacteria, fungi, algoe, spores, viruses, protozoa, and the like. Accordingly the prior art has taught the use of compositions containing cationic substances as germicides, bactericides, bacteristats, antiseptics, fungicides, etc. Typical disclosures of this kind are U.S. Pat. No. 2,295,504 granted to Shelton on Sept. 8, 1942; U.S. Pat. No. 2,479,850 granted to Marks on Aug. 23, 1949; U.S. Pat. No. 2,666,010 granted to Stayner on Jan. 12, 1954. The term antiseptic/germicide will be used hereinafter to broadly refer to all of the biological functions mentioned above.

Preferred cationic substances for the control of microorganisms are in categories:

(a) quaternary ammonium salts having the following structure

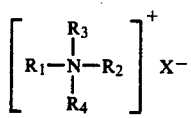

where $R_1$ has from about 9 to about 26 carbon atoms and is a hydrophobic group which is alkyl, aryl, alkaryl, aralkyl or alkyl heterocyclic; saturated or unsaturated; the alkyl chain of which is straight or branched; unsubstituted or substituted with halogen, hydroxy, amino, ester, or ether groups; where $R_2$, $R_3$ and $R_4$ each have from 1 to about 9 carbon atoms, and are the same or different, and have combined a total of from 3 to about 15 carbon atoms in groups which are alkyl, aryl, alkaryl, aralkyl or heterocyclic; saturated or unsaturated; the alkyl chains of which are straight or branched; unsubstituted or substituted with halogen, hydroxy, nitro, amino, sulfonamide, ester or ether groups; and where X is an anionic solubilizing group.

Especially preferred cationic substances in this category are those where $R_1$ has from about 12 to about 20 carbon atoms and is straight chained; where $R_2$ and $R_3$ are, independently, methly or ethyl; where $R_4$ is methyl, ethyl, benzyl or chlorobenzyl; and where X is inorganic such as halide, nitrate, sulfate, hydroxide, methyl sulfate, toluene sulfonate, and carbonate, phosphate or organic such as acetate, propionate, benzoate, tartrate, citrate, and salicylate.

By way of exemplification and not of limitation, among the cationic substances in this category are N-myristyl-N-trimethyl ammonium chloride, N-cetyl-N-diethyl ammonium bromide, N-oleyl-N-hexyl-N-dimethyl ammonium iodide, N-hydroxy stearyl-N-diethyl-N--methyl ammonium sulfate, N-decylbenzyl-N-dimethyl ammonium propionate, N-benzyl tetradecyl-N-diethyl ammonium salicylate, N-dodecyl furyl-N-dimethyl ammonium methyl sulfate, N-methoxy palmityl-N-thioazyl-N-dimethyl ammonium nitrate, N-lauryl-N-dimethyl-N-benzyl ammonium hydroxide, N-behenyl-N-diethyl-N-chlorobenzyl ammonium phosphate, N-para-tertiaryoctylphenoxyethoxyethyl-N-dimethyl-N-benzyl ammonium chloride, N-cetylaminophenyl-N-trimethyl ammonium methosulfate, and N-cetyl-dimethyl-nitrobenzyl ammonium chloride.

(b) Quaternary salts having the structure

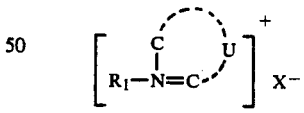

where $R_1$ and X are the same as defined immediately hereinbefore in paragraph (a) and U is an unsaturated heterocyclic group, unsubstituted or substituted with a short chain alkyl group.

Especially preferred cationic substances in this category are those where $R_1$ has from about 10 to about 20 carbon atoms and is straight chained and where the heterocyclic group is pyridine, picoline, quinoline, quinaldine, thioazole, pyrrole, imidazole, pyrazole, oxazone, pyrazine, pyridazine, or pyrimidine.

By way of exemplification and not of limitation, among the cationic substances in this category are N-octyl picolinium chloride, N-tetracosyl imidazolinium bromide, and N-palmityl pyridinium benzoate;

(c) Quaternary salts having the structure

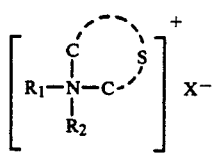

where R, $R_2$ and X are the same as defined hereinbefore in paragraph (a); and S is a saturated heterocyclic group, unsubstituted or substituted with a short chain alkyl group.

Especially preferred cationic substances in this category are those where $R_1$ has from about 10 to about 20 carbon atoms and is straight chained and where the heterocylclic group is piperidine, piperazine, pyrrolidine, indoline, imidazolidine, pyrazolidine, or morpholine.

By way of exemplification and not of limitation, among the cationic substances in this category are decyl methyl piperidinium chloride, stearyl hexyl indolinium acetate, and N-dodecyl-N-methyl morpholinium methyl sulfate.

It is readily apparent that the foregoing recitation of cationic substances having the function of fabric softener/antistatic agent; surfactant; and antiseptic/germicide; respectively, are not mutually exclusive. Certain cationic substances have the capability of performing two or even three of these functions.

The other essential component of the instant invention is a photoactivator as described hereinbelow. This component can also be described as a photochemical activator, or as a photosensitizer: these terms are synonymous. Before describing the photoactivator in detail, a discussion of chemical nomenclature will be appropriate. The structure of the compound porphine is:

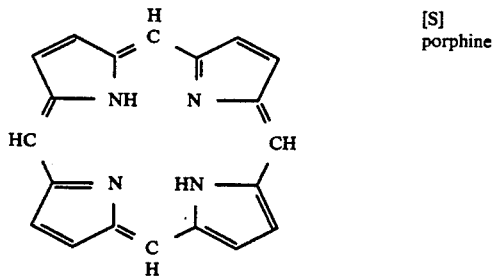

[S] porphine

Porphine has a large closed ring designated as a macrocyclic structure, and more specifically as a quadridentate macrocyclic molecule. Porphine can be described as tetramethine tetrapyrrole, and has also been designated as porphin or porphyrin. This structure is sometimes referred to herein as the porphine 'core', because the photoactivators of this invention are species of substituted porphines.

One form of substitution involves substituting 1, 2, 3, or 4 aza groups (=N—) for the methine group (=CB—) in porphine. As an example of conventional nomenclature, a compound having 3 aza groups and one methine group is referred to as triaza porphine.

Another form of substitution involves substituting for one or more of the hydrogen atoms attached to the carbon atoms in the pyrrole rings of porphine. This can be substitution by an aliphatic or aromatic group, or can be orthofused polycyclic substitution as for example to form benzene or naphthalene ring structures. The compound having the common name 'phthalocyanine' contains 4 ortho-fused benzene rings, each substituted on a pyrrole ring of the prophine core; and also contains 4 aza groups substituted for the methine groups of the porphine core; it can therefore be designated tetrabenzo tetraaza porphine, and has the structure which follows. The numbers designate the positions of pyrrole substitution according to conventional nomenclature.

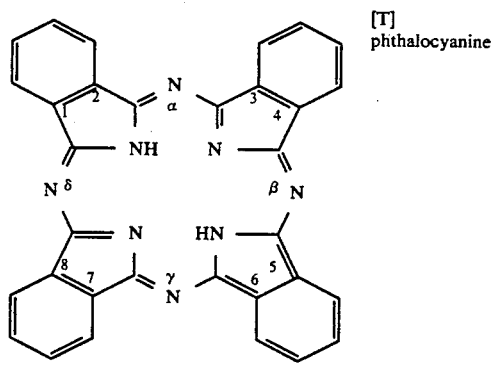

[T] phthalocyanine

Another form of substitution involves substituting for the hydrogen of the methine groups; this is conventionally referred to as meso substitution, and the positions of substitution are conventionally designated by Greek letters as illustrated on the phthalocyanine structure above.

Still another form of substitution is metallation by a heavy metal atom in a chelation structure: replacement of the two hydrogen atoms attached to two diagonally opposite inner nitrogen atoms of the four pyrrole groups by a heavy metal atom bonded to all four inner nitrogen atoms.

Still another form of sustitution is substitution of a solubilizing sulfonate group into the photoactivator molecule.

The various forms of substitution described above can be illustrated by the compound 3-phenyl-2,7-disulfophenyl-α, γ-diaza-δ-benzofuryl-β-sulfobenzofuryl porphine zinc, trisodium salt, which is within the scope of this invention:

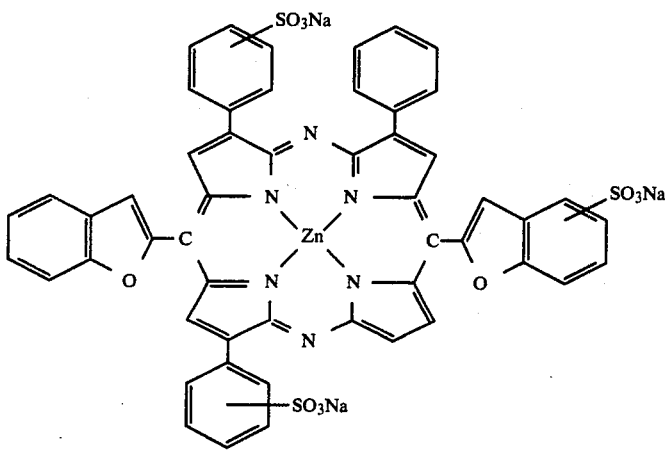

[U]

With the foregoing explanation as prelude, it is now possible to describe in detail the photoactivators of this invention. Referring to the structure shown hereinbefore in the SUMMARY OF THE INVENTION, effective photoactivators which are within the scope of this invention contain 0, 1, 2, 3 or 4 aza groups [and, according to the nomenclature defined above, contain 4, 3, 2, 1 or 0 methine groups, respectively].

The groups designated as R's in the structural formula above can, independently, be hydrogen or pyrrole substituted alkyl, cycloalkyl, aralkyl, aryl, alkaryl, or heteroaryl. Adjacent pairs of R's can also be joined together with ortho-arylene groups to form alicyclic or heterocyclic rings. Benzo substitution is especially preferred; i.e. $R_1$ and $R_2$, $R_3$ and $R_6$, and/or $R_7$ and $R_8$ are connected together pairwise by methylene groups to form fused benzene rings. Other preferred forms of pyrrole substitution are naphtho, pyrido, phenyl and naphthyl.

Substitutions can also be made for the hydrogen atoms of the methine groups of the photoactivators of this invention; thus each Y in the above structural formula can independently be hydrogen or meso substituted alkyl, cycloalkyl, aralkyl, aryl, alkaryl, or heteroaryl. It is preferred that Y is H, phenyl, naphthyl, thienyl, furyl, thioazyl, oxazyalyl, indolyl, benzothienyl, or pyridyl. No meso substitution at all or tetra phenyl meso substitution are especially preferred.

In the foregoing description, the term "alkyl" is defined to be not only a simple carbon chain but also a carbon chain interrupted by other chain-forming atoms, such as O, N or S. Non-limiting examples of such interruptions are those of the following groups: ether —O—, ester

reverse ester

carbonyl

amide

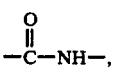

reverse amide

amino sulfonyl

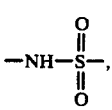

and sulfonamide

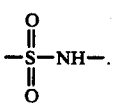

The photoactivating compounds of the instant invention can be unmetallated, A in the foregoing structural formula being comprised of two hydrogen atoms bonded to diagonally opposite inner nitrogen atoms of the pyrrole groups in the molecule [The characteristic structure of unmetallated compounds is illustrated by compounds [S] and [T] illustrated hereinbefore; these compounds are not, however, within the scope of this invention because they lack essential substituent groups as herein described.] Alternatively, the photoactivators of this invention can be metallated with zinc(II), cadmium(II), magnesium(II), scandium(III), aluminum(III), or tin(IV). Thus, altogether, A can be 2(H) atoms bonded to diagonally opposite N atoms, or Zn(II), Ca(II), Cd(II), Mg(II), Sc(III), Al(III) or Sn(IV). It is preferred that A be 2(H) or Zn(II).

Solubilizing groups can be located anywhere on the porphine molecule other than the porphine core as hereinbefore defined. Accordingly the solubilizing groups can be described as substituted into Y or R as hereinbefore defined.

Solubilizing groups can be anionics, nonionic, or cationic in nature. Preferred anionic solubilizing groups are carboxylate

sulfate

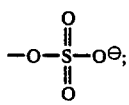

phosphate

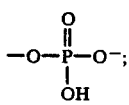

and sulfonate

Other preferred anionic solubilizing agents are ethoxylated derivatives of the foregoing, especially the polyethoxysulfate group - $(CH_2CH_2O)_n SO_3^\ominus$ and the polyethoxy carboxylate group - $(CH_2CH_2O)_n COO^\ominus$ where n is an integer from 1 to about 20.

For anionic solubilizing groups, M the counterion is any cation that confers water solubility to the porphine molecule. A monovalent cation is preferred, especially ammonium, ethanolammonium, or alkali metal. Sodium is most preferred. For reasons described hereinafter the number of anionic solubilizing groups operable in the compositions of this invention is a function of the location of such groups or the porphine molecule. A solubilizing group attached to a carbon atom of the photoactivator molecule displaced more than 5 atoms away from the porphine core is sometimes herein referred to as "remote", and is to be distinguished from an attachment to a carbon atom displaced no more than 5 atoms from the porphine core, which is sometimes referred to herein as "proximate". For proximate solubilizing groups, the number of such groups per molecule, s, is from 3 to about 8, preferably from 3 to about 6, most preferably 3 to 4. For remote solubilizing groups, s is from 2 to about 8, preferably from 2 to about 6, most preferably 2 to 4.

Preferred nonionic solubilizing groups are polyethoxylates -$(CH_2CH_2O)_n H$. Defining s as the number of solubilizing groups per molecule, the number of condensed ethylene oxide molecules per porphine molecule is $N=sn$. The water soluble nonionic photoactivators of this invention have a value of N between about 8 and about 50, preferably from about 12 to about 40, most preferably from about 16 to about 30. Within that limitation the separate values of s and n are not critical.

For nonionic solubilizing groups, there is no counterion and accordingly M is numerically equal to zero.

Preferred cationic solubilizing groups are quaternary compounds such as quaternary ammonium salts

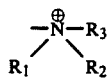

and quaternary pyridium salts

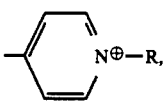

where all R's are alkyl or substituted alkyl groups.

For cationic solubilizing groups, M the counterion is any anion that confers water solubility to the porphine molecule. A monovalent anion is preferred, especially iodide, bromide, chloride or toluene sulfonate

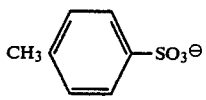

For reasons that are described hereinafter, the number of cationic solubilizing groups can be from 1 to about 8, preferably from about 2 to about 6, most preferably from 2 to 4.

Photoactivator usage in the compositions of this invention can be from about 0.001% to about 0.5% by weight of the composition. Preferable usage is from about 0.005% to about 0.1% by weight of the composition.

Although it is not wished to be bound by theory, it is believed that the nature of this invention can be more clearly understood by postulating the mechanism of bleaching using the instant photoactivators. Referring to FIG. 1, the photoactivator in the upper left hand corner is in aqueous solution and is in its ground state. Reaction (1), entitled 'adsorption', indicates that dissolved photoactivator is in part adsorbed in fabrics. Reaction (2) suggests that photoactivator can dimerize into a form which is not readily adsorbed and therefore is not available to enter into the desired bleaching reactions on the fabric surfaces.

Reaction (3) illustrates the photoactivator in the ground state can be excited by visible light, hv, and thereby raised to the excited singlet state. From the excited singlet state the photoactivator can undergo intersystem crossing or ISC, reaction (4), to the triplet state which is also excited but at a lower energy level than the singlet state. It is the excited triplet state that is desired because it is capable of interacting with the ground state of atmospheric oxygen molecules, which are also in the triplet state, forming thereby according to reaction (5) the excited singlet state of oxygen and also regenerating photoactivator at its original ground state. Both the singlet and the triplet excited states of the photoactivator can enter into reactions other than the desired reaction with oxygen. For example, the singlet state can fluoresce, while the triplet state can phosphoresce, undergo radiationless decay, undergo electron transfer to photoactivator molecules in the ground state which results in deactivation of the photoactivator, or react with other components of the solution. From the standpoint of the desired bleaching these are collectively designated as reaction (6), 'side reactions'.

The excited singlet oxygen, formed by reaction (5), is the oxidative species that is capable of reacting with stains as shown in reaction (7) to chemically bleach them to a colorless and usually water-soluble state, thereby accomplishing the purposes of this invention.

It will be instructive to consider the effect upon bleaching brought about by the individual species of photoactivators that are within the scope of this invention. This will be done in reference to the seven reactions appearing on FIG. 1 which have been described above.

The number of aza groups substituted for methine groups in the porphine core primarily affects (a) the lifetime of the triplet state, and (b) the side reactions. The lifetime of the triplet state of metalloporphines [Grayushko et al, Opt. Spektrosk 31, page 548 (1971)] is substantially greater than that of corresponding metallophthalocyanines [Vincett et al., J. Chem. Physics 55, No. 8 page 4134, October 1971]. It is believed that introduction of each successive aza group shortens the lifetime, and it is apparent that a longer lifetime is desired to provide greater opportunity for reaction with oxygen molecules to form the active bleaching species. Hence from this point of view methine groups are preferred to aza groups. However a countervailing factor is that side reactions tend to be greatest when 4 methine groups are present, and decrease progressively as successive aza groups are introduced. The foregoing effects work in opposite directions, and accordingly it is not possible to predict the relative effectiveness of the different species based on theoretical considerations alone. As described hereinafter, porphines having 0, 1, 2, 3 and 4 aza groups are effective photoactivators, and the skilled artisan is free to select a photoactivator for reasons of cost, availability, and performance under specific conditions of interest to him.

This invention contemplates photoactivators that are metal free and also those that are metallated with certain metals. In general, the introduction of a metal atom into the photoactivator molecule causes a perturbation of the system which reduces the lifetime of the excited triplet states and increases side reactions, both of which are unwanted effects in relation to the instant invention. From this point of view unmetalled compounds are preferred photoactivators.

A countervailing factor is that manufacture of certain photoactivators is more readily accomplished when a metal is present to stabilize the molecule. This factor applies both to synthesis of a photoactivator compound by sulfonation of its unsulfonated precursor molecule, and also to synthesis of the precursor molecule itself.

Perturbation is especially great for metals which have unpaired electrons; hence paramagnetic metals are not satisfactory. Perturbation is also great for metals that are large in size. Data appearing in Vincett et al, op. cit., suggest that the lifetime of the triplet state of zinc phthalocyanine is hundreds of times longer than that of copper phthalocyanine (Cu is paramagentic) and approaches a hundred times longer than that of platinum phthalocyanine (Pt is large).

Metallated photoactivators that are acceptable in the practice of this invention are those containing relatively small, diamagnetic metals: zinc(II), cadmium(II), magnesium(II), scandium(III), aluminum(III), and tin(IV). Because the first five of these named metals have essentially constant valence, specific identification of their valence states will sometimes be omitted herein. Zinc is preferred because the triplet state of zinc metallated photoactivators is perturbed to a relatively low extent and hence its lifetime is relatively long.

All of the reactions described on FIG. 1 are predicated on solubility of the photoactivator in the laundry bath. Solubilization is accomplished by introducing solubilizing groups into the molecule. It is entirely practical to make compounds having respectively, one, two, three, four and even indeed up to as many as twelve solubilizing groups per molecule, and all are to some extent photoactivators. However as each successive solubilizing group is added, changes occur monotonically in a number of properties which affect usefulness, as explained below.

An anionic macrocyclic photoactivator molecule in solution is present in dissociated ionic form having negative charges around its periphery. The Coulombic effect of these negative charges is minimized by the counter ions in solution. The peripheral negative charges do, however, tend to localize the electron density of the ring near the center of the molecule and to enhance its basicity which leads to increased dimerization of the molecules as brought about by van der Waal forces [reaction 2, FIG. 1]. This circumstance is increased by multiple solubilizing groups, and loss of symmetry, and hence the tendency to dimerize in solution follows the order mono $<$ di $<$ tetra $<$ tri $<$ penta . . . . Dimerization being an undesirable reaction, a relatively small number of anionic solubilizing groups are preferred from this point of view.

The porphine photoactivators of this invention are especially useful in laundry baths in conjunction with cationic substances. Inasmuch as cotton surfaces are negatively charged, cationic substances have a strong affinity for cotton fabrics and a strong tendency to adsorb or deposit thereon. In so doing they tend to bring down or co-adsorb other substances present in the laundry bath, such as the photoactivators of this invention.

The porphine photoactivators of this invention contain in their molecular structure certain chemical groups which solubilize the photoactivator in an aqueous laundry bath. As detailed hereinafter these groups can contain a formal electrical charge, either positive or negative, or can be electrically neutral overall; in which latter case they can contain partial charges of various degrees of strength. A photoactivator molecule can contain more than one solubilizing group, which can be all alike or can be different from one another in respect to electrical charge.

The co-adsorption phenomenon discussed alone in relation to cationic substances assumes increasing importance in relation to photoactivators having, to some extent, an anionic or negative charge, whether a negative partial charge; a negative formal charge in an electrically neutral or even cationic molecule as a whole; or a multiplicity of negative charges in an anionic photoactivator molecule. The latter is a particularly strong effect which has been discovered to apply to the most common photoactivating bleach of the prior art, viz. zinc phthalocyanine sulfonate. It will be remembered that the prior art, however, used this photoactivator in combination with anionic and not with cationic substances, and hence failed to discover the improved, indeed synergistic effectiveness demonstrated by the compositions of the instant invention.

Taking all the above into consideration it has been found that, for anionic photoactivators having proximate solubilizing groups, the negative factors of mono- and disulfonated photoactivator molecules are so important that these species are unsatisfactory, and hence photoactivators of this invention have three or more proximate solubilizing groups per molecule. Compounds having more than about eight proximate solubilizing groups per molecule are often difficult to make and have no particular advantage. Hence photoactivators of this invention having proximate solubilizing groups have from three to about eight such groups per molecule; compounds having three to six proximate solubilizing groups per molecule are preferred, and compounds having 3 or 4 proximate solubilizing groups per molecule are especially preferred as having an optimum balance of maximum bleaching effectiveness and minimum coloration.

The foregoing discussion relates to anionic photoactivators having proximate solubilizing groups. When the solubilizing groups are in remote locations, the tendency of the photoactivator molecule to aggregate is reduced because of both electrical and steric reasons, with the result that less dimerization occurs, less buildup on the fabric occurs, and the solubilizing effect of individual solubilizing groups is enhanced. Accordingly, a mininum of 2 remotely located anionic solubilizing groups per photoactivator molecule is satisfactory for the practice of this invention, with 2 to about 6 being preferred and 3 or 4 being especially preferred.

Nonionic solubilizing groups have a low tendency to aggregate because there is no elecatrical charge-density effect and there is a particularly large steric effect reducing orderly association between photoactivator molecules. Because solubilization of polyethoxylated photoactivator molecules occurs primarily because of numerous ether groups in the polyethoxylate chains, it is of little consequence whether there is a single very long chain or a number of shorter chains. Accordingly, the solubility requirement as hereinbefore expressed is in terms of the number of condensed ethylene oxide molecules per porphine molecule, which is from about 8 to about 50, preferably from about 12 to about 40, most preferably from about 16 to about 30.

Photoactivators having cationic solubilizing groups do not effectively aggregate at all because the electron density in the ring is reduced. Direct substantivity on cotton fabrics is great. Only on solubilizing group is enough to accomplish the purposes of this invention, although more are acceptable and indeed preferred. Accordingly the limiting numbers of solubilizing cationic groups are from 1 to about 8, preferably from about 2 to about 6, most preferably from 2 to 4.

As stated hereinabove, the macromolecular structure comprising the porphine core contributes the essential photoactivation properties of the compounds of this invention. It follows inexorably that large numbers of compounds having this macromolcular core, but with myriads of different substituent groups, are effective in the practice of this invention. One versed in the art will recognize the impractibility of reducing to writing all possibilities that can be envisioned by a skillful practioner. The embodiments which follow are therefore to be considered exemplary but not exhaustive. Photoactivators that are effective bleaching agents for fabrics and are within the scope of this invention are the following:

Tetrabenzo-$\alpha$, $\beta$, $\gamma$, $\delta$-tetrakis (4-N-ethyl) pyridyl porphine tetrachloride; tetrabenzo-$\alpha$, $\beta$, $\gamma$, $\delta$-tetrakis (N-trimethyl) aminoethyl porphine tetraiodide; tetrabenzo-$\alpha$, $\beta$, $\gamma$, $\delta$-tetrakis (4-carboxyphenyl) porphine cadmium, tetrasodium salt; tetrabenzo-$\alpha$, $\beta$, $\gamma$, $\delta$- tetrakis (4-sulfatophenyl) porphine zinc, tetrapotassium salt; tetrabenzo-$\alpha$, $\beta$, $\gamma$, $\delta$- tetrakis (4-sulfato polyethoxy phenyl) porphine, tetrasodium salt; tetrabenzo- $\alpha$, $\beta$, $\gamma$, $\delta$-tetrakis (4-carboxy polyethoxy phenyl) porphine calcium, tetraamonium salt; 0 tetrabenzo-$\alpha$, $\beta$, $\gamma$, $\delta$-tetrakis (4-phosphatophenyl) porphine, tetrapotassium salt; tetrabenzo-$\alpha$, $\beta$, $\gamma$, $\delta$-tetrakis (4-phosphatophenyl) porphone, tetrapotassium salt; tetrabenzo-$\alpha$, $\beta$, $\gamma$, $\delta$-tetrakis (4-phosphato polyethoxy phenyl) porphine zinc, tetra(monoethanolamine) salt; trans-dichloro, tetrabenzo-$\alpha$, $\beta$, $\gamma$, $\delta$- tetrakis (4-polyethoxy phenyl) porphine tin (IV).

Tetrakis (N-methyl) pyrido porphine zinc tetraiodide; tetrakis (N-trimethyl)- aminobenzo porphine, tetra (toluene sulfonate) salt; trans-dibromo, tetrakis (carboxybenzo) porphine tin(IV, tetra(diethanolamine) salt; tetrakis (sulfato benzo) porphine zinc, tetrasodium salt; chloro, tetrakis (sulfato polyethoxy benzo) porphine scandium, tetrammonium salt; tetrakis (carboxy polyethoxy benzo) porphine, tetrasodium salt; tetrakis (phosphato benzo) porphine zinc, tetralithium salt; tetrakis (phosphato polyethoxy benzo) porphine, tetra(triethanolamine) salt; tetrakis (polyethoxy benzo) porphine; tetrabenzo- $\alpha$, $\beta$, $\gamma$, $\delta$-tetrakis-(-4 carboxyphenyl) porphine zinc, tetrasodium salt.

Tetranaphtho-$\alpha$, $\beta$, $\gamma$, $\delta$-tetrakis-(4-phosphato polyethoxy phenyl) porphine, tetrasodium salt; tetrakis (N-methyl) pyrido-$\alpha$, $\beta$, $\gamma$, $\delta$-tetranaphthyl porphine tetrachloride; chloro, tetrakis (polyethoxy naptho)-$\alpha$, $\beta$, $\gamma$, $\delta$-tetra phenyl porphine aluminum, tetrakis (N-diethyl-N-propyl) -aminobenzo-$\alpha$, $\beta$, $\gamma$, $\delta$-tetrakis (4-N-methyl pyridyl porphine magnesium, octabromide, tetrakis (carboxynaphtho) -$\alpha$, $\beta$, $\gamma$, $\delta$-tetrakis (4-carboxy phenyl) porphine zinc, octa potassium salt; tetrakis (polyethoxy benzo)- $\alpha$, $\beta$, $\gamma$, $\delta$-tetrakis (polyethoxy phenyl) porphine; transdichloro, $\alpha$, $\beta$, $\gamma$, $\delta$-tetrakis (carboxy phenyl)- $\alpha$, $\beta$, $\gamma$, $\delta$-tetrakis (polyethoxy phenyl) porphine tin(IV), tetra ammonium salt; 1, 3, 5, 7-tetrakis (sulfato polyethoxy phenyl)-$\alpha$, $\beta$, $\gamma$, $\delta$-tetrakis (carboxy naphthyl) porphine cadmium, octa di(ethanolamine) salt; 1, 3, 5, 7-tetrakis (phosphato phenyl)-$\alpha$, $\beta$, $\gamma$, $\delta$-tetrakis (4-N-methyl) pyridyl porphine zinc, tetra sodium salt tetra chloride; 1, 3, 5, 7- tetrakis (N-trimethyl)aminobutyl $\alpha$, $\beta$, $\gamma$, $\delta$-tetrakis polyethoxy phenyl porphine, tetraiodide.

1, 3, 5, 7-tetrakis (4-carboxy phenyl)-$\alpha$, $\beta$, $\gamma$, $\delta$-tetrakis-(4-carboxy phenyl) porphine, octasodium salt; 1, 3, 4, 6-tetrakis (carboxyethyl)-$\alpha$, $\beta$, $\gamma$, $\delta$-tetrakis -(4-carboxy naphthyl) porphine, octasodium salt; 1, 2, 3, 4-tetrakis (phosphato phenyl)-$\alpha$, $\beta$, $\gamma$, $\delta$-tetra phenyl porphine zinc, tetra (monoethanolamine) salt; 2, 3, 6, 7-tetrakis (sulfatoethyl)-$\alpha$, $\beta$, $\gamma$, $\delta$-tetra anthracyl porphine, tetrammonium salt; dibenzo-$\alpha$, $\beta$, $\gamma$, $\delta$-tetrakis-(4-ethyl) pyridyl porphine cadmium tetraiodide; dinaphtho-$\alpha$, $\beta$, $\gamma$, $\delta$-tetrakis-(4-carboxyphenyl) porphine, tetrapotassium salt; di(N-triethyl)-aminobenzo-$\alpha$, $\beta$, $\gamma$, $\delta$-tetrakis-(N-triethyl aminomethyl porphine zinc hexabromide; transdibromo, di(sulfatobenzo) - $\alpha$, $\beta$, $\gamma$, $\delta$-tetrakis-(sulfatabenzo) porphine tin(IV), hexasodium salt; chloro, 3, 5, 7-tetrakis (sulfato phenyl)-$\alpha$, $\beta$, $\gamma$, $\delta$-di(sulfato phenyl) porphine scandium, hexaamonium salt; 1, 3, 5, 7-tetrakis (polyethoxy phenyl)-$\alpha$, $\beta$-di(polyethoxy phenyl) porphine magnesium.

Tetrakis-(carboxy benzo)-$\alpha$, $\beta$, $\gamma$, $\delta$-tri(4-carboxy phenyl) porphine, heptasodium salt; tetrakis (phosphato benzo)-α-mono(phosphato phenyl) porphine, pentapotassium salt; 1,5-di(polyethoxy phenyl)-α, β, γ, δ-tetrakis (polyethoxy phenyl) porphine; 1-mono (polycarboxy phenyl)-α, β, γ, δ-tetrakis (polycarboxy phenyl) porphine, pentasodium salt; 1, 3, 5,-tri(sulfato phenyl)-α, β, γ, δ,-tetrakis (sulfato phenyl) porphine zinc, heptasodium salt; 1,5-di(carboxy phenyl)-α, β-di(-carboxy phenyl) porphine, tetrasodium salt; 1,3-di(-phosphato phenyl)-α, β, γ,-tri (phosphato phenyl) porphine, pentasodium salt; mono(carboxybenzo) - α, β, γ-tri(4carboxy phenyl) porphine, tetrasodium salt; tetrakis-(carboxybenzo)-α, β, γ, δ-tetrakis (2-furyl) -porphine zinc, tetrasodium salt; tetrakis-(dicarboxybenzo)-α, β, γ-tri(4-pyridyl)-porphine, octasodium salt;

1, 2, 3, 4, 5, 6, 7, 8-octa-(4-N-ethyl pyridyl)-α, β-di(2-thioazyl) -porphine octaiodide; 1, 2, 3, 4, 5, 6, 7, 8-octa-(4-sulfato phenyl)-α-(2-oxazolyl)-porphine, octasodium salt; 1, 2, 3, 4, 5, 6, 7, 8-octa-(4-polyethoxy phenyl)-α, β-di(2-indolyl)-porphine; 1, 2, 5, 6-tetrakis-(4-carboxy polyethoxy phenyl)-α, β, γ, δ-tetrakis (methoxy phenyl)-porphine, tetrasodium salt; 1, 3, 5, 7-tetrakis-(4-carboxy phenyl)-α, β, γ, δ-tetrakis (2-benzo thienyl)-porphine, tetrasodium salt; tetrakis (N-methyl pyrido)-α, β, γ, δ- tetraaza porphine tetraiodide; 1, 3, 5, 7-tetrakis (N-trimethyl pyridyl)-α, β,γ, δ-tetraaza porphine zinc tetrachloride; tetrakis (N-methyl pyrido)-α- (N-methyl pyrido)-α, β, γ-triaza porphine cadmium pentaiodide; chloro, tetrakis (carboxybenzo)-α, β, - di(4-carboxy phenyl)-γ, δ-diaza porphine aluminum, hexasodium salt; trans-dichloro, di( polyethoxybenzo)-α, γ-di(polyethoxymethyl)-β, δ-diaza porphine tin (IV).

Di(sulfatobenzo)-α, β, γ- tri(sulfato phenyl)-δ-monoaza porphine calcium, penta-sodium salt; tetrakis (phosphato benzo)-α-mono naphthyl-β, γ, δ-triaza porphine tetrasodium salt; mono (N-trimethyl amino ethyl benzo)-α, β, γ, δ-tetraaza porphine monoiodide; tribenzo-α(polyethoxy phenyl)-β, γ, δ-triaza porphine; 1, 3-di (polyethoxy ethyl)- α, β, γ, δ-tetrakis (2-oxazolyl) porphine; di(N-methyl pyridyl benzo)-dibenzo -α, β, γ, δ-tetraaza porphine dibromide; tetrasulfobenzo-α, β, γ, δ-tetrakis (5-sulfophenyl-n-amyl) porphine zinc, octasodium salt; 1,5-di(6-sulfophenyl-n-hexyl)-α, β, γ, δ-tetrakis (sulfo-2-furyl) porphine, hexaammonium salt; α, β, γ, δ-tetrakis (dicarboxyethyl)-phenyl(aminosulfonyl phenyl) porphine, octapotassium salt.

Tri (sulfobenzo) monobenzo- α, β, γ, δ-tetraaza porphine zinc, trisodium salt; tetra (sulfobenzo)- α, β, γ, δ-tetraaza porphine, tetrapotassium salt; tri (sulfobenzo)-tetraaza porphine, triammonium salt; tetra (sulfonaphtho) tetraaza porphine, cadmium, tetra (mono-ethanolamine) salt; tetrasulfo dibenzo dinaphtho tetraaza porphine magnesium, tetra iodide.

α, β, γ, δ-tetrakis (sulfophenyl) porphine, tetra sodium salt; α, β, γ-tri (sulfophenyl)-δ(phenyl) porphine zinc, tri ammonium salt; α, β, γ, δ-tetrakis (2-thienyl, 5-sulfo) porphine zinc, tetra sodium salt; α, β, γ-tri (2-thienyl, 5-sulfo) δ(2-thienyl) porphine magnesium, tri potassium salt; α, β, γ, δ-tetrakis (2-furyl, 5-sulfo) porphine, tetra ammonium salt; α, β, γ-tri(2-furyl, (5-sulfo)-δ(2-furyl) porphine, tri ammonium salt; trans-dichloro, α, β, γ, δ-tetrakis (2-thiazolyl, 3-sulfo) porphine tin (IV), tetra sodium salt; chloro, α, β, γ, δ-tetrakis (2-thiazolyl, 4-sulfo) porphine scandium, tetra lithium salt; α, β, γ-tri (2-thiazolyl, 4-sulfo)-δ(2-thiazolyl) porphine zinc, tri ammonium salt; α, β, γ, δ-tetrakis (2-oxazolyl, 4-sulfo) porphine, tetra (mono ethanol amine) salt;

α, β, γ, δ-tetrakis (2-oxazolyl, 3-sulfo) porphine magnesium, tetra sodium salt; α, β, γ-tri (2-oxazolyl, 3-sulfo)-δ(2-oxazolyl) porphine cadmium, tri (tri ethanol amine) salt; α, β, γ, δ-tetrakis (4-pyridyl, mono sulfo) porphine zinc, tetra ammonium salt; α, β, γ-tri (4-pyridyl, mono sulfo)-δ(4-pyridyl) porphine, tri (di ethanol amine) salt; chloro, α, β, γ, δ-tetrakis (2-pyridyl, mono sulfo) porphine scandium, tetra potassium salt; trans-dichloro, α, β, γ-tri (2-pyridyl, mono-sulfo)-δ(2-pyridyl) porphine tine (IV), tri ammonium salt; α, β, γ, δ-tetrakis (2-indolyl, mono sulfo) porphine, tetra sodium salt; α, β, γ-tri (4-hydroxy, monosulfo phenyl)-δ(4-hydroxy phenyl) porphine, tri ammonium salt; 1,2,3,4,5,6,7,8-octamethyl-α, β, γ, δ-tetrakis (sulfophenyl) porphine, tetra sodium salt, 1,2,3,4,5,6,7,8-octaethyl-α, β, γ-tri (2-furyl, 5-sulfo)-δ(2-furyl) porphine zinc, tri sodium salt.

1,2,3,4,5,6,7,8-octaisopropyl-α, β, γ, δ-tetrakis (2-oxazolyl, 4-sulfo) porphine cadmium, tetra ammonium salt; 1,2,3,4,5,6,7,8-octa n-butyl-α, β, γ-tri (2-pyridyl, mono sulfo)-δ(2-pyridyl) porphine, tri sodium salt; 1,2,3,4,5,6,7,8-octa sulfo phenyl porphine, octa sodium salt; 1, 2, 3, 4, 5, 6, 7, 8-octa sulfo phenyl porphine, octa sodium salt; 1,2,3,4,5,6,7,8- octa sulfo phenyl porphine zinc, octa ammonium salt; 1,2,3,4,5,6,7,8-octa sulfo naphthyl porphine zinc, octa ammonium salt; 1,2,3,4,5,6,7,8-octa sulfo naphthyl porphine zinc, octa ammonium salt; tetra sulfo benzo porphine, tetra (tri ethanol amine) salt; tetra sulfo benzo porphine zinc, tetra sodium salt.

Trans-dibromo, tetra sulfo benzo porphine tin (IV), tetra lithium salt; benzo tri sulfo benzo porphine scandium, tri ammonium salt; bromo, benzo tri sulfo benzo porphine tri (mono ethanol amine) salt; benzo tri sulfo benzo porphine magnesium, tri potassium salt; benzo tri sulfo benzo-meso-tetra phenyl porphine cadmium, tri sodium salt; benzo tri sulfo benzo-meso-tetra phenyl porphine zinc, tri sodium salt; trans-dichloro, benzo tri sulfo benzo-meso-tetra naphthyl porphine tin (IV), tri (di ethanol amine) salt; chloro, tetra sulfo pyrido porphine aluminum, tetra sodium salt; tetra sulfo pyrido porphine, tetra ammonium salt; tetra sulfo pyrido porphine zinc, tetra sodium salt.

Tri sulfo pyrido porphine, tri ammonium salt; tri sulfo pyrido porphine calcium, tri ammonium salt; tri sulfo pyrido porphine, tri sodium salt; meso-disulfopyrryl-meso-disulfo phenyl porphine, tetra sodium salt; meso-disulfo-pyrryl-meso-disulfo phenyl porphine zinc, tetra sodium salt; meso-disulfopyrryl-meso-disulfo phenyl porphine, tetra sodium salt, 1,2,3,4,5,6,7,8-octamethyl-meso-disulfopyrryl-meso-disulfo pheyl porphine, tetra ammonium salt; 1,2,3,4,5,6,7,8-octa n-propyl -meso-disulfopyrryl-meso-disulfo phenyl porphine zinc, tetra sodium salt; disulfobenzo-meso-tetrasulfophenyl porphine, hexa sodium salt; disulfobenzo-meso-tetra(sulfo-4-pyridyl) porphine zinc, hexa sodium salt.

Dibenzo-meso-tetra-(2-thienyl-5-sulfo) porphine, tetra ammonium salt; dibenzo-meso-tetra-(2-furyl-5-sulfo) porphine zinc, tetra sodium salt; benzo-sulfobenzo-meso-tetra-(2-thiazolyl-3-sulfo) porphine, penta sodium salt; benzo-trisulfobenzo-meso-tetra-(2-thiazolyl-3-sulfo) porphine zinc, hepta sodium salt; disulfobenzo-meso-di(2-oxazolyl-3-sulfo)-di(2-oxazolyl) porphine, tetra sodium salt; disulfobenzo-meso-di(2-oxazolyl-4-sulfo) porphine zinc, tetra sodium salt; trisulfobenzo-α, β, γ-tri(sulfo-2-pyridyl)-δ-pyridyl porphine, hexa sodium salt; disulfobenzo-α, β, γ-tri(sulfo-2-indolyl)-δ-indolyl porphine, penta ammonium salt; disulfobenzo-α, β, γ-tri(sulfo-4-hydroxyphenyl)-δ-hydroxyphenyl porphine zinc, penta ammonium salt; tetrasulfo-naphtho porphine, tetra ammonium salt.

Trisulfo naphtho porphine zinc, tri ammonium salt; disulfo benzo disulfo naphthyl porphine zinc, tetra ammonium salt; disulfo benzo sulfo naphthyl porphine, tri ammonium salt; mono sulfo benzo disulfo naphthyl porphine, tri ammonium salt; tetra sulfo benzo-meso-tetramethyl porphine, tetra ammonium salt; trisulfo benzo-meso-tetraethyl porphine zinc, tri ammonium salt; tetrasulfo benzo-meso-tetraisopropyl porphine zinc, tetra ammonium salt; trisulfo benzo-meso-tetra n-butyl porphine, tri ammonium salt; tetrasulfo naphtho-α, β, γ-tri phenyl-δ-sulfophenyl porphine, penta ammonium salt; trisulfo naphtho-meso sec-butyl porphine zinc, tri ammonium salt.

Tetrasulfo naphtho-meso tert-butyl porphine zinc, tetra ammonium salt; trisulfo naphtho-meso-n-propyl porphine, tri ammonium salt; tetra sulfo benzo triaza porphine, tetra sodium salt; tetrasulfo benzo triaza porphine zinc, tetra sodium salt; tetrasulfo benzo triaza porphine, tetra ammonium salt; tetrasulfo benzo-α, β, γ-triaza-δ-sulfophenyl porphine zinc, penta ammonium salt; tetrasulfo benzo diaza porphine, tetra ammonium salt; tetrasulfo benzo diaza porphine zinc, tetra sodium salt; tetrasulfo benzo diaza porphine, ammonium salt; tetrasulfo benzo diaza porphine zinc, tetra sodium salt.

Tetrasulfo benzo-α-aza-β, γδ-triethyl porphine zinc, tetra ammonium salt; tetrasulfo benzo mono aza porphine, tetra sodium salt; tetrasulfo benzo mono aza porphine zinc, tetra ammonium salt; tetrasulfo benzo mono aza porphine, tetra sodium salt; trisulfo benzo triaza porphine, tri sodium salt; trisulfo benzo triaza prophine zinc, tri sodium salt; trisulfo benzo diaza porphine zinc, tri sodium salt; trisulfo benzo-α, β-diaza-γ, δ-disulfo naphthyl porphine, hexa sodium salt; trisulfo benzo monoaza porphine, tri sodium salt; tri-sulfo benzo monoaza porphine zinc, tri ammonium salt.

Tetrasulfo naphtho triaza porphine zinc, tetra ammonium salt; tetrasulfo naphtho triaza porphine, tetra ammonium salt; tetrasulfo naphtho diaza porphine, tetra ammonium salt; tetrasulfo naphtho-α, γ-diaza-β, δ-diphenyl porphine zinc, tetra ammonium salt; tetrasulfo naphtho monoaza porphine zinc, tetra ammonium salt; tetrasulfo naphtho monoaza porphine, tetra ammonium salt; trisulfo naphtho triaza porphine, tri sodium salt; trisulfo naphtho diaza porphine zinc, tri sodium salt; trisulfo naphtho monoaza porphine zinc, tri ammonium salt; tetrasulfo dibenzo dinaphtho triaza porphine zinc, tetra sodium salt.

Tetrasulfo dibenzo dinaphtho diaza porphine, tetra ammonium salt; tetrasulfo benzo trinaphtho monozaza porphine, tetra ammonium salt; trisulfo tribenzo naphtho triaza porphine, tri ammonium salt; trisulfo dibenzo dinaphtho diaza porphine zinc, tri sodium salt; trisulfo dibenzo dinaphtho monoaza porphine zinc, tri sodium salt; α, β, γ-trisulfo pyrryl-δ-sulfophenyl porphine zinc, tetra sodium salt; δ-sulfo pyrryl-β, γ, δ-trisulfo phenyl porphine, tetra sodium salt; α-sulfo furyl-β, γ, δ-trisulfo phenyl porphine zinc, tetra sodium salt; meso-disulfo pyrryl-meso-disulfo phenyl porphine zinc, tetra sodium salt; 1,3,5,7-tetra methyl-α, β, γ, δ-tetrakis(sulfophenyl) porphine, tetra sodium salt.

1,3,5,7-tetra phenyl-α, β, γ, δ-tetrakis(2-oxazolyl, 4-sulfo) porphine magnesium, tetra sodium salt; sulfobenzo-α, β, γ-tri(2-thienyl-5-sulfo) porphine cadmium, tetra potassium salt; trisulfobenzo-α, β, γ-(2-furyl-5-sulfo) porphine, tetra ammonium salt; 1,2,3,4,5,6,7,8-penta sulfo phenyl porphine zinc, penta sodium salt; 1,2,3,4,5,6,7,8-hexasulfo phenyl porphine, hexa sodium salt; chloro, heptasulfo naphthyl porphine aluminum, hepta sodium salt; tetrasulfo benzo-meso-disulfo phenyl porphine calcium, hexa sodium salt; disulfo benzo-meso-tetrasulfo phenyl porphine, hexa sodium salt; 1,2,3,4,5,6,7,8-tetraphenyl-tetrasulfo phenyl-α, β, γ, δ-tetrakis-2-benzo thienyl porphine zinc, tetra sodium salt; α, β, γ, δ-tetrakis(4-methoxy sulfo phenyl) porphine, tetra sodium salt.

Each of the foregoing illustrative photoactivators is a specific chemical compound. It should be understood that alternative photoactivators, each within the scope of the instant invention, are those wherein substituted in each specific named compound are, inter alia:

(a) instead of a specific cation listed: sodium, potassium, lithium, ammonium, monoethanolamine, diethanolamine, or triethanolamine salts.

(b) instead of a specific anion listed: chloride, bromide, iodide, or toluene sulfonate salts.

(c) instead of metallation listed: (zincII), cadmium-(II), magnesium(II), scandium(III), aluminum(III), tin-(IV), or metal free.

(d) instead of the specific alkyl groups mentioned: methyl, ethyl, n-propyl, isopropyl, n-butyl, isobutyl, sec-butyl, or tertbutyl.

(e) instead of the specific solubilizing group mentioned: carboxylate, polyethoxy carboxylate, sulfate, polyethoxy sulfate, phosphate, polyethoxy phosphate, sulfonate, quaternary pyridinium, quaternary ammonium, or polyethoxylate.

(f) instead of the number of solubilizing groups mentioned: any number of solubilizing groups that is not greater than the number of pyrrole-substituted aromatic or pyrido groups plus the number of meso-substituted aromatic or heterocyclic groups and that is, for cationic or nonionic solubilizing groups, from 1 to 8; for remote anionic solubilizing groups, from 2 to 8; and for non-remote solubilizing groups, from 3 to 8.

(g) instead of the specific pyrrole substituents mentioned: benzo, naphtho, pyrido, phenyl or naphthyl.

(h) instead of the specific meso substituents mentioned: phenyl, naphthyl, thienyl, furyl, thioazyl, oxazyalyl, indolyl, benzothienyl, or pyridyl.

The alternative photoactivator compounds described above are to be considered equally illustrative of the compounds of this invention as the compounds specifically named in the preceding list.

Additional embodiments of this invention are compounds hereinafter appearing numbered from XXV through XXXVI and from XLVII through LXI; compounds numbered from XXXVII through XLVI following conversion of hydroxy groups to corresponding carboxy groups; and compounds numbered from I through XXI following sulfonation.

The literature contains references to numerous means of preparation of porphine and its derivatives, i.e. to the photoactivators of this invention. One skilled in the art of porphine or phthalocyanine chemistry will have no difficulty selecting a synthesis appropriate for his particular purposes. Some of the synthesis reactions are accompanied by side reactions; in these cases conventional means of separation and purification are needed, such as chromatographic techniques, in a manner also detailed in the literature and well known to the skilled practitioner.

It may be said that there are two general preparative routes to make solubilized substituted porphines. The first route is to prepare the substituted porphine of choice and then solubilize it by introduction of appropriate solubilizing groups. This route is especially applicable to the preparation of sulfonated porphines, and is illustrated hereinafter by the snythesis of divers individual sulfonated porphine species. The second route is to prepare the solubilized porphine species of chance by using starting materials already containing the desired solubilizing groups as part of their own constitution. This route is especially applicable to the preparation of porphines solubilized by groups other than sulfonate, and is illustrated hereinafter by the snythesis of divers compounds of this type. It will be appreciated by one skilled in the art that these two preparative routes are by no means exclusive for these two types of compounds, respectively. Indeed it is possible, within the scope of this invention, to prepare porphine compounds having some solubilizing groups introduced by the first route and some by the second route, with the two sets of solubilized groups (those introduced by the first route and the second route, respectively) being either the same or different. Illustrative examples of these variations are also described hereinafter.

The first preparative route, as defined above, will now be discussed. One convenient way to prepare porphines is to react substituted or unsubstituted heterocyclic or aromatic carboxaldehydes with substituted or unsubstituted pyrroles. By varying the substituent groups of one or the other or both of these reactants, a great variety of porphine derivatives can be obtained. For example,

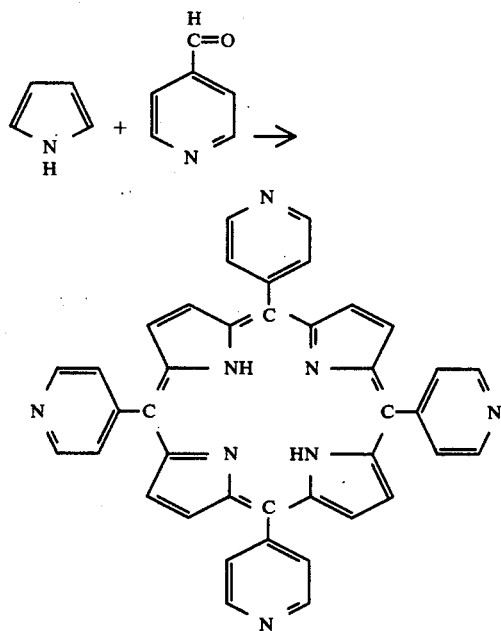

The stability of the quadridentate macromolecular structure is such that the reaction proceeds as described above. For convenience, the product is frequently and conventionally described by showing only one quarter of this symmetrical structure. It will be appreciated this structure is stabilized by resonance, and the bonds of all four quarters of the structure are alike, even though conventionally they are drawn in just one of the resonating structures. Accordingly, compound (I) above can be illustrated more simply as:

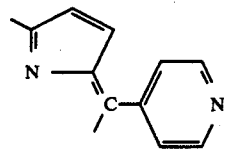

When pyrrole is reacted with 2-thiophene carboxaldehyde instead of 4-pyridine carboxaldehyde, the reaction proceeds

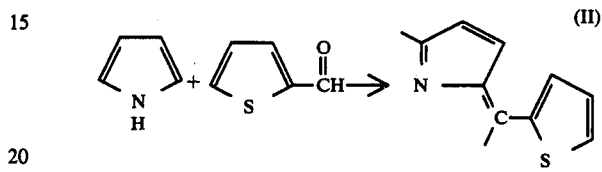

Other comparable reactions with pyrrole and substituted pyrrole are given. It will be understood that substituent groups which are present on either of the reactants will carry over into the corresponding porphine derivative, thereby making possible a great variety of compounds that have the essential charcteristics necessary for the practice of this invention. The specific equations below are therefore exemplary and are not intended to be limiting.

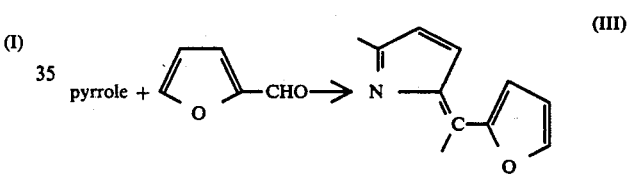

2-furan carboxaldehyde     α,β,γ,δ-tetrakis-(2-furyl)porphine

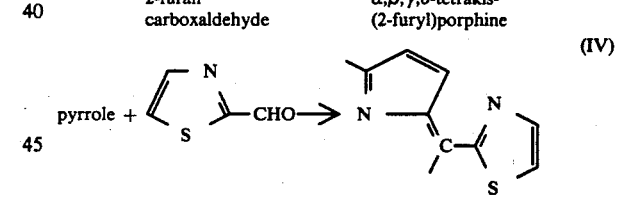

2-thiazole carboxaldehyde     α,β,γ,δ-tetrakis-(2-thioazyl)porphine

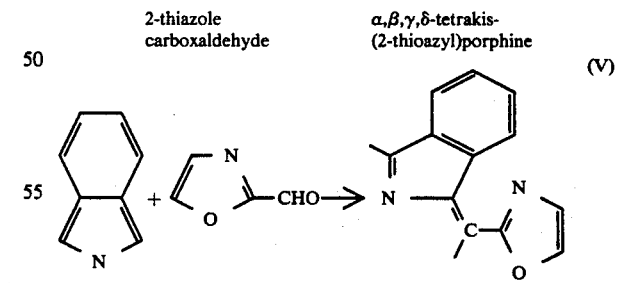

isoindole [benzopyrrole]    2-oxazole carboxaldehyde    α,β,γ,δ-tetrakis-(2-oxazolyl)tetrabenzo porphine

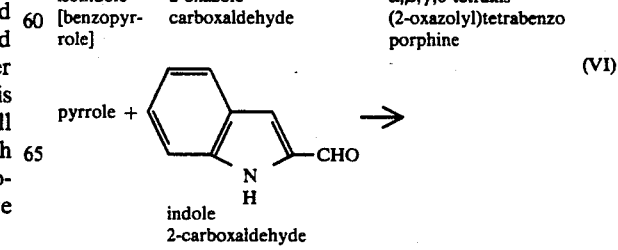

indole 2-carboxaldehyde

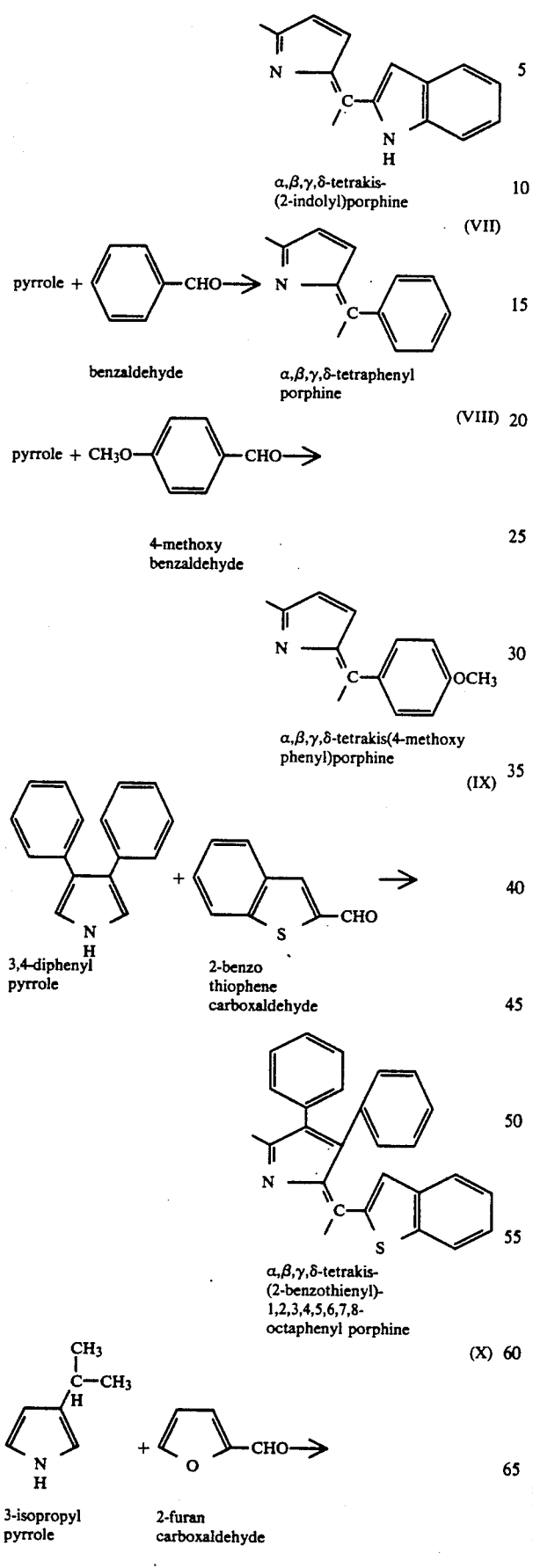

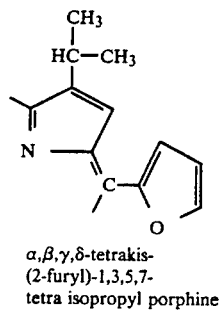

α,β,γ,δ-tetrakis-(2-furyl)-1,3,5,7-tetra isopropyl porphine

The above class of reactions can be carried out by refluxing propionic acid for about 30 to 60 minutes followed by chromatographic purification. This method is described by Adler in J. Organic Chemistry, volume 32 page 476 (1967) which is herein incorporated by reference.

Any of the resultant metal-free compounds can be converted to the corresponding metallated compound by heating with a metal salt of Zn(II), Cd(II), Mg(II), Sc(III) or Sn(II) in a appropriate solvent. [The Sn(II) becomes oxidized in the process, such that the photoactivator is metallated by Sn(IV).]. For example, heating α, β, α, δ-tetrakis(4-pyridyl) porphine in dimethylformamide in the presence of zinc acetate yields α, β, α, δ-tetrakis(4-pyridyl) porphine zinc. This method is described by Adler in J. Inorganic Nuclear Chemistry, volume 32, pages 2443-5 (Pergamon Press, Inc., Great Britain, 1970) which is herein incorporated by reference.

Alternatively, a metallated derivative can be prepared by carrying out the synthesis reactions [e.g.(I) through (X) above] in the presence of a salt of the described metal. For example, if cadmium chloride is present while carrying out reaction (IV), the resultant photoactivator compound is α,β,γ,δ-tetrakis-(2-thioazyl)porphine cadmium. This reaction for producing a metallated compound may be preferred because the presence of the metal tends to increase stability of the desired quadridentate structure and tends to minimize the formation of other reaction products.

A completely different route to porphine compounds having fused ring substitution on the pyrrole rings is the condensation and rearrangement of 4 molecules of cyano aromatic or cyano heterocyclic ketones to form a quadridentale structure. This is done by heating in the presence of metallic zinc, cadmium, magnesium, scandium, aluminum or tin, or a metal salt of Zn(II), Ca(II), Cd(II), Mg(II), Sc(III), Al(III) or Sn(IV), and yields the corresponding metallated porphine.

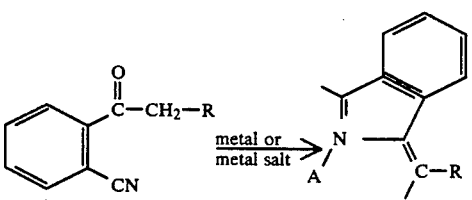

(X)

where A is zinc (II), cadmium (II), magnesium (II), scandium(III), aluminum(III), or tin(IV) and where R is hydrogen, alkyl, aryl, or mixtures thereof. Specific examples are:

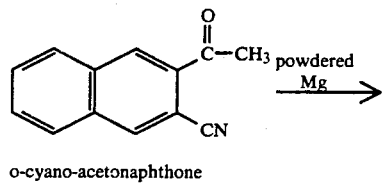

o-cyano-acetonaphthone

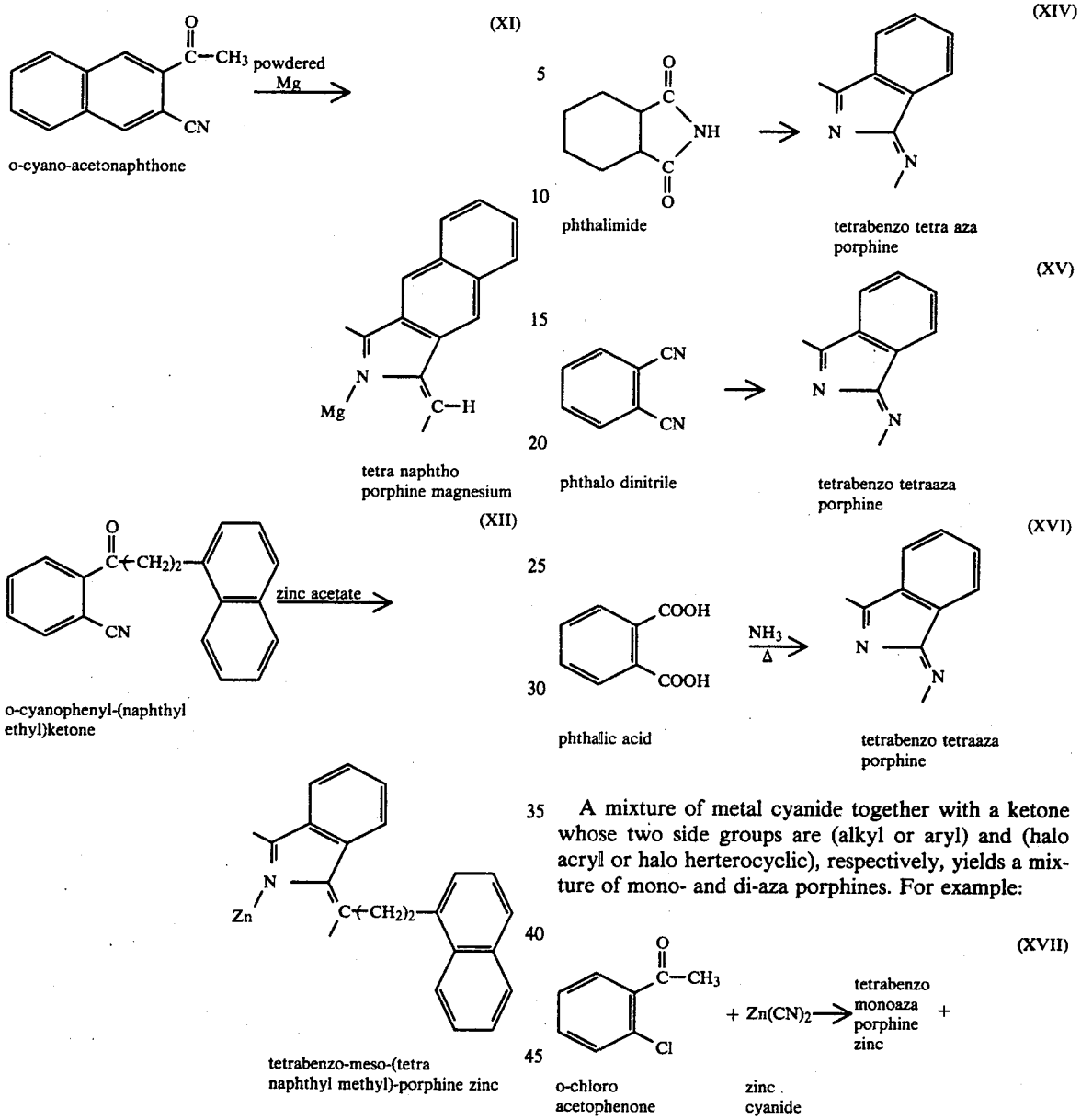

o-cyanophenyl-(naphthyl ethyl)ketone tetrabenzo-meso-(tetra naphthyl methyl)-porphine zinc Similarly, condensation and rearrangement of imides and aromatic vicinal dinitriles yields aza porphine structures as does condensation and rearrangement of aromatic vicinal dicarboxylic acids in the presence of ammonia. Molybdic or tungstic acid or metallic antimony can be employed, as desired, to accelerate the reactions. For example:

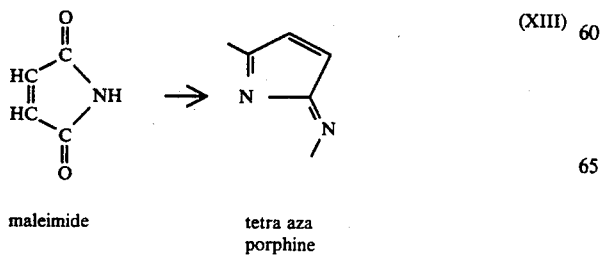

maleimide — tetra aza porphine

A mixture of metal cyanide together with a ketone whose two side groups are (alkyl or aryl) and (halo acryl or halo herterocyclic), respectively, yields a mixture of mono- and di-aza porphines. For example:

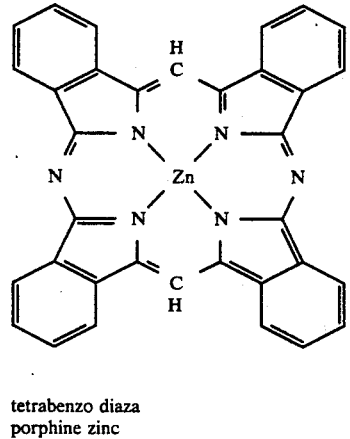

o-chloro acetophenone + Zn(CN)$_2$ → tetrabenzo monoaza porphine zinc + tetrabenzo diaza porphine zinc Similarly, a mixture of phthalonitrile and a ketone whose side groups are (alkyl or aryl) and (cyanoaryl or cyanoheterocyclic), respectively, yields a mixture of mono- and di- aza porphines. Substitution of the meso-carbon atoms can be varied by appropriate choice of ketone.

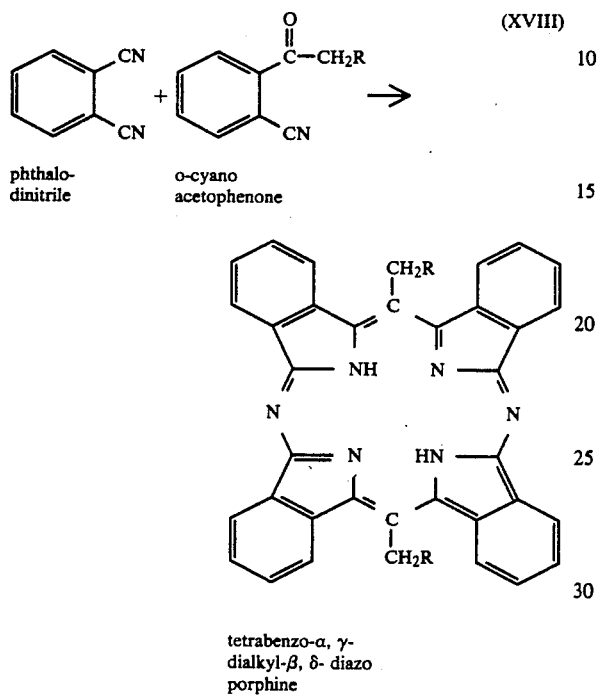

phthalo-dinitrile    o-cyano acetophenone tetrabenzo-α, γ-dialkyl-β, δ- diazo porphine    (XVIII)

An especially versatile method of preparing mono-, di-, and tri-aza porphines uses mixtures of pyrroles and carboxaldehydes [starting materials for porphines, as illustrated by equations (III) through (X) supra] together with dinitriles or imides [starting materials for aza porphines, as illustrated by equations (XIII) through (XV) supra]. Through suitable proportionation of the starting materials, mixtures of reaction products are obtained that are primarily mono-, di-, or tri-aza porphines, as desired. If pure species are desired, these reaction products can be purified by ordinary chromatographic techniques. Examples of the above reactions are:

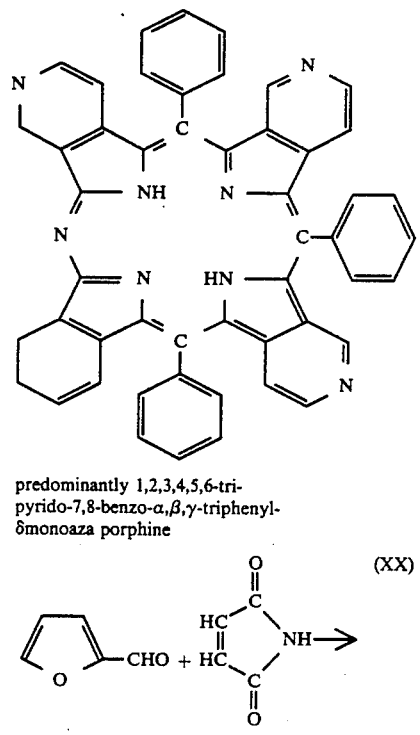

predominantly 1,2,3,4,5,6-tri-pyrido-7,8-benzo-α,β,γ-triphenyl-δmonoaza porphine methyl pyrrole    2-furan carboxalde-hyde    maleimide (excess)    (XX)

predominantly 2-methyl-α(2-furyl)-β,γ,δ-triaza porphine

A mixture of phthalonitrile, a metal salt, and methylene phthalimidene or phthalimideneacetic acid yields triazaporphine, as shown below. Varying the substituent groups forms substituted triaza porphines according to usual chemical principles.

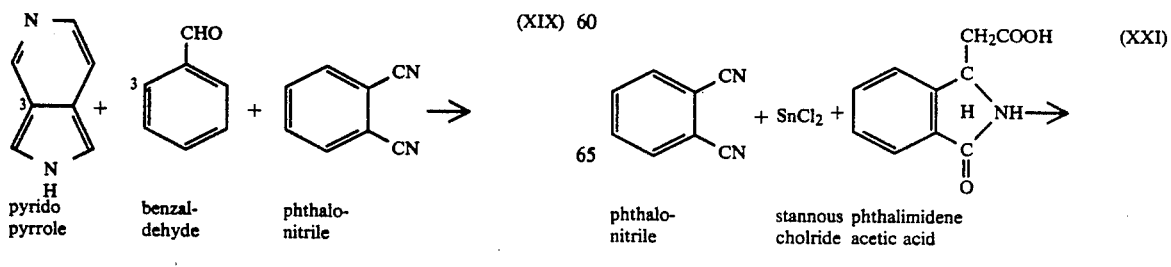

pyrido pyrrole    benzal-dehyde    phthalo-nitrile    (XIX)

phthalo-nitrile    stannous phthalimidene cholride acetic acid    (XXI)

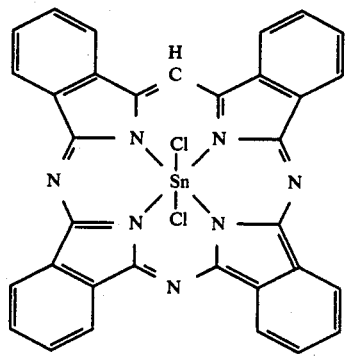

trans-dichloro,
tetrabenzo triaza
porphine tin (IV)

When the foregoing condensation method is used, unmetallated derivatives can be prepared by treatment with concentrated sulfuric acid followed by dilute alkali with cooling, as described by Helberger in Annalen 529, 305 (1937) which is herein incorporated by reference.

Many of the reactants used in the foregoing methods of preparation are commonly known and readily available to the skilled organic chemist. Certain general methods of synthesis can be described below, as follows:

Substituted pyrroles can be prepared by heating 1,4 dicarbonyl compounds (diacids or keto acids) with ammonia. For example,

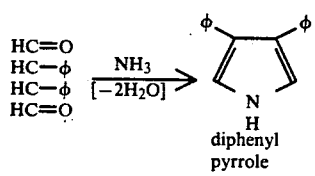

diphenyl pyrrole

Heterocyclic 2-aldehydes containing hetero or oxygen atoms can be prepared from pentosans by hydrolysis to pentoses followed by dehydration and oxidation. For example,

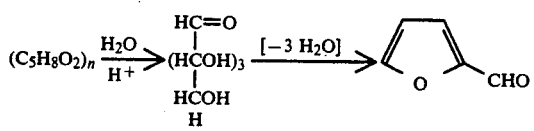

Heterocyclics containing sulfur or nitrogen hetero atoms can be converted into 2-aldehydes by reacting with HCl and HCN, followed by hydrolyzing with water. Two examples follow:

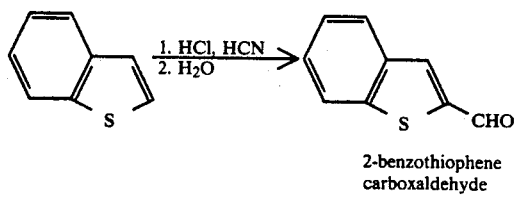

2-benzothiophene carboxaldehyde

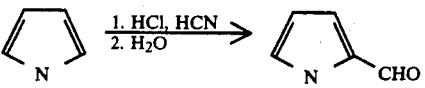

2-pyrryl carboxaldehyde

In the foregoing equations, each quadridentate porphine macromolecule is comprised of 4 identical quarters. For example, reacting pyrrole

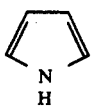

with 4-pyridine carboxyaldehyde forms compound I which is α,β,γ,δ-tetrakis(4-pyridyl)porphine. Reacting a substituted pyrrole, isoindole

with 4-pyridine carboxaldehyde, forms in an analogous manner the compound tetra benzo-α,β,γ,δ-tetrakis(4-pyridyl) porphine. Reacting a mixture of pyrrole and indole with 4-pyridine carboxaldehyde forms the mono-benzo, dibenzo, or tribenzo derivatives of α,β,γ,δ-tetrakis(4-pyridyl) porphine, depending upon the proportions of reactants used. This technique of reacting mixtures is widely appliable to the reactions illustrated hereinbefore.

It is also possible to prepare porphines having 4 non-identical quarters by combining reactions of the type illustrated by equations I-X with those illustrated by equations XI-XV. For example, o-acylnaphthonitrile, pyrrole, and an aldehyde react in such a way to form porphins with 1 to 3 naphtho groups.

Sulfonation of the substituted porphines described hereinbefore can be accomplished by ordinary methods such as are familar to the skilled chemist. Sulfuric acid, oleum, chlorosulfonic acid and the like are effective sulfonating agents. As usual, higher degrees of sulfonation are obtained by increasing reaction time or temperature or by selection of a stronger sulfonating agent.

Sulfonation occurs principally on benzo, naphtho, or other aromatic groups fused directly onto the pyrrole rings or on aromatic groups such as phenyl or naphthyl substituted on the pyrrole rings; and also on phenyl, naphthyl, or other aromatic groups in the meso position. Sulfonation can also occur on pyrido, pyrryl and furan heterocylic groups, and on aromatic rings fused onto hetero rings; however the pyridine/SO₃ salt is often used for these sulfonations.

Often a maximum of 4 locations is possible for each of these two types of substitution, making an overall maximum of 8 sites per molecule readily available for sulfonation. For example, tetrabenzo-meso-tetraphenyl porphine can be reacted to form mono-, di-, tri-, ... penta-, and octasulfonate derivatives. However a photoactivator such as 1,2,3,4,5,6,7,8 ocataphenyl-meso-tetraphenyl porphine can possibly have up to 12 sites of sulfonation. Tetra benzo porphine and meso tetra phenyl porphine, each of which has only 4 aromatic substituent groups, are examples of porphines which can be effectively reacted only to form mono-, di-, tri-, and tetasulfonate derivates. Attempting to go beyond this degree of sulfonation destabilizes the molecule.

A preferred photoactivator of this invention is sulfonated phthalocyanine. This compound metallated with zinc is especially preferred, the tri- and tetra-sulfonated species of the compound are more especially preferred, and the sodium salts thereof are most especially preferred. This photoactivator is discussed in U.S. Pat. No. 3,927,967, Japanese OPI No. 50-113,479, Belgian Pat. No. 840,348 and British Pat. No. 1,372,036, all of which have been cited hereinbefore and are hereby incorporated herein by reference.

The prior art method of preparation of zinc phthalocyanine sulfonate is the reaction of oleum upon zinc phthalocyanine, an old and commercially available starting material. The structure of zinc phthalocyanine tetrasulfonate, tetrasodium salt is closely related to that of compound [T] disclosed hereinbefore and is as follows:

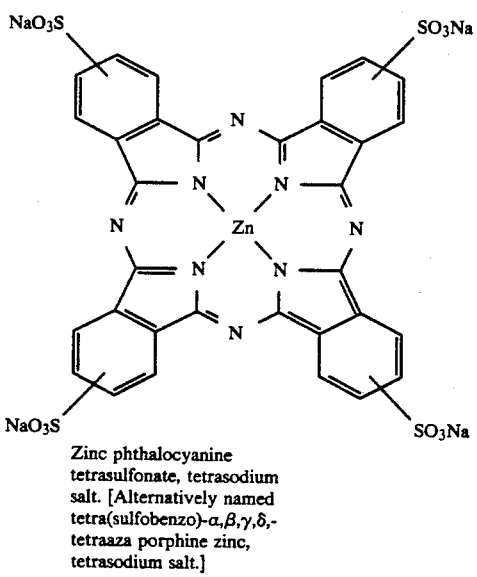

Zinc phthalocyanine tetrasulfonate, tetrasodium salt. [Alternatively named tetra(sulfobenzo)-$\alpha,\beta,\gamma,\delta$,-tetraaza porphine zinc, tetrasodium salt.]

A convenient synthesis for zinc phthalocyanine tetrasulfonate is the condensation of 4 molecules of phthalonitrile into a single quadridentate molecule in a solution of ethylene glycol in the presence of zinc dust and molybd acid as catalyst, followed by sulfonation with oleum and subsequent neutralization. Variations in structure can be achieved, as usual, by using other metallating agents or none at all, by starting with substituted phthalonitriles, and by changes in sulfonation conditions. Yields are relatively low (25%) for unmetallated phthclayanines, but purification by chromatographic separation can be employed in the customary manner if such compound should be desired.

Sulfonation in remote sites can be brought about by certain reactions illustrated infra in addition to the reactions described supra. It is of course contemplated that sulfonation can, and frequently will, take place on both proximate and remote sites. Condensing and rearranging a substituted maleimide leads to the following:

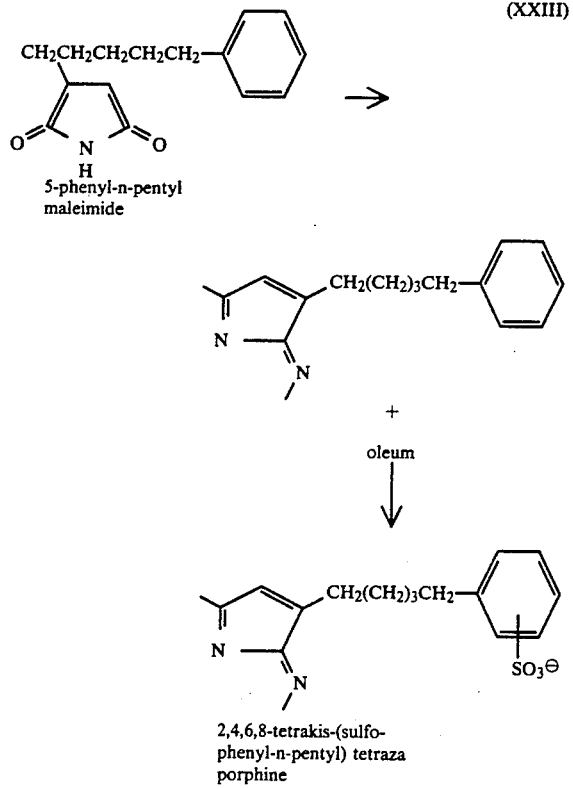

5-phenyl-n-pentyl maleimide 2,4,6,8-tetrakis-(sulfophenyl-n-pentyl) tetraza porphine Also, as described in Groves hereinbefore cited, reactions of the following form can be utilized:

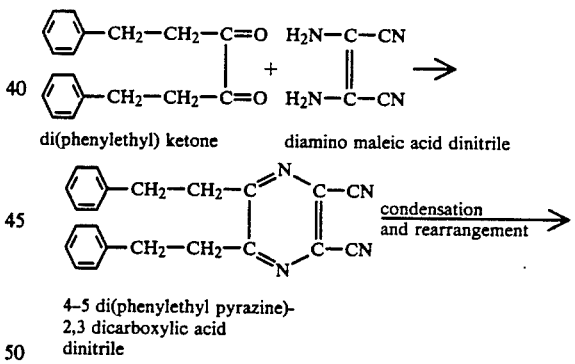

di(phenylethyl) ketone    diamino maleic acid dinitrile 4-5 di(phenylethyl pyrazine)-2,3 dicarboxylic acid dinitrile

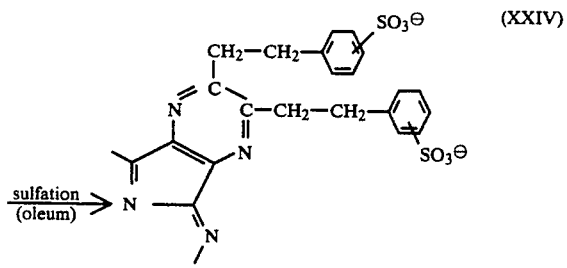

The second preparative route for making solubilized substituted porphines will now be described. As stated hereinbefore, this route is to prepare the solubilized porphine species of choice by using starting materials already containing the described solubilized groups as part of their own constitution.

When compound (I), a substituted pyridine, is reacted with an alkyl halide such as CH₃I, a quaternary pyridinium salt is formed which is an effective photoactivating bleach of this invention providing the other requirements are met as set forth herein. Quaternary porphine derivatives adsorb directly and strongly upon cotton fabrics because of their opposite charge. This is desirable; however a countervailing factor is the yellowish color of many such compounds which tends to remain on the fabric after washing.

The methyl ester of toluene sulfonate may be used instead of methyl iodide as a quaternizing salt, leading to the following synthesis:

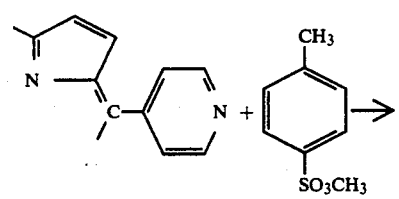

α, β, γ, δ - tetrakis (4-pyridyl) porphine methyl ester of toluene sulfonate (XXV)

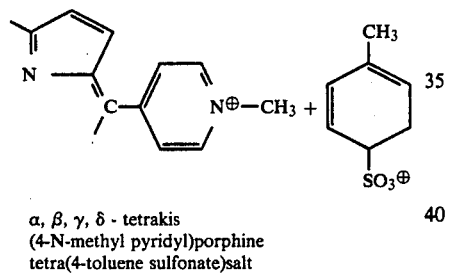

α, β, γ, δ - tetrakis (4-N-methyl pyridyl)porphine tetra(4-toluene sulfonate)salt When substituted pyrroles are reacted with pyridine 4-carboxyaldehyde, and the reaction product reacted with an alkyl halide, a number of different pyridinium salts are formed. Non-limiting examples are:

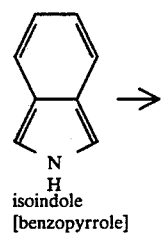
isoindole [benzopyrrole]

(XXVI) tetrabenzo - α, β, γ, δ - tetrakis - (4-N-alkyl pyridyl) - porphine, tetra halide salt

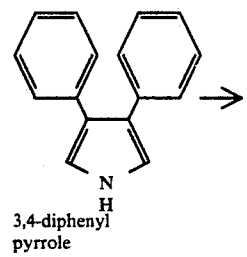
3,4-diphenyl pyrrole (XXVII) octaphenyl - α, β, γ, δ - tetrakis - (4-N-alkyl pyridyl) - porphine, tetra halide salt

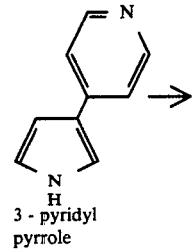
3 - pyridyl pyrrole (XXVIII) 1, 3, 5, 7 - tetrakis (4-N-alkyl pyridyl) α, β, γ, δ - tetrakis - (4-N-alkyl pyridyl) - porphine, tetra halide salt Statements made hereinbefore in relation to the preparation of compounds I through X also apply to the preparation of compounds XXVI through XXVIII in relation to isopropionic acid reflex and methods of metallation, which are generally applicable to the photoactivators of this invention, whatever the solubilizing groups may be.

Aza pyridinium salts can be made by condensing and rearranging pyrido-substituted imides or dinitriles, or by condensing and rearranging pyrido-substituted aromatic vicinal dicarboxylic acids in the presence of ammonia. For example,

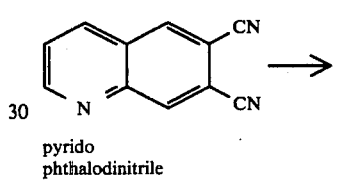
pyrido phthalodinitrile

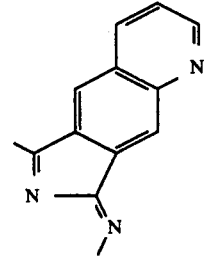

+CH₃I (XXIX)

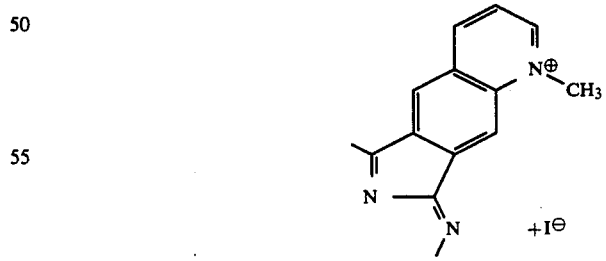

tetrakis (N-methyl-6, 7 - quinolinediyl) tetraaza porphine, tetraiodide salt

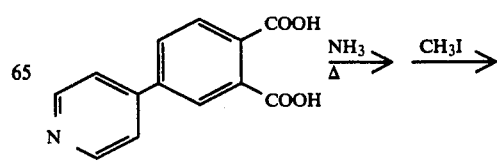

(XXX)

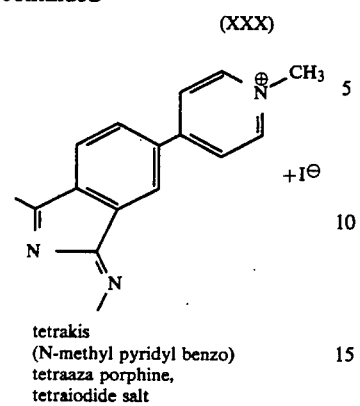

tetrakis
(N-methyl pyridyl benzo)
tetraaza porphine,
tetraiodide salt

Mono-, di-, and tri-aza pyridinium salts can be prepared by using mixtures of starting materials which yield mixtures of reaction products according to the proportions of the reactants. If pure species are desired, they can be purified by chromatographic techniques. Non-limiting examples are:

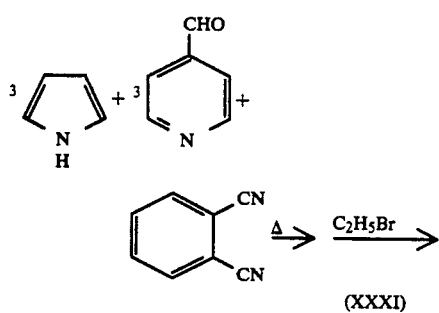

(XXXI)

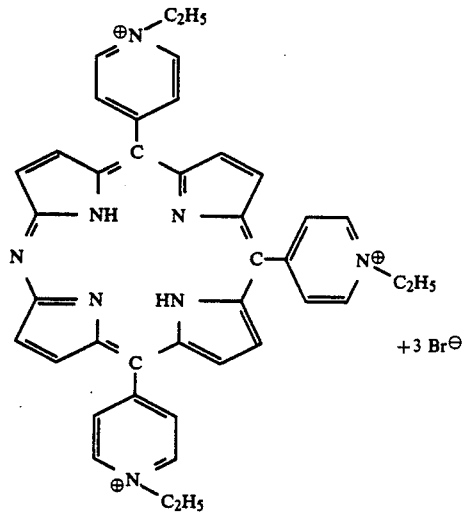

predominately α, β, γ - tri (N-ethyl pyridyl) - δ monoaza porphine, tribromide salt

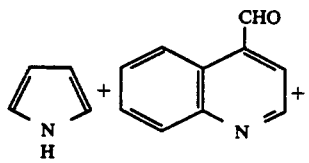

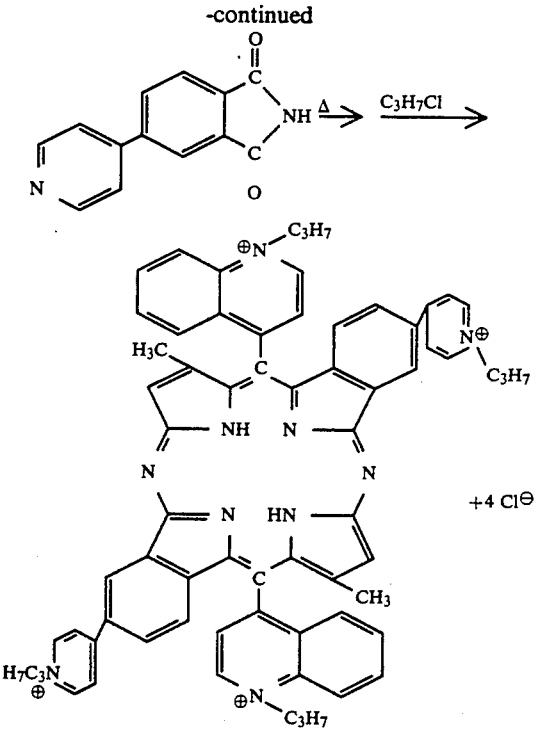

predominately 2,6-dimethyl-3,4,7,8- di(N-propyl pyridyl benzo)-α, γ - di(benzo-N-propyl pyridyl)- β, δ - diaza porphine, tetrachloride salt By suitable changes in starting materials, quaternary ammonium salts can be prepared in a manner similar to that of the pyridinium salt illustrated as compound (XXV). For example, reacting pyrrole with a tertiary amino aldehyde, followed by quaternizing, leads to

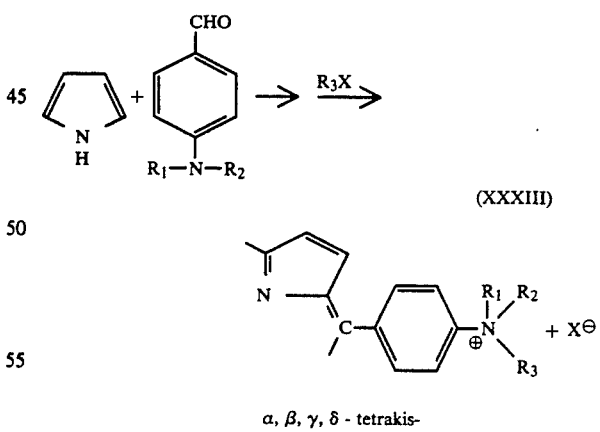

(XXXIII)

α, β, γ, δ - tetrakis-trialkyl 4-amino phenyl) porphine, tetra halide salt

As before, use of substituted pyrroles leads to pyrrole-substituted porphines, while variations in the tertiary amino group lead to corresponding variations in the meso substitution.

A completely different route to quaternized porphine compounds having fused ring substitution on the pyrrole rings is the condensation and rearrangement of 4 molecules of cyano aromatic or cyano heterocyclic ketones to form a quadridentate structure. This is analogous to the methods hereinbefore described for the preparation of compounds (XI) and (XII). To utilize this method to make quaternary ammonium salts it is only necessary to start with a compound having a tertiary amino group in the R moiety, and then quaternize the resultant porphine as before. For example,

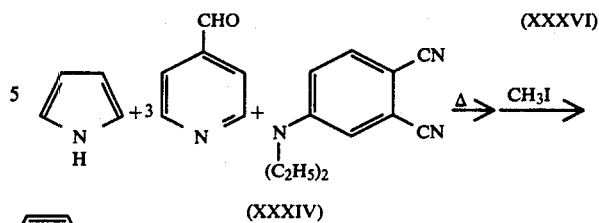

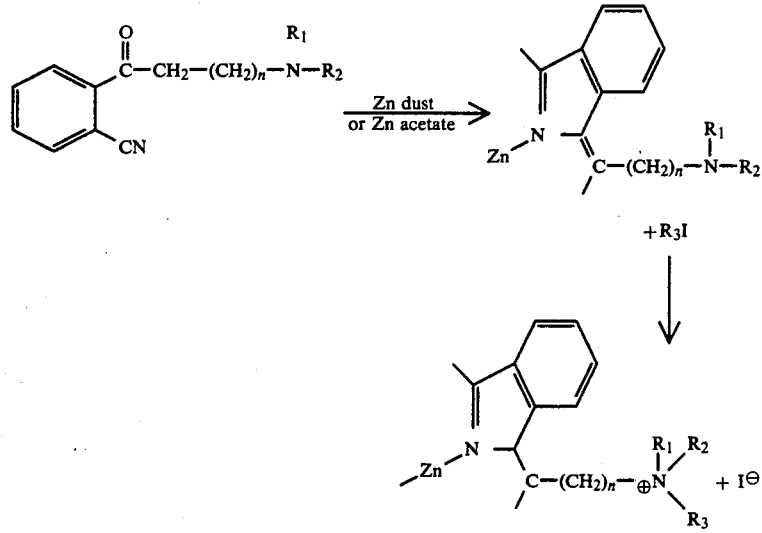

where n = 2,
α, β, γ, δ- tetrakis -
(N-trialkyl amino ethyl)
porphine zinc, tetra
iodide Quaternary ammonium aza porphines can be made by adaptation of the methods of equations XXIX and XXX supra, as for example:

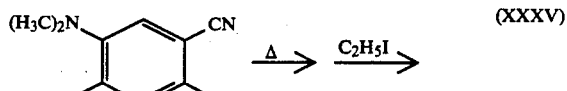

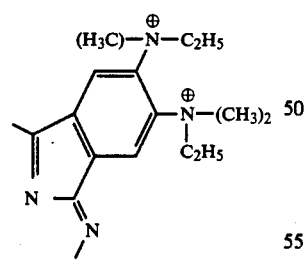

tetrakis-di-(N-dimethyl-N-ethylamino) benzo-α, β, γ, δ-tetraaza porphine, octaiodide salt Quaternary ammonium mono-, di-, and tri-aza porphines can be made by suitable choice of mixed starting materials, in a manner analagous to the way analagous pyridinium compounds can be made as explained hereinabove. Mixed quaternary ammonium/pyridinium porphine compounds are readily prepared, as for example:

predominately 2-(N-diethyl-N-methyl amino benzo)-β,γ,δ-tri(N-methyl pyridyl)-α-monoaza porphine, tetra iodide salt

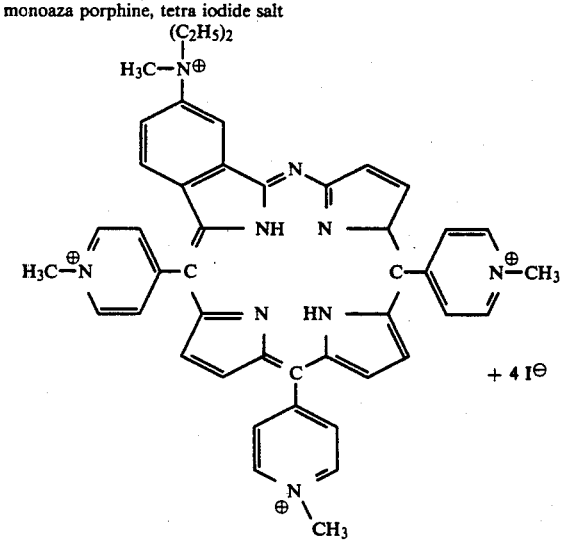

Among the preferred nonionic and anionic solubilizing groups of the photoactivators of this invention and polyethoxylates, sulfates, polyethoxysulfates, carboxylates, polyethoxy carboxylates, and phosphates. A suitable preparative method for introducing all such groups into the porphine structure is to first make the corresponding polyhydroxy porphine, and then convert the hydroxy groups to the solubilizing groups of choice. Accordingly, methods of preparing hydroxy porphines will be described below, following which means of converting these compounds to polyethoxylates, sulfates, etc. will be discussed.

One method of making polyhydroxy porphines is the reaction of pyrrole and substituted pyrroles with hydroxy-substituted aromatic aldehydes. This is analagous to the preparation of cationic solubilizing groups illustrated by compounds (XXV), (XXVI), (XXVII), (XXVIII), and (XXXIII) supra. For example,

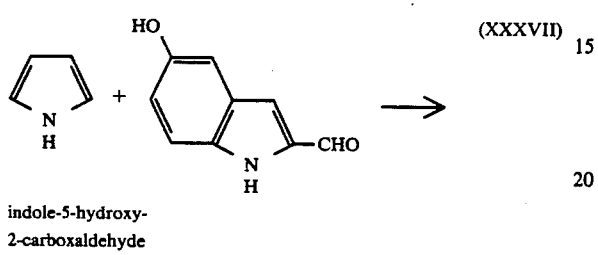

indole-5-hydroxy-2-carboxaldehyde (XXXVII)

$\alpha,\beta,\gamma,\delta$-tetrakis-(5-hydroxy-2-indolyl) porphine

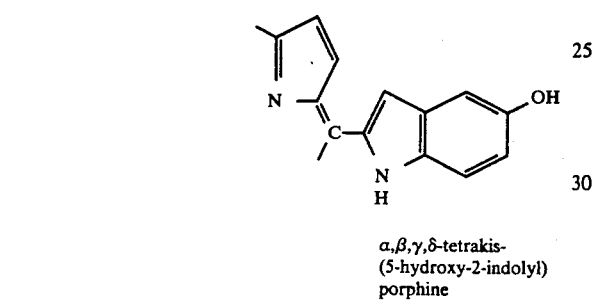

(XXXVIII)

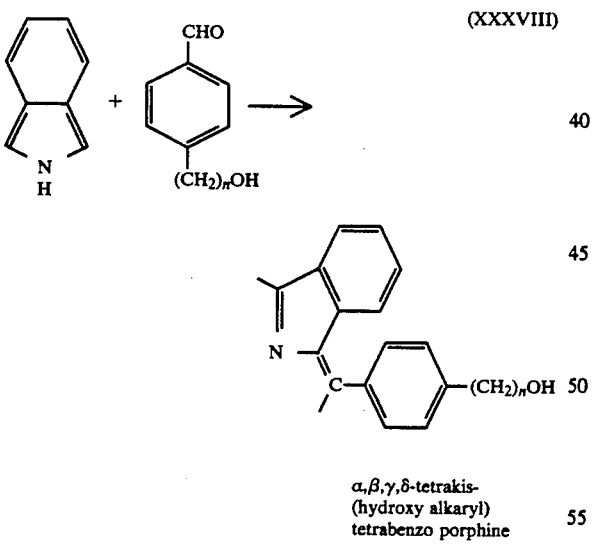

$\alpha,\beta,\gamma,\delta$-tetrakis-(hydroxy alkaryl) tetrabenzo porphine

Mixtures of the above starting materials yield porphine structures wherein the 4 quarters of the quadridentate molecules have non-identical structures, according to the proportions used. This method of preparation can be exemplified by the use of a mixture of pyrrole and benzopyrrole with benzaldehyde to yield dibenzo meso tetraphenyl porphine.

Alternatively, hydroxy-substituted pyrroles can be reacted with aromatic aldehydes:

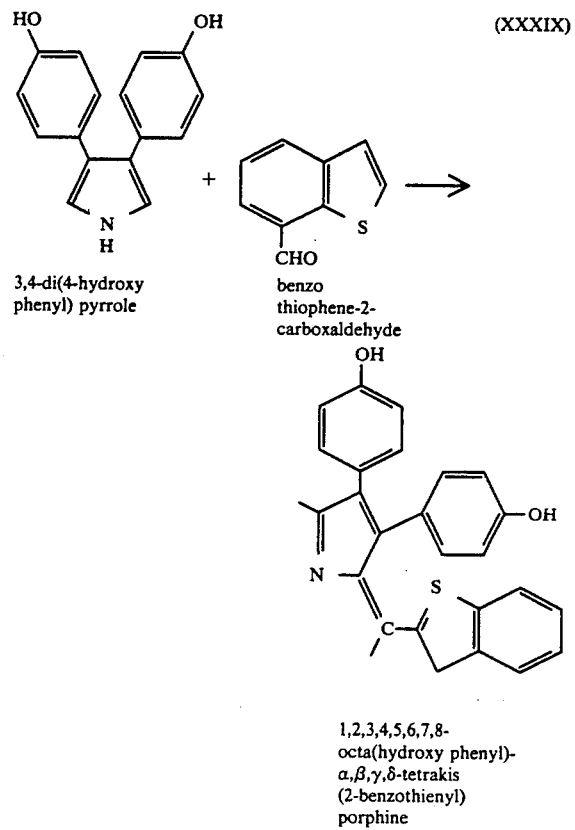

3,4-di(4-hydroxy phenyl) pyrrole benzo thiophene-2-carboxaldehyde 1,2,3,4,5,6,7,8-octa(hydroxy phenyl)-$\alpha,\beta,\gamma,\delta$-tetrakis (2-benzothienyl) porphine (XL)

3-hydroxy isopropyl pyrrole 2-furan carboxaldehyde 1,3,5,7-tetra hydroxyisopropyl-$\alpha,\beta,\gamma,\delta$-tetrakis-(2-furyl) porphine In a manner analagous to the preparation of cationic compound (XXXIV), hydroxy cyano aromatic or hydroxy cyano heterocyclic ketones can be condensed and rearranged to form the stable porphine quadridentate structure. For example:

(XLI)

-continued

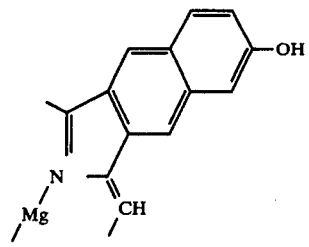

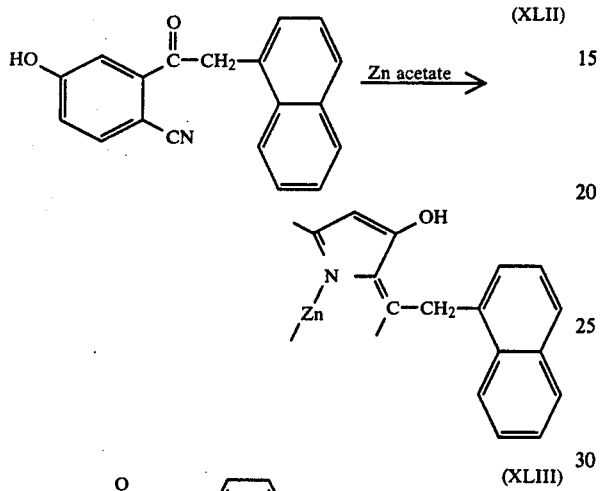

(XLII)

(XLIII)

Mixtures of the above starting materials yield porphine structures wherein the 4 quarters of the quadridentate molecules have non-identical structures, according to the proportions used.

Hydroxy-substituted aza porphines can be made in a manner analagous to that used to prepare compounds (XXIX) and (XXX); i.e. by condensation and rearrangement of hydroxy-substituted aromatic vicinal dicarboxylic acids in the presence of ammonia. For example:

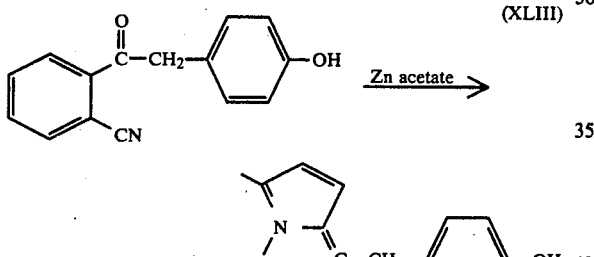

hydroxy phthalic acid (XLIV)

A mixture of polyhydroxy mono- and di-aza porphines results from using, as starting materials, a mixture of a metal cyanide with a ketone whose two side groups are, respectively, (alkyl or aryl) and (halo aryl or halo heterocyclic), where on or the other or both side groups of the ketone have a hydroxyl group substituted therein. For example,

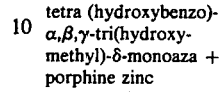 + Zn(CN)₂ ⟶

(XLV)

tetra (hydroxybenzo)-α,β,γ-tri(hydroxymethyl)-δ-monoaza + porphine zinc

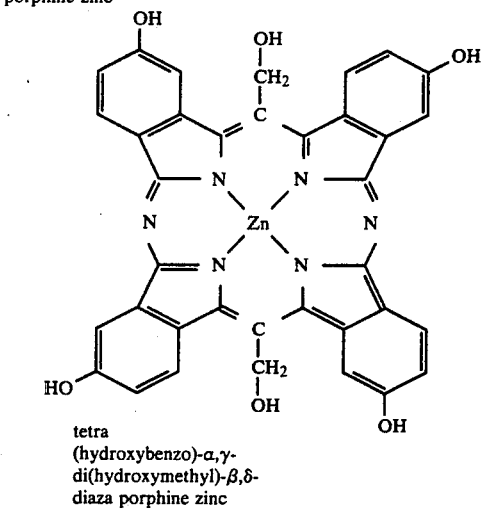

tetra (hydroxybenzo)-α,γ-di(hydroxymethyl)-β,δ-diaza porphine zinc

Alternatively, using mixtures of starting materials described above:

(XLVI)

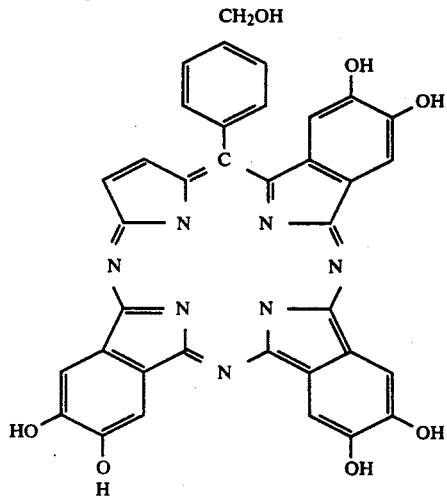

tri(dihydroxybenzo)-α-(hydroxymethyl phenyl)-β,γ,δ-triaza porphine

The hydroxy groups of the foregoing hydroxy substituted porphines can be converted to solubilizing groups of this invention according to the following well known chemical reaction procedures:

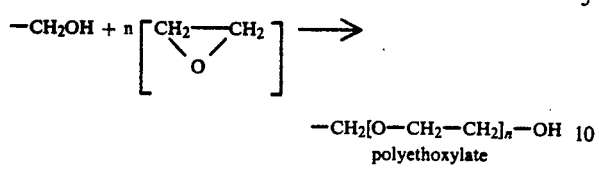
polyethoxylate

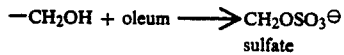
sulfate

polyethoxysulfate

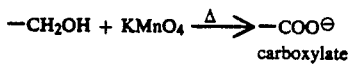
carboxylate

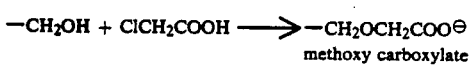
methoxy carboxylate

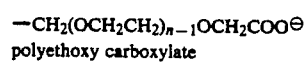
polyethoxy carboxylate

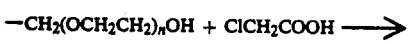
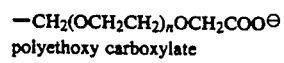
polyethoxy carboxylate

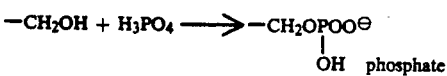
phosphate

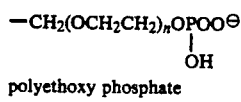
polyethoxy phosphate

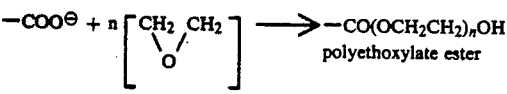
polyethoxylate ester

To exemplify how these procedures can be used:

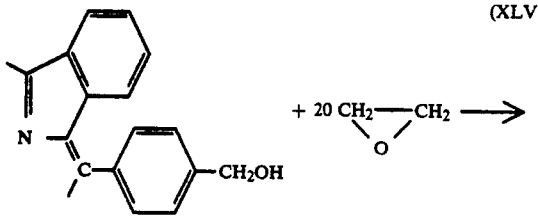
(XLVII)

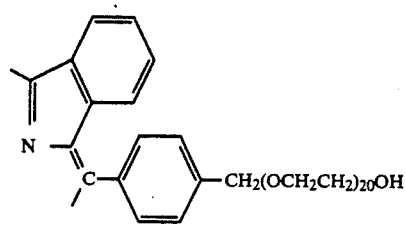

tetrabenzo-
α,β,γ,δ-tetra(4-polyethoxymethyl-phenyl) porphine

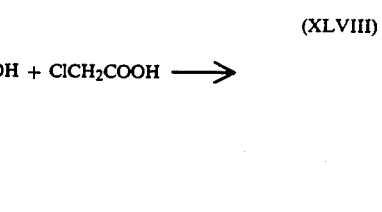 (XLVIII)

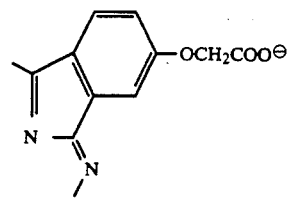

2,4,6,8-tetrakis
(carboxy methoxy)-
α,β,γ,δ-tetraaza
porphine

It will be appreciated that one skilled in the chemical arts, and particularly in the color and dye arts, can apply the foregoing principles to make his photoactivator of choice according to this invention.

Alternative ways of making carboxy porphines are evident modifications of the chemistry hereinbefore described:

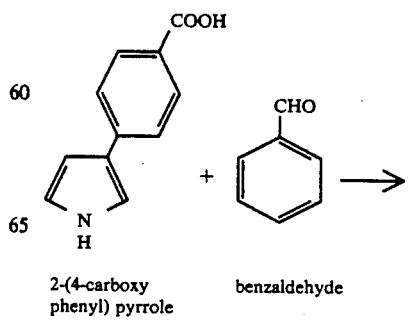 (XLIX)

2-(4-carboxy phenyl) pyrrole    benzaldehyde

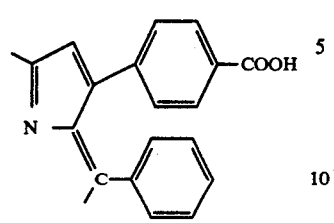

α,β,γ,δ-tetraphenyl-
1,3,5,7 tetra(4-carboxy-
phenyl) porphine

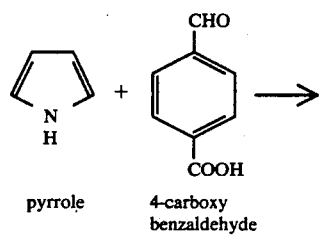

pyrrole   4-carboxy
          benzaldehyde

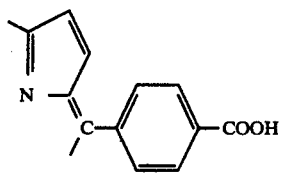

α,β,γ,δ-tetrakis
(4-carboxyphenyl)
porphine

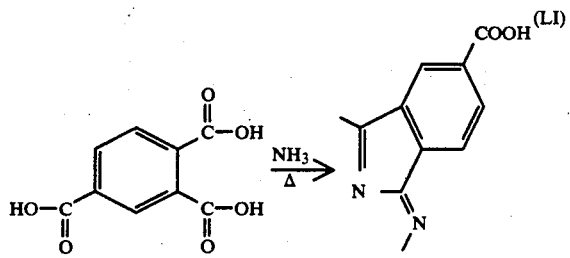 (LI)

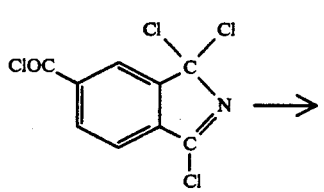 (LII)

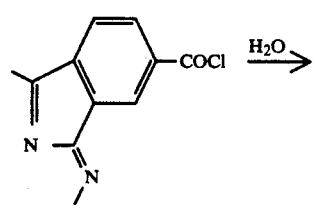

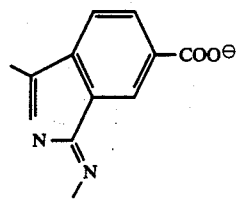

Varying proportions of the above starting materials in mixtures yield mono-, di-, and tri-aza compounds. For example:

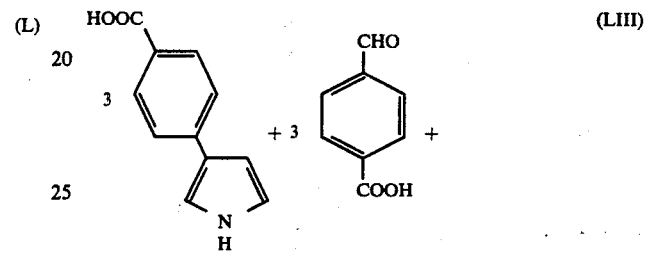 (LIII)

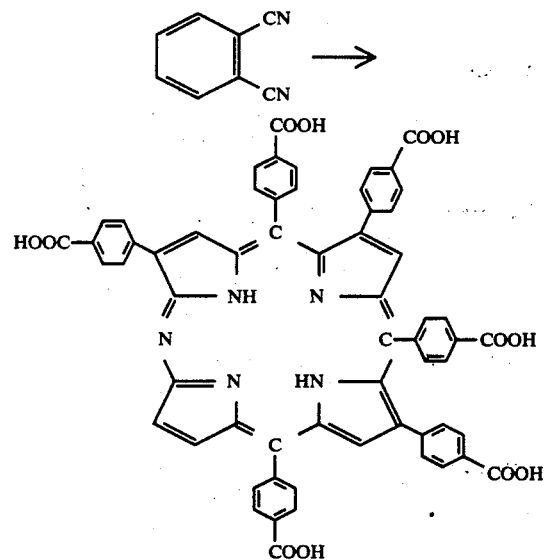

predominately
1,3,5-tri(4-carboxyphenyl)-α,β,γ-
tri(4-carboxyphenyl)-δ-aza-porphine Using mixtures of starting materials which have different solubilizing groups, followed by appropriate sequential reaction, yields corresponding porphine derivatives, which may be entirely anionic, entirely nonionic, or may be zwitterionic in nature. For example:

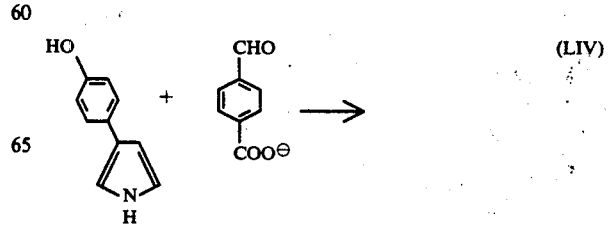 (LIV)

-continued

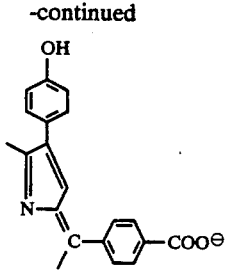

+

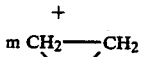

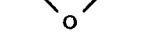

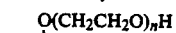

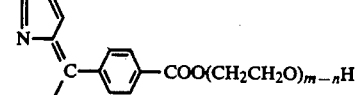

(LV)

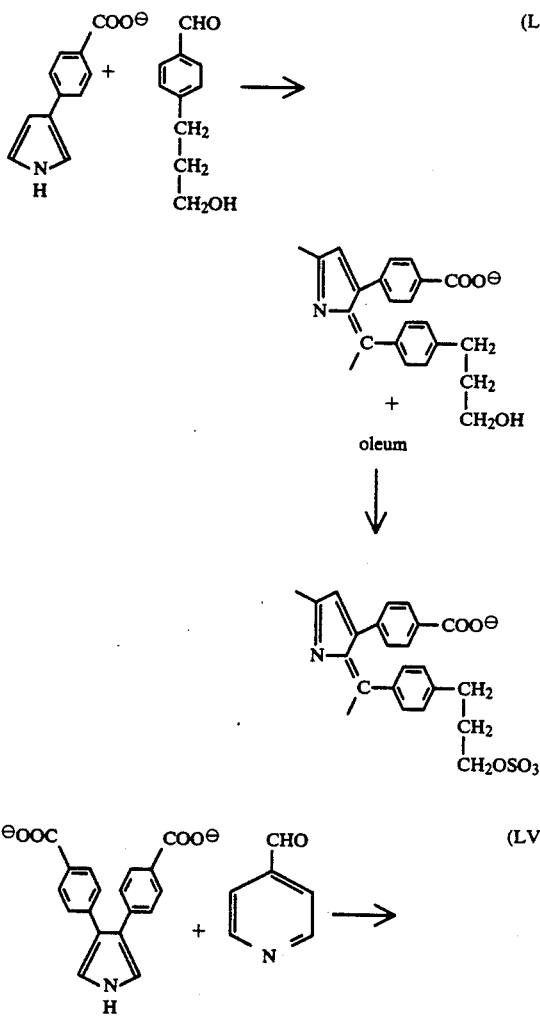

(LVI)

-continued

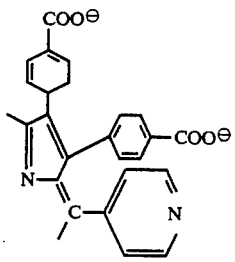

+

 CH₃I

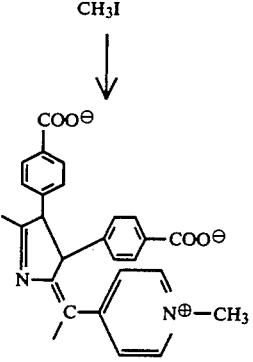

As usual, variations in starting materials make possible the preparation of aza derivatives and metallated derivatives to suit.

Remote sites are preferred for the solubilizing groups of this invention. Porphine structures solubilized at remote sites have a reduced tendency to aggregate into multilayers on fabric surfaces because they tend to have more bulk and less crystal order; hence the intensive blue/green coloration of these substances is imparted to the fabrics in reduced amount. Also, remotely solubilized porphines participate to a relatively small degree in the side reactions designated by numeral 7 on FIG. I; thus the excited singlet state of such compounds is converted more efficiently to the excited triplet state which reacts with oxygen to bring about the intended bleaching of stains. This is an economic advantage.

Porphines having remote solubilizing groups are, for example, compound XXXIV supra where n is 5 or greater; compound XXXVIII where n is 2 or greater; compound XL with 4 or more methylene groups interposed between the hydroxy group and the pyrrole ring; compound XXX with 3 or more methylene groups interposed between the pyridine and pyrrole ring; compound XXXIII with 2 or more methylene groups interposed between the meso carbon atom and the benzene ring; etc.

Especially preferred photoactivators are remotely sulfated amino sulfonyl porphines. These compounds not only have the benefits discussed supra for remotely solubilized porphines generally, but also have the added benefit of substantivity to synthetic fibers as well as cotton fibers. These compounds can be prepared by a provess involving the following sequential steps:

(1) Preparing a porphine without solubilizing groups. This step is illustrated by the preparation of all cationic porphines exemplified hereinbefore, omitting the quaternization step; and by the preparation of all hydroxy porphines exemplified hereinbefore, where the starting materials are analagous non-hydroxy-substituted compounds.

(2) Reacting with chlorosulfonic acid and thionyl chloride to form the corresponding chlorosulfonated porphine.

(3) Condensing with an amino alcohol, using an aqueous medium and a temperature at which may be at, above, or below normal ambient.

(4) Sulfonating with oleum.

Illustrative examples of this preparative method are:

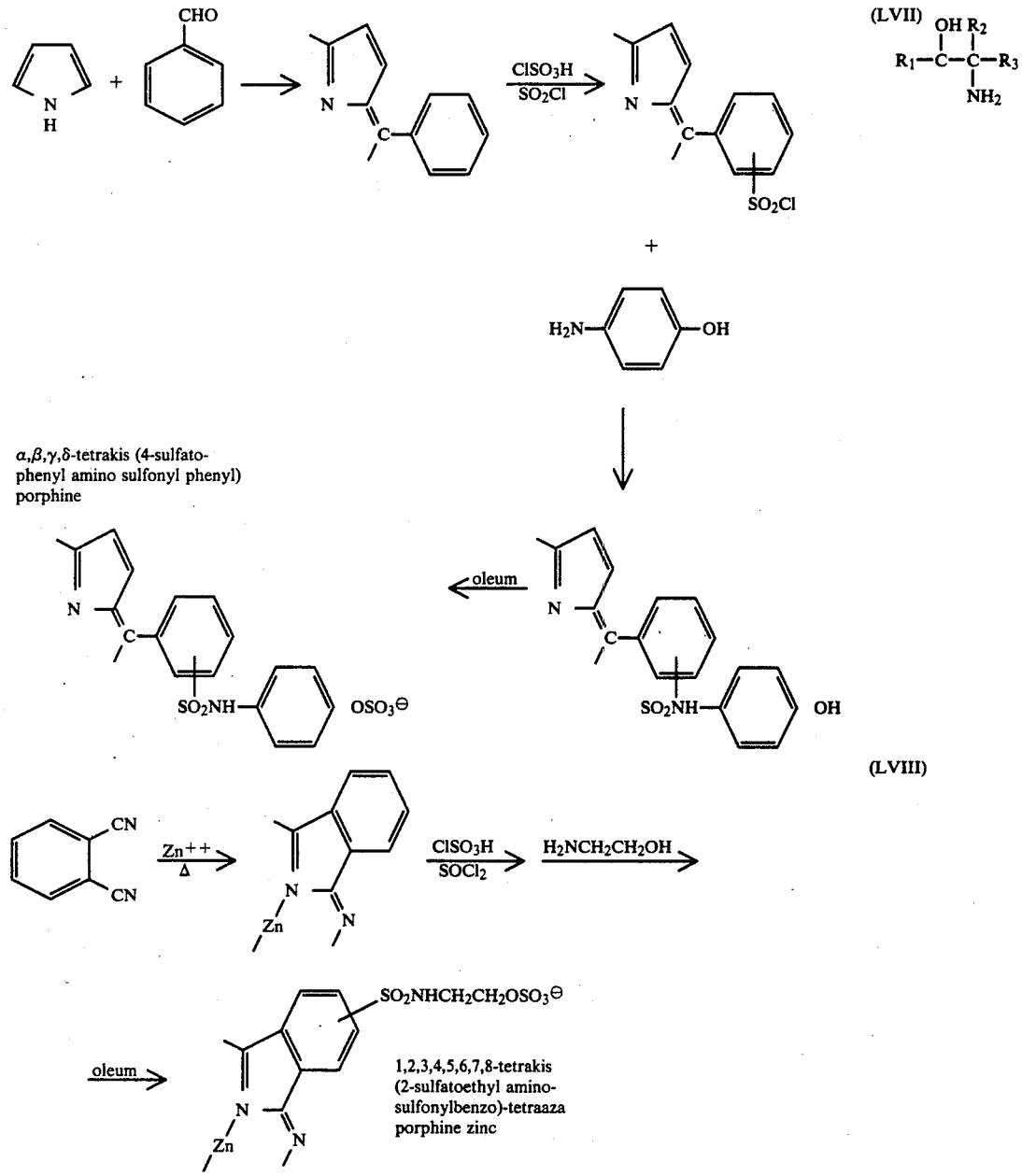

Among the amino alcohols that are operable in these reactions may be mentioned 2-amino-2-methyl-1,3-propane diol, 2-amino-2-ethyl-1,3-propane diol, tri(hydroxymethyl) amino methane, 1-amino glucose, 2-amino glucose, and 1-methylamino-2,3-propane diol.

A general method of preparing amino hydroxy alcohols is as follows, where the R's may be H, alkyl, or substituted alkyl:

The aminosulfonyl compounds discussed supra contain the

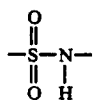

group interrupting the chain of atoms linking the —OSO$_3^\ominus$ solubilizing group and the porphine core. It is also contemplated that many other non-methylene groups can be interrupting groups, as explained hereinbefore.

Whatever the nature of the interrupting group, the solubilizing group can be any of those discussed herein. Preparative methods for such compounds fall within the ordinary skill of the art supplemented by the disclosure herein. For example,

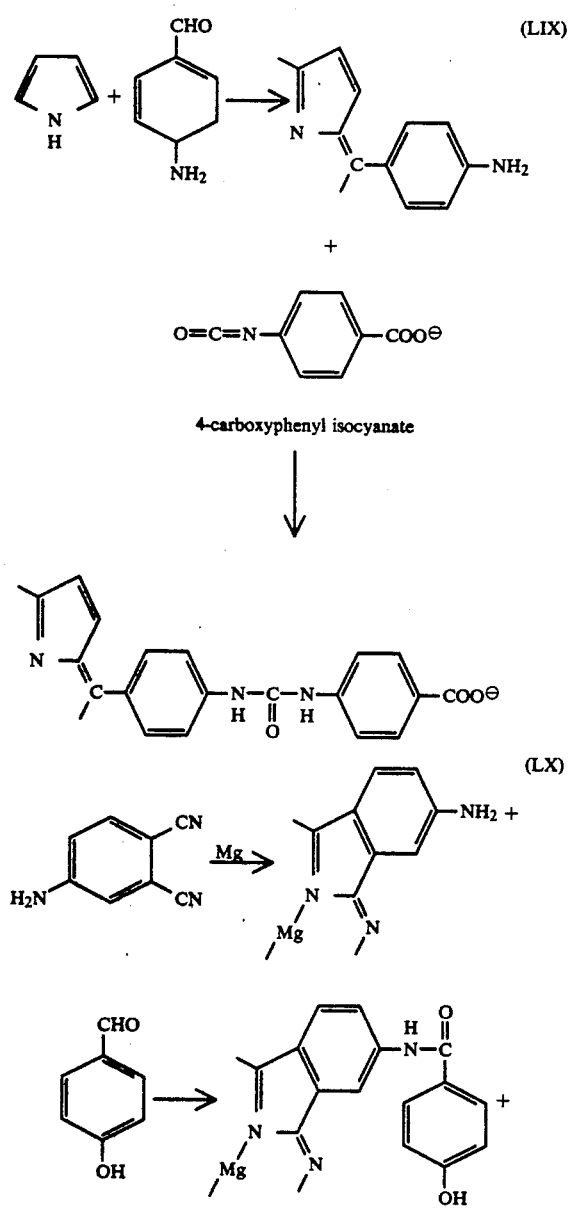

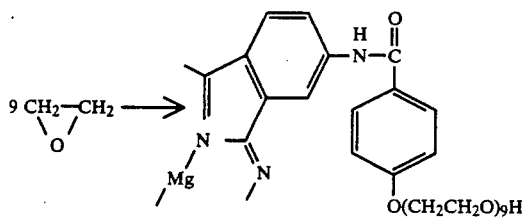

Optional ingredients of the compositions of this invention, their processes of preparation, and their methods of use are conventional in nature except for the necessary exposure to oxygen and visible light. In general, this invention in its processing aspect comprises removing stains from textiles by treating the textiles, in the presence of visible light and oxygen, with an aqueous solution of a composition of this invention.

The specific optional ingredients, processes of preparation, and methods of use are a function of the type of laundry products that are desired and the types of cationic substances that are employed. These matters will now be addressed seriatim for fabric conditioning/bleach compositions, for detergent/bleach compositions, and for germicidal/bleach compositions.

One form of fabric conditioning/bleach composition is liquid; more specifically an emulsion in water. Numerous prior art references and commercial products are in the form of liquid fabric conditioners formulated with cationic substances as their primary active ingredients. This invention in the form of a liquid fabric conditioner/bleach composition maintains the fabric softening and electrostatic control purposes and benefits, compositions, processes and uses of the prior art fabric conditioners; contributes the stain removal functions and benefits previously disclosed in the prior art as obtainable only by the use of zinc phthalcyanine sulfonate photoactivator in detergent compositions; contributes overall fabric bleaching and fugitive dye removal not disclosed by the prior art; while is able to use smaller amounts of photoactivator to accomplish these purposes and benefits because of the hereinbefore discussed interaction between photoactivator and cationic fabric conditioner.

In addition to fabric conditioner, photoactivator and water, this type of fabric conditioning/bleach product can contain minor amounts of colorants, perfumes, preservatives, optical brighteners, opacifiers, pH buffers, viscosity modifiers, fabric conditioning agents in solid form such as clay, emulsifiers, stabilizers, shrinkage controllers, spotting agents, germicides, fungicides, anti-corrosion agents, etc. Urea, protonated diethoxylated monoalkyl amine, or solvents such as alcohols, glycols and glycol ethers can be used to control physical stability and viscosity of the product.

Nonionic fabric conditioning agents can be used, if desired, together with the cationic fabric conditioners in combination with photoactivator. This category of optional ingredients includes sorbitan esters, fatty alcohols, mono- and di-glycerides containing at least one free hydroxyl group, mono- and di-ether alcohols such as glycerol-1,3-distearyl ether; and diamines.

Liquid fabric conditioner/bleach compositions of the present invention can be prepared by conventional methods. Homogenizing is not necessary. A convenient and satisfactory method is to mix the components together batchwise at about 60°-65° C., using a marine propeller for agitation. It is preferred to dilute the quaternary softeners with water before adding to the remainder of the composition. Temperature-sensitive optional components can be added after the fabric condition/bleach composition is cooled to room temperature or thereabouts.

The liquid fabric conditioning/bleach compositions of this invention are used by adding to the rinse cycle of conventional home laundry operations. Generally, rinse water has a temperature of from about 5° C. to about 60° C. The concentration of fabric conditioning/bleach composition in the rinse water is typically about 0.05 to about 0.10%, and the concentration of the cationic fabric conditioners of this invention is generally from about 2 ppm to about 200 ppm, more commonly from about 10 ppm to about 100 ppm, by weight of the aqueous rinsing bath.

It has been stated hereinbefore that photoactivator usage is from about 0.001% to about 0.5% by weight based on the fabric conditioning/bleach composition, preferably from about 0.005% to about 0.5%. Combining these figures with the foregoing concentrations of fabric conditioner/bleach composition in water yields the result that the photoactivator concentrations in water range from about 0.005 parts per million (ppm) to about 5 ppm. Within this range, from about 0.1 to about 1 ppm are preferred. The lower side of the foregoing ranges are effective especially when the fabric is exposed to photoactivator for a relatively long time, when drying takes place in brilliant sunlight, and when the photoactivator adsorbs especially well upon the fabric.

In general, laundry practice embodying the present invention in its fabric conditioning/bleach aspect comprises the following steps:
(i) washing fabrics with a detergent composition,
(ii) rinsing the fabrics,
(iii) adding during the rinsing step the above-described amounts of liquid fabric conditioner/bleach,
(iv) drying the fabrics, and
(v) providing exposure to visible light and oxygen during step (iii) or step (iv).

When multiple rinses are used, the fabric conditioning/bleach composition is preferably added to the final rinse.

Rinsing time, druing which fabrics are exposed to the photoactivated bleach solution, is typically short; often less than 10 minutes and frequently as little as 3 minutes. Inasmuch as photoactivator adsorption on the fabric is a function of time, in this type formulation it is extraordinarily important that adsorption be rapid.

It is convenient to provide light and oxygen by drying out-of-doors, especially in direct sunlight as on a clothesline. It is also possible to conduct this drying step in an illuminated dryer.

Another form of fabric conditioning/bleach composition is solid; more specifically a releasable deposition of fabric conditioner and photoactivator upon a substrate. This deposition can be primarily a coating upon the surface of the substrate or can be primarily an impregnation into the interstices of the substrate. The substrate can be a sheet of paper or of woven or nonwoven cloth or of foamed plastic.

Certain prior art references and commercial products exist in the form of cationic fabric conditioners deposited on a substrate. This invention in the form of a fabric conditioner/bleach deposited on a substrate maintains the fabric softening and electrostatic control purposes and benefits, compositions, processes and uses of the prior art articles while it contributes the stain removal, fabric bleaching and fugitive dye removal benefits of photoactivated bleach.

The substrate portion of this type of fabric conditioning/bleach product is fully described in British Patent Application Ser. No. 77-1141 filed Jan. 12, 1977, invented by Jones and U.S. Pat. No. 3,686,025 issued Aug. 22, 1972 invented by Morton, both of which are hereby incorporated herein by reference. Preferred methods of applying the fabric conditioner to the substrate are described in the above references, and the photoactivator bleach of this invention can be conveniently added by mixing with the fabric conditioner prior to application to the substrate. Preferred methods include passing the substrate through a fan or trough containing the fabric conditioner in liquid form (melted or dissolved in a solvent) followed by removal of excess liquid by squeeze-rolls, cooling or evaporation of solvent of necessary, folding, cutting, and packaging; and spraying the fabric conditioner in liquid form upon the substrate, followed by removal of excess by squeeze-rolls or a doctor-knife, cooling or solvent evaporation of necessary, folding, etc. as before.

Optional ingredients for fabric conditioning/bleach compositions applied to a substrate are generally those hereinbefore described for liquid fabric conditioning bleach compositions; of course solvents will not be needed for reasons of controlling physical stability or viscosity, but may be desired for processing reasons.

The physical dimensions of the sheet substrates herein can be varied to satisfy the desires of the manufacturer and the consumer. Convenient surface areas range from about 20 in.$^2$ to 200 in.$^2$ with the thickness of the sheet being set by the requirements of flexibility and softener loading. The amount of softener composition for purposes of supplying softener can conveniently be from about 0.2 to 16 grams on such sized sheets.

Fabric conditioning/bleach articles in substrate form can be used in the laundry rinse in the manner described hereinbefore for comparable products as liquid form. Alternatively, they can be added to a clothes dryer together with the damp fabrics to be treated. The fabric conditioning agents and the photoactivated bleach are releasd from the substrate in either the washing or the drying steps as the result of water, heat, and/or tumbling or rotating action. Exposure to visible light and oxygen are provided during the drying step, or during the rinsing step if the photoactivator is present at that time.

Detergent/bleach compositions of this invention contain a cationic surfactant and a porphine photoactivator as described hereinbefore. Such compositions maintain the cleaning purposes and benefits, compositions, processes and uses of prior art detergent compositions such as disclosed in Cockrell and Murphy cited hereinbefore; contribute stain removal, overall fabric bleaching and fugitive dye removal; and accomplish these latter purposes and benefits at lower usage levels than known heretofore because of the hereinbefore discussed interaction between photoactivator and cationic surfactant.

In addition to cationic surfactant and photoactivator, the detergent/bleach compositions of this invention optionally but preferably contain nonionic surfactants of the formula $$R(OC_2H_4)_nOH$$

wherein R is a primary or secondary alkyl chain of from about 8 to about 22 carbon atoms and n is an average of from about 2 to about 9, and wherein said nonionic surfactant has an HLB from about 5 to about 17.

As explained in Cockrell and in Murphy, these nonionic surfactants contribute substantially to the cleaning of cationic surfactants under certain conditions. Most preferred ratios of nonionic to cationic surfactant are from about 5:3 to about 300:1.

Cockrell and Murphy teach advantages for detergent compositions containing cationic and nonionic surfactants so formulated as to produce, under aqueous laundry conditions, a nonionic surfactant-rich phase boundary within about 20° C. of the desired washing temperature. When such a phase-separating composition is used together with a photoactivator to formulate a detergent/bleach composition of this invention, it is preferred that the photoactivator be solubilized by nonionic and/or cationic solubilizing groups, most preferably by cationic solubilizing groups.

Another optional but preferable component is fatty amide having the formula

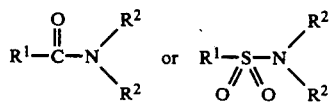

wherein $R^1$ is $C_8$–$C_{20}$ alkyl, alkenyl, alkyl phenyl or alkyl benzyl, preferably $C_{10}$–$C_{18}$ alkyl, and most preferably $C_{11}$ alkyl; and each $R^2$ is hydrogen, or $C_1$–$C_8$ alkyl or hydroxyalkyl, preferably hydrogen.

The detergent/bleach compositions of this invention should be reasonably free of anions which will render the cationic surfactant used in the composition non-dispersible in water. While this property is a function of the physical and chemical properties of each individual cationic surfactant and each individual anion, in general it can be said that it is preferred that the amounts of polyvalent anions from the following sources be limited to a total of no ore than about 4% by weight of the composition: phosphates, silicate, and polycarboxylate builder anions; carboxymethyl cellulose; and anionic surfactants.

Other components are optional, such as suds control agents, either suds builders or suds suppressors such as the long chain fatty acids disclosed in U.S. Pat. No. 3,954,347 granted on Sep. 7, 1960 to St. John, the silicone/silica mixtures disclosed in U.S. Pat. No. 3,933,672 granted on Jan. 20, 1976 to Bartolotta et al, the microcrystalline waxes disclosed in Belgian Pat. No. 824,293 granted on July 19, 1975 to Tate et al., and fatty phosphate esters such as monostearyl phosphate.

Still other optional components of the detergent/bleach compositions of this invention are bleaching agents, bleach activators, soil suspending agents, corrosion inhibitors, dyes, fillers, optical brighteners, germicides, pH adjusting agents, enzymes, enzyme stabilizing agents, perfumes, fabric softening components, static control agents, and the like. However, because of the numerous and diverse performance advantages of the compositions of the present invention separate addition of components such as static control agents, fabric softening agents and germicides will not usually be necessary.

Monovalent electrolytes can be used if desired to buffer pH, add ionic strength, control viscosity, prevent jelling, etc. Insoluble builder such as aluminosilicate, dry particulate fabric softener such as smectite clay, anti-caking agents such as benzoates and succinates, anti-redeposition agents such as carboxymethyl cellulose and polyethylene glycol, and hydrotropes such as toluene sulfonate and urea can be used to the extent that they are compatible with the cationic component of the formulation.

Granular formulations enbodying the composition of the present invention can be formed by any of the conventional techniques i.e., by slurrying the individual components in water and then atomizing and spray-drying the resultant mixture, or by pan or drum granulation of the components. A preferred method of spray drying compositions in granule form is disclosed in U.S. Pat. Nos. 3,629,951 and 3,629,955 issued to Davis et al. at Dec. 28, 1971.

Liquid detergents compositions embodying the photoactivating compositions of the present invention can contain cationic surfactants and preferably nonionic surfactants and water. They preferably contain an alkalinity source which can be inorganic such as borate or carbonate or organic such as mono-, di-, or tri-alkanolamine. They can contain a solubilization system containing various mixtures of water, lower alcohols and glycols, and hydrotropes; and can contain a detergency builder. They can be homogeneous single-phase compositions or in multi-phase heterogeneous form which can contain viscosity modifiers and stabilizers to maintain stable emulsions or suspensions.

Compositions of this invention in the form of detergent laundry bars can be prepared as described in U.S. Pat. No. 3,178,370 issued Apr. 13, 1965 and British Pat. No. 1,064,414 issued Apr. 5, 1967, both to Okenfuss and both herein incorporated by reference. A preferred process, called "dry neutralization", involved spraying the surfactant in liquid, acid form upon an agitated mixture of alkaline components such as phosphates and carbonates, followed by mechanically working as by milling, extruding as in a plodder, and forming into bars.

The detergent/bleach compositions of this invention can be incorporated if desired into substrate articles in the manner hereinbefore described for fabric conditioning/bleach compositions. These articles consist of a water-insoluble substrate which releasably incorporates an effective amount, preferably from about 3 to about 120 grams, of the detergent compositions described herein, plus an effective amount of photoactivating bleach as described herein.

Detergent/bleach formulations embodying the compositions of the present invention are commonly used in laundry practice at concentrations from about 0.1 to about 0.6 weight percent in water. Within these approximate ranges are variations in typical usage from household to household and from country to country, depending on washing conditions such as the ratio of fabric to water, degree of soiling of the fabrics, temperature and hardness of the water, method of washing whether by hand or by machine, specific formulation employed, etc.

It has been stated hereinbefore that photoactivator usage is from about 0.005% to about 0.5% by weight based on the detergent/bleach composition, preferably from about 0.01% to about 0.1%. Combining those figures with the foregoing concentrations of detergent/bleach composition in water yields the result that photoactivator concentrations in water range from about 0.05 parts per million (ppm) to about 30 ppm. Within this range, from about 0.25 to about 5 ppm is preferred. The lower side of the foregoing ranges are especially effective when the laundry process involves exposing fabric to photoactivator for a relatively long time as for example during a 30 to 120 minute presoak followed by a 20 to 30 minute wash, and drying the fabric in brilliant sunlight. The higher side of the foregoing ranges may be needed when the laundry process involves exposing fabric to photoactivator for a relatively short time, as for example during a short 10 minute wash, followed by drying in an illuminated dryer, on a line indoors, or outdoors on a cloudy day. While exposure to oxygen and visible light are essential, the source, intensity and duration of exposure of the light affect merely the degree of bleaching achieved.

In general, laundry practice embodying the present invention in its detergent/bleach aspect comprises the following steps: (i) washing fabrics with a detergent/bleach composition, (ii) rinsing the fabrics, (iii) drying the fabrics, and (iv) providing exposure to visible light and oxygen during any of steps (i), (ii), or (iii). These steps are appropriate whatever physical form of detergent bleach may be employed (e.g. granule, liquid, bar, substrate) and whatever means of exposure to light and oxygen are employed (e.g. outdoor washing, outdoor drying, illuminated washing machine, illuminated dryer).

Germidical/bleaching compositions of this invention can be prepared by mere addition of the essential components to water, followed by mixing. Product concentrations can be as high as about 30% by weight, while use concentrations are typically in the range of 10–1000 ppm, preferably 50–500 ppm. The use of solvents to promote product stability, the selection of individual germicides and photoactive bleaches and the selection of appropriate use concentrations and methods of use of germicide and bleach, are all matters within the capability of a skilled artisan. The disclosures of the Shelton, Marks and Stayner references cited hereinbefore are typical of the many references that may assist in the formulation and use of such compositions.

EXAMPLE I

A photoactivator of this invention, tetra(sulfobenzo) tetraaza porphine zinc, tetrasodium salt [zinc phthalocyanine tetrasulfonate-Na salt] was prepared by condensing phthalonitrile and zinc dust in the presence of Zn and molybdic acid, followed by sulfonation with oleum according to the method of Japanese OPI No. 50-113,479 and Belgian Pat. No. 840,348 cited hereinbefore.

More specifically, 64 parts of phthalonitrile, 8 parts of zinc dust, and 1 part of molybdic acid were reacted in 400 parts of ethylene glycol at 195° C. for 2 hours, yielding 55 parts of zinc phthalocyanine [77% yield, >98% pure].

Sulfonation was accomplished by reacting 1 part of zinc phthalocyanine with 5 parts of 20% oleum for 4 hours at 100°–120° C., followed by addition of 25 parts cold water and NaOH sufficient to neutralize to pH 7. Composition of the resultant product on a dry basis was zinc phthalocyanine sulfonate 7.0%; organic by-products 12.9%; and sodium sulfate 80.1%.

The zinc phthalocyanine sulfonate level was determined spectrophotometrically using absorption at 667 nm and an extinction coefficient of $2.03 \times 10^5$, and also by zinc analysis. The organic by-products were identified by high pressure liquid chromatography and mass spectrocopy to be predominantly 4-sulfophthalic acid, 4-sulfophthalimide, phthalic acid, and the two isomers of 4-sulfophthalamic acid. Sodium sulfate was determined gravimetrically after extraction of the organic component with methanol.

The zinc phthalocyanine sulfonate was formulated with cationic fabric softening/antistat agent into the following fabric conditioning/bleach composition in the form of a stable aqueous emulsion, Composition A as defined on Table I.

TABLE I

| Component | Weight Percent | | |
|---|---|---|---|
| | Composition A | Composition B | Composition D |
| Zinc phthalocyanine sulfonate-Na$_4$ salt | 0.73 | — | 0.18 |
| Ditallowdimethylammonium chloride | 5.25 | 5.25 | 5.25 |
| Nonionic emulsifier* | 0.50 | 0.50 | 0.50 |
| Color, perfume, and optical brightener | — | 0.473 | — |
| Water | balance | balance | balance |
| | 100.0 | 100.0 | 100.0 |

*Equal parts of C$_{12-13}$ fatty alcohol condensed with 3 moles of ethylene oxide per mole of alcohol and C$_{13-15}$ fatty alcohol condensed with 12 moles of ethylene oxide per mole of alcohol.

Other compositions used in the comparative tests of Example I were Composition [B], a commercial liquid fabric softener/antistat agent; and Composition [C], a granular detergent composition free from bleaches and optical brighteners which has a pH at use concentration in water of about 10.2 and is defined on Table II.

TABLE II

| Component | Wt. % Composition[C] |
|---|---|
| C$_{12}$ branched chain alkyl benzene sulfonate | 20 |
| Sodium tripolyphosphate | 28 |
| Sodium toluene sulfonate | 2 |
| Silicate solids (2.0 ratio SiO$_2$/Na$_2$O) | 5.4 |
| Sodium sulfate | 34 |
| Sodium carbonate | 0.17 |
| Sodium carboxymethyl cellulose | 0.45 |
| Perfume | 0.1 |
| Optical brightener | [none] |
| Miscellaneous | 1.38 |
| Moisture | 8.5 |
| Total detergent | 100.00 |

A commercial washing machine was used for testing, specifically a Mexican General Electric CONDESA wringer type machine having an agitator speed of 25 cycles per minutes and a recommended capacity of 16.5 U.S. gallons Water had a hardness of 9 grains per gallon, with a 3/1 ratio of Ca$^{++}$ to Mg$^{++}$. Cloth load consisted of 12 cotton terry bath towels and 48 cotton muslin swatches which has been stained by passing through a boiling bath of tea followed by squeezing, drying and aging. The entire cloth load was washed for 10 minutes in a 0.25% concentration of Composition [C] at 75° F. Six bath towels and 24 swatches were removed. [Treatment (1): washing only]. The remaining 6 towels and 24 swatches were rinsed for 3 minutes in the washing machine in a solution of 51 liters of water and 28 grams of Composition [A], which represents a concentration of 4 parts per million (ppm) zinc phthalocyanine sulfonate-Na$_4$ salt and 28.8 ppm. ditallowdimethyl

EXAMPLE III

α, β, γ, δ-tetrakis (4-N-methyl pyridyl) porphine, tetra (4-toluene sulfonate) salt was prepared as follows: a propionic acid solution, 0.24 molar in both pyridine 4-carboxaldehyde and pyrrole, was refluxed for 45 min. The solvent was flashed off and the residue was washed with dimethylformamide to dissolve the tarry by-products leaving purple crystals of tetra (4-pyridyl) porphine. Yield was 22.5% and the product spectral characteristics were is substantial agreement with those observed by Fleisher, Inorg. Chem. 1, 493(1962).

The tetra (4-pyridyl) porphine (0.25 mol) was then refluxed with sodium 4-toluene sulfonate (1.1 mol) overnight in dimethyl formamide. The reaction was then cooled in an ice bath and the product was removed by filtration. The collected violet crystals of α, β, γ, δ-tetra (N-methyl pyridyl) porphine, tetra 4-toluene sulfonate salt were washed with acetone and dried under vacuum. Yield was 92%. Spectral analysis in water at pH 6–7 on a Cary 14 spectrophotometer agreed very well with published data, Pasternack et al., J. Amer. Chem. Soc., 94, 4511(1972):

| Wave length | λ(nm) | 422 | 518 | 551 | 585 | 641 |
|---|---|---|---|---|---|---|
| Extinction coefficient | log | 5.17 | 3.96 | 3.83 | 3.57 | 3.07 |

Elemental analysis yielded the following calculated and found values for the empirical formula $C_{72}H_{66}N_8S_4O_{12}$:

|  | C | H | N | S |
|---|---|---|---|---|
| Calc: | 63.42 | 4.88 | 8.22 | 9.41 |
| Found: | 63.15 | 5.03 | 8.41 | 9.14 |

Metallation was accomplished in a manner similar to that described above for the tetracarboxy porphine of Example 1, with purification accomplished by chromatograhic chloroform solutions on alumina. The metallation was done prior to quaternization with 4-toluene sulfonate.

α, β, γ, δ- tetrakis (4-N-methylpyridyl) porphine, tetra (4-toluene sulfonate) salt, unmetallated metallated with aluminum and metallated with calcium, are effective photoactivated bleaches. Each is formulated into detergent/bleach, softener/bleach, and germicide/bleach compositions of this invention by mixing with coconut alkyl trimethyl ammonium chloride, 1-methyl-1-[(palmitoylamide)ethyl]-2-octadecyl-4,5-dihydroimidazolinium chloride, and N-dodecyl-N-methyl morpholinium methyl sulfate, respectively.

EXAMPLE IV

Tetra (2-sulfatoethyl sulfonamido benzo) tetraaza porphine zinc, tetra sodium salt was prepared as follows: twenty parts of tetrasulfo tetrabenzo tetraaza porphine zinc, tetrasodium salt were added to 200 parts of chlorosulfonic acid with agitation and the mixture is heated to 60° C. At this temperature, 30 parts of thionyl chloride were added dropwise and the mixture was then heated for 4 hours at 80° C. The reaction mixture was then cooled and added with agitation to 200 parts of cold water from which the tetrachloro sulfo tetrabenzo tetraaza porphine zinc was separated by filtration and subsequently washed with 1000 parts of cold water. The tetrachlorosulfo tetrabenzo tetraaza porphine paste was then suspended in 300 parts of cold water and mixed with 30 parts of 2-aminoethanol for 20 hours at 20° C. The suspension was then acidified with hydrochloric acid to obtain a precipitate which was separated by filtration, washed with water and dried. Twenty parts of the already obtained ethanolsulfonamide derivative of tetrabenzo tetraaza porphine zinc were then mixed for 12 hours at 20° C. with 100 parts of 10% oleum. The solution was then poured in a solution of 100 parts of sodium chloride into 1700 of water, and 400 parts of ice were added. A blue/green precipitate was formed and was separated by filtration and was washed with a solution of sodium chloride in water and ethyl alcohol until it was neutral to Congo red. The blue/green powder obtained was then dried at 105° C. for 2 hours. The product was purified by six successive precipitations from aqueous solution by the addition of four volumes of acetone. Yield was 28%.

Substitution on all sulfo groups was confirmed by the chromatographic techniques described in Japanese patent application laid open to the public as OPI No. 50–113,479 on Sept. 5, 1975 which corresponds to U.S. Ser. No. 419,320 filed Nov. 27, 1973.

Examination of the spectrum of 1, 2, 3, 4, 5, 6, 7, 8 - tetrakis (2-sulfato-ethyl sulfonamido benzo) α,β,γ,δ-tetraaza porphine zinc, tetrasodium salt, in $H_2O$ at pH 9.5, using a Cary 14 spectrophotometer, yielded the following results:

| Wave length | λ (nm) | 686 | 672 | 653 |
|---|---|---|---|---|
| Extinction coefficient | log | 4.46 | 4.64 | 3.91 |

Analysis of the zinc content by atomic absorption yielded 4.32% zinc vs. 4.40% theoretical on the basis of the empirical formula $C_{40}H_{36}H_{12}S_8O_{22}ZnNa_4·2H_2O$.

Tetra (2-sulfatoethyl sulfonamido benzo) tetraaza porphine zinc, tetrasodium salt is an effective photoactivated bleach in detergent/bleach, softener/bleach, and germicide/bleach compositions when formulated with appropriate cationic substances.

EXAMPLE V

Tetrabenzo triaza porphine was prepared as follows: A solution of methyl magnesium iodide was prepared from 2.4 gm. of magnesium and 6.5 ml. of methyl iodide in 100 ml. of ether; this was decanted from the residual metal and added to a mixture of 12.8 gm. of finely powdered phthalonitrile and 50 ml. of ether. Upon addition, the liquid at once turned reddish-brown, the nitrile dissolving, the ether gently boiling, and a tarry mass forming. After three hours at room temperature, the remainder of the ether was removed on a steam bath and the tarry residue was rapidly heated to 200° C. Three ml. of $H_2O$ were added dropwise, liberating first white fumes and then iodine vapor. After a further ½ hour at 200° C., the powdery residue was cooled, crushed and repeatedly extracted with a mixture of alcohol and 10% concentrated hydrochloric acid until the extract was no longer brown in color. The residue was then washed with 500 ml. of absolute ethanol and dried in an oven at 105° C. for one hour. The product was freed from magnesium by dissolving it in concentrated sulfuric acid (150 ml.), followed by filtration and precipitation of the pigment with ice. The green precipitate was then collected on a filter and was washed with ammonium chloride. [Treatment (2): washing plus rinsing in a composition of this invention.]

A second, comparable, cloth load was similarly washed. After removal of 6 towels and 24 swatches as before [Treatment (1): washing only, duplicate], the remaining 6 towels and 24 swatches were rinsed as before except in commercial fabric softener Composition [F] at a strength providing, as before, 28.8 ppm ditallowdimethyl ammonium chloride. [Treatment 3: washing, plus rinsing in commercial softener].

After completion of the treatments described above, all towels were dried in an automatic dryer and all stained swatches were dried out-of-doors on a sunlit clothesline.

The whiteness of the tea-stained swatches were measured before and after each of the 4 treatments described above, and their increase in whiteness corresponding to stain removal was measured on a Gardner XL-10 using the following equation:

$$\Delta W = 100 - \sqrt{(100 - L)^2 + a^2 + b^2}$$

Softness of the towels was graded by a panel of expert judges and graded on a 9-point Scheffé scale. Results were as follows:

TABLE III

| Treatment No. | Stain Removal ($\Delta W$) | Softness (Panel score units) |
|---|---|---|
| 1 | 5.7 | −0.5 |
| 2 | 9.9 | +0.5 |
| 1(dup.) | 4.8 | −0.6 |
| 3 | 5.3 | +0.6 |
| 90% LSD | [1.0] | [0.4] |

The numerical results above show that significant stain removal as well as softening was accomplished by the fabric conditioning/bleach compositions of this invention. Subjectively, both of these benefits were considered large. However, it was also observed that, before drying, the damp towels of Treatment 2 had a strong blue/green hue, which hue had disappeared after drying. This test had used a concentration of photoactivator considered appropriate when used in combination with an anionic detergent composition typical of the prior art.

Another test was run to test for stain removal effectiveness at a lower concentration of photoactivator when used in the presence of a cationic substance.

The test described above was repeated with the following results, while [Treatment 2' is used to designate washing plus rinsing with Composition [D]] instead of Composition [A], with all other factors held constant:

TABLE IV

| Treatment No. | Stain Removal ($\Delta W$) | Softness (Panel score units) |
|---|---|---|
| 1 | 2.8 | −1.3 |
| 2' | 4.7 | +0.6 |
| 1(dup.) | * | * |
| 3 | * | +0.7 |
| 90% LSD | [0.9] | [0.5] |

*not measured

These numerical results show that significant stain removal and softening was accomplished by extremely low levels of photoactivator. Subjectively, no appreciable blue/green hue was observed on the damp towels before drying.

Zinc phthalocyanine tetrasulfonate is also an effective photoactivating bleach when formulated with distearyl dimethyl ammonium chloride into a detergent/bleach composition and when formulated with N-octyl picolinium bromide into a germicidal/bleach composition.

EXAMPLE II $\alpha$, $\beta$, $\gamma$, $\delta$- tetrakis (4-carboxypheny) prophine was prepared by refluxing a propionic acid solution, 0.24 molar in both 4-carboxybenzaldehyde and pyrrole, for 2 hours. Upon cooling the reaction mixture, purple crystals of $\alpha$, $\beta$, $\gamma$, $\delta$- tetrakis (4-carboxyphenyl) porphine precipitated. Yield was 32%. The product was purified by recrystallization from methanol/chloroform solutions.

The foregoing method of preparation is similar to that described by Longo et al., J. Heterocyclic Chem. 6, 927(1969) and the following spectral analysis performed on a Cary 14 spectrophotometer in pyridine solution agree very well with Longo's and Datta-Gupta's findings, J. Heterocyclic Chem. 3, 195(1966):

| Wave length | $\lambda$(nm) | 423 | 517 | 552 | 591 | 646 |
|---|---|---|---|---|---|---|
| Extinction coefficient | log | 5.25 | 4.15 | 3.85 | 3.65 | 3.48 |

Metallation was accomplished as follows: one gram of tetrakis(4-carboxyphenyl) porphine was reacted with a 10% excess of zinc acetate in refluxing dimethyl formamide for one hour. After completion of the reaction, the solvent was removed on a vitoperator to obtain a residue. This residue was dissolved in water, acidified to pH 3, and passed through the H$^\gamma$ form of the cation exchange resin Dowex 5DW-X8 (50–100 mesh) to remove the excess ionic zinc. The residue after evaporation yielded a red crystalline product with about 98% yield. Spectral analysis on a Cary 14 spectrophotometer in methanol agreed very well with published date for $\alpha$, $\beta$, $\gamma$, $\delta$- tetrakis (4 carboxyphenyl) porpine zinc, Longo et al., J. Heterocyclic Chem. 6, 927(1969):

| Wave length | $\lambda$(nm) | 429 | 517 | 556 | 596 |
|---|---|---|---|---|---|
| Extinction coefficient | log | 5.54 | 3.46 | 4.15 | 3.75 |

The acid form of photoactivator, prepared as described above, was converted to the tetra sodium salt upon addition to alkaline (pH ~ 10) detergent solution, the cations of which were predominantly sodium.

$\alpha$, $\beta$, $\gamma$, $\delta$-tetrakis (4-carboxyphenyl) porphine tetrasodium salt, both unmetallated and metallated with zinc, are effecive photoactivated bleaches. Each is formulated into detergent/bleach, softener/bleach, and germicide/bleach compositions of this invention by mixing with myristoyl choline ester quaternary ammonium chloride, palmityl trimethyl ammonium bromide, and N-lauryl-N-dimethyl-N-benzyl ammonium hydroxide, respectively.

hot water containing 5% ammonium hydroxide. It was then dried at 105° C. and crystallized from chloronaphthalene. Yield was 4.2 gm. of tetrabenzo triaza porphine in the form of purple needle-like crystals.

Elemental analysis of the product yielded the following results:

|  | %C | %H | %N |
|---|---|---|---|
| $C_{33}H_{19}N_7$ requires: | 77.2 | 3.7 | 19.1 |
| found: | 77.3 | 3.6 | 19.3 |

A quantitative examination of the spectrum of the pigment in chloronaphthalene, using a Cary 14 spectrometer, gave the following results:

| Wave length | $\lambda$ (nm.) | 694 | 652 | 638 | 622 | 592 | 570 |
|---|---|---|---|---|---|---|---|
| Extinction coef. | log. $\epsilon$ | 5.19 | 5.03 | 4.75 | 4.66 | 4.43 | 4.03 |

The foregoing method of preparation is similar to that described in Barrett et al, J. Chem. Society, pages 1809–1820, and the spectrum reported above is identical to that found by Barrett.

Tetrabenzo triaza porphine was metallated to tetrabenzo triaza phorphine zinc by the following process: 200 ml. of reagent grane N,N' dimethylformamide was brought to reflux in a 2 l. flask on a stirring hot plate. Tetrabenzo triaza porphine (2 gm.) was then added, 1 minute allowed for complete solution to occur, and then a 10% excess of the stoichiometric amount of zinc acetate was added (0.86 gm.) and reaction was allowed to proceed under reflux for one hour. The reaction vessel was then removed from the hot plate and cooled in an ice-water bath for 15 minutes. 200 ml. of chilled distilled water was then added, and the resulting partially crystalline precipitate was filtered, washed with water, and air-dried. The product was then recrystallized from chloronaphthalene. Yield was 1.9 gm. in the form of purplish crystals.

Elemental analysis yielded the following results:

|  | %C | %H | %N |
|---|---|---|---|
| $C_{33}H_{17}N_7Zn$ requires: | 68.8 | 2.95 | 11.4 |
| found: | 69.2 | 3.10 | 11.1 |

A quantitative examination of the spectrum of tetrabenzo triaza porphine zinc in chloronaphthalene, using a Cary 14 spectrometer, gave the following results.

| $\lambda$ (nm): | 677 | 654 | 625 | 614 | 599 |
|---|---|---|---|---|---|
| log $\epsilon$ | 5.24 | 5.05 | 4.42 | 4.43 | 4.39 |

These values compare very well with the results of Barrett et al, op, cit.

Sulfonation of tetrabenzo triaza porphine zinc led to the compound tetrasulfobenzo triaza porphine, tetrasodium salt, with demetallation occurring simultaneously: One gram of tetrabenzo triaza porphine zinc and 20 ml. of concentrated $H_2SO_4$ were ground into a homogeneous paste with a mortar and pestle. The paste was then transferred to a 250 ml. beaker and 50 additional ml. of concentrated $H_2SO_4$ were admixed. The mixture was then heated on a steam bath for 4 hours, removed and allowed to stand at room temperature for 48 hours, and filtered to remove unreacted pigment. The filtrate was then diluted with two volumes of $H_2O$ to precipitate the bright green $HSO_4^-$ salt of the sulfonated material, which was filtered and washed with acetone and then dissolved in alkaline methanole (5% NaOH in $CH_3OH$). The sulfonated porphine was then precipitated as the sodium salt by addition of 3 volumes of acetone. After the product was then dried, it was extracted with hot methanol to remove $Na_2SO_4$ residues. After extraction, the porphine was dissolved in $H_2O$, acidified to pH 3, and passed through the H+ form of the cation exchange resin Dowex 50W-X8 (50–100 mesh) to remove ionic zinc. Pure tetrasulfobenzo triaza porphine in the form of a fine green powder was then isolated from a pH 5 solution by the addition of four volumes of acetone.

Elemental analysis yielded the following results:

|  | %C | %H | %N | %S |
|---|---|---|---|---|
| $C_{33}H_{15}N_7S_4O_{12}Na_4$ requires: | 42.99 | 1.63 | 10.64 | 13.91 |
| found: | 43.2 | 1.69 | 10.68 | 13.76 |

The absence of zinc was verified by atomic absorption spectroscopy. Tetrasulfonation was confirmed by the chromatographic techniques described in Japanese patent application laid open to the public as OPI No. 50-113,479 on Sept. 5, 1975 which corresponds to U.S. Ser. No. 419,320 filed Nov. 27, 1973.

Examination of the spectrum of tetrasulfobenzo triaza porphine, tetrasodium salt, in $H_2O$ at pH 9.5, using a Cary 14 spectrometer, yielded the following results:

| $\lambda$ (nm): | 694 | 666 | 645 | 634 | 618 | 589 |
|---|---|---|---|---|---|---|
| log $\epsilon$: | 4.56 | 5.15 | 4.92 | 4.63 | 4.24 | 3.71 |

Tetrasulfobenzo triaza porphine, tetrasodium salt is an effective photoactivated bleach in detergent/bleach, softener/bleach, and germicide/bleach compositions when formulated with appropriate cationic substances.

EXAMPLE VI

Tetra(4-sulfophenyl) porphine, tetraammonium salt was prepared as follows: Two grams of tetraphenyl porphine, obtained from the Aldrich Chemical Company, Milwaukee, Wisconsin, U.S.A., was sulfonated in the manner described in Example I for tetrabenzo triaza porphine with the exception that neutralization was done with methanolic ammonia (5%). Yield was 2.5 gm. of tetra(4-sulfophenyl) porphine tetraammonium salt. Confirmation that the porphine was tetrasulfonated was obtained through the chromatographic technique described above. Confirmation that the sulfonations took place in the 4 position was done by nuclear magnetic resonance (nmr): the nmr spectrum of the sulfonated compound in $D_2O$ shows an absorption due to the pyrrole protons at $\tau=2.19$ referred to a 3(trimethilsylyl) propane sulfonic acid reference, and two doublets due to the phenyl protons centered at $\tau=2.79$ and 1.81 with a coupling between them of 8 cps. The integrated area of the phenyl protons to pyrrole protons gave the expected 2:1 ratio.

Further confirmation of the purity of the material was done by spectral analysis on a Cary 14 spectrometer:

| λ (nm) | 411 | 515 | 552 | 580 | 633 |
|---|---|---|---|---|---|
| Log ε | 4.72 | 3.21 | 2.82 | 2.79 | 2.57 |

The foregoing method of preparation is similar to that described in Fleisher, J. Amer. Chem. Soc. 93, 3162 (1971), and the spectrum reported above agrees very well with that found by Fleisher.

Metallation was accomplished in a manner similar to that described in Example I. One gram of tetra(4-sulfophenyl) porphine, tetraammonium salt was reacted with a 10% excess of xinc acetate in refluxing dimethyl formamide for one hour. However isolation of the product was accomplished by a different procedure. After completion of the reaction, the solvent was removed on a rotavaporator to obtain a residue. This residue was dissolved in water, acidified to pH 3, and passed through the H+ form of the cation exchange resin Dowex 50W-X8 (50–100 mesh) to remove the excess ionic zinc. As the solution passed through the resin, it was immediately neutralized with sodium hyroxide to avoid decomosition of the acidic compound to zinc ions and the unmetallated porphine sulfonate. Yield was 0.96 g. tetra(4-sulfophenyl porphine zinc, tetrasodium salt.

Spectral analysis yielded the following results:

| λ (nm) | 517 | 557 | 595 | 630 |
|---|---|---|---|---|
| Log ε | 2.88 | 3.28 | 2.84 | 1.81 |

Analysis of the zinc content by atomic absorption yielded 6.47% zinc vs. 6.50% theoretical on the basis of the empirical formula $C_{44}H_{28}N_4S_4O_{14}ZnNa_4$ which includes 2 moles of water of hydration.

Tetra(4-sulfophenyl) porphine, tetraamonium salt and its metallated derivative tetra(4-sulfophenyl) porphine zinc, tetrasodium salt are effective photoactivated bleaches in detergent/bleach, softener/bleach, and germicide/bleach compositions when formuated with appropriate cationic substances.

EXAMPLE VII

A number of exemplary compositions of this invention are identified on Table V. All contain photoactivators of this invention and all contain cationic substances of this invention.

Those compositions, the cationic substance of which is fabric softener, are tested in the manner described in Example I. Fabrics are rinsed in laundry baths containing 50 ppm of each composition, and are dried on a clothesline in direct sunlight. In comparison with fabrics rinsed in comparable compositions except for the absence of photoactivator, tested fabrics are equally soft and static-free, while whiteness in each instance is improved by bleaching, especially of stains and fugitive dyes.

Those compositions, the cationic substance of which is surfactant, are tested by washing fabrics in laundary baths containing 0.5 weight percent of each composition, rinsed in plain water, and dried on a clothesline in direct sunlight. In comparison with fabrics washed in comparable compositions except for the absence of photoactivator, the whiteness of test fabrics is in each instance improved by bleaching, especially of stains and fugitive dyes.

Those compositions, the cationic substance of which is germicide, are tested by rinsing articles containing 30 ppm of each composition, and are dried in direct sunlight. In comparison with comparable articles rinsed in comparable compositions except for the absence of photoactivator, test articles are equally germ-free, while whiteness is in each instance improved by bleaching, especially of stains and fugitive dyes.

It will be appreciated that, because many cationic substances exhibit both or all of these separate properties, test fabrics in certain instances are not only bleached but also cleaned and/or softened and/or rendered more free from germs.

Compositions specified to be in substrate form comprise the compositions as defined on Table V impregnated on a towel as follows: An 8"×11" sheet of a Scott 8050 Industrial towel, having an air permeability of about 13.0 cu. ft./min/sq.ft., a basis weight of about 77.5 gm./sq.yd., and a thickness of 44 mils, is impregnated with about 50 grams of composition.

An alternative method of making an article having comparable performance is as follows: An 11"×11" sheet of melt-blown polypropylene, having a thickness of about 29 mils, a basis weight of about 58.5 gms./sq.yd., and an air permeability of about 66 cu.ft./min.sq.ft. is coated one one side with about 60 grams of composition; an identical substrate sheet is placed over the coated sheet; and the edges of the two substrates are heat-sealed to enclose the composition within the article.

TABLE V

| Composition No. | Prod Product Form | Photo-Activator | Cationic Substance Softener | Surfactant | Germicide | Water | Other Components | | | | |
|---|---|---|---|---|---|---|---|---|---|---|---|
| 1 | liquid | 0.001% pa | 4% ca | | | balance | 2% | ov | | | |
| 2 | granule | 0.001 pa | | 3% ca | | 8% | 50 | ob 6% | oj 0.2% | on | |
| | | | | | | | 15 | og bal. | oh 2 | oo | |
| 3 | liquid | 0.001 pG | | | 3% cu | balance | 0.1 | ov | | | |
| | | 0.001 pt | | | | | | | | | |
| 4 | substrate | 0.005 pk | 12 cb | | | balance | 0.2 | on 3 | ov | | |
| 5 | liquid | 0.005 pC | | 6 cd | | 0 | bal | oa | | | |
| 6 | granule | 0.008 pf | | 4 ck | | 10 | 20 | ok 1 | om 1 | oo | |
| | | | | | | | 4 | od bal. | og 0.1 | og | |
| 7 | liquid | 0.003 pJ | 6 cc | | | balance | 3 | ov | | | |
| | | 0.007 pw | | | | | | | | | |
| 8 | bar | 0.010 po | | 2 co | | 3 | 6 | od 10 | ok 30 | og | |
| | | | | 2 ce | | | 5 | oj 1 | ol bal. | ow | |
| 9 | substrate | 0.02 pH | 10 cd | | | balance | 2 | ov | | | |
| | | | | | | | 2 | ow | | | |
| 10 | liquid | 0.02 pc | | | 4 cm | balance | | | | | |
| 11 | substrate | 0.02 ph | | 3 cc | | 5 | 15 | oi 0.2 | on | | |
| | | | | 2 cp | | | bal. | oa 0.01 | or | | |

TABLE V-continued

| Composition No. | Prod Product Form | Photo-Activator | | Cationic Substance Softener | | Surfactant | | Germicide | | Water | | Other Components | | | | | | |
|---|---|---|---|---|---|---|---|---|---|---|---|---|---|---|---|---|---|---|
| 12 | liquid | 0.02 | pp | 3 | ce | | | | | balance | | 0.1 | oh | | | | | |
|  |  | 0.01 | px | | | | | | | | | 4 | ov | | | | | |
| 13 | liquid | 0.03 | pD | | | 4 | cb | | | 0 | | 15 | oi | 0.1 | or | | | |
|  |  |  |  | | | 4 | cf | | | bal. | | oa | 0.2 | oq | | | | |
| 14 | liquid | 0 03 | pn | | | | | 10 | cn | balance | | | | | | | | |
| 15 | substrate | 0.04 | pg | 4 | cf | | | | | balance | | 10 | ot | | | | | |
| 16 | bar | 0.02 | pI | | | 8 | cb | | | 7 | | 4 | oe | 20 | ow | | | |
|  |  | 0.02 | py | | | | | | | 5 | | oj | bal. | oh | | | | |
| 17 | liquid | 0.04 | pl | 6 | cg | | | | | balance | | 0.1 | or | | | | | |
|  |  |  |  | | | | | | | | | 3 | ov | | | | | |
| 18 | liquid | 0.05 | pF | 10 | ch | | | | | balance | | 0.1 | on | | | | | |
|  |  |  |  | | | | | | | | | 4 | ow | | | | | |
| 19 | granule | 0.05 | pe | | | 8 | cv | | | 12 | | bal. | of | 23 | oc | 0.3 | os | |
|  |  |  |  | | | | | | | 2 | | oo | 0.05 | or | 10 | ot | | |
| 20 | liquid | 0.05 | pr | | | | | 7 | ct | balance | | | | | | | | |
| 21 | substrate | 0.07 | pB | 7 | ci | | | | | balance | | 0.05 | or | | | | | |
| 22 | substrate | 0.08 | pm | | | 5 | cj | | | 10 | | 85 | oc | | | | | |
|  |  |  |  | | | | | | | | | 8 | ov | | | | | |
| 23 | liquid | 0.10 | pE | 4 | ca | | | | | balance | | 2 | ov | | | | | |
|  |  |  |  | 2 | ce | | | | | | | | | | | | | |
| 24 | granule | 0.10 | pb | | | 6 | ce | | | 4 | | 10 | oe | 1 | om | 6 | ob | |
|  |  |  |  | | | | | | | 1 | | ol | bal. | oh | 0.5 | op | | |
| 25 | bar | 0.06 | pq | | | 8 | cq | | | 5 | | 25 | of | 20 | og | | | |
|  |  | 0.04 | pu | | | | | | | 5 | | oj | bal. | oh | | | | |
| 26 | substrate | 0.20 | ps | 2 | cb | | | | | balance | | 0.05 | or | | | | | |
|  |  |  |  | 2 | cf | | | | | | | | | | | | | |
| 27 | liquid | 0.30 | pi | | | 5 | cr | | | 0 | | bal. | oc | 0.2 | oq | | | |
|  |  |  |  | | | | | | | 8 | | ov | | | | | | |
| 28 | liquid | 0.40 | pz | | | | | 2 | cs | balance | | 0.1 | or | | | | | |
| 29 | liquid | 0.25 | pd | 1 | cd | | | | | balance | | 1 | ov | | | | | |
|  |  | 0.25 | pv | 2 | cg | | | | | | | 3 | ow | | | | | |
| 30 | granule | 0.50 | pj | | | 3 | cm | | | 9 | | 4 | od | 0.1 | on | 12 | ou | |

TABLE V-continued

| | | | Weight Percent | | | | |
|---|---|---|---|---|---|---|---|
| Composition No. | Prod Product Form | Photo-Activator | Cationic Substance | | | Water | Other Components |
| | | | Softener | Surfactant | Germicide | | |
| | | | | | | 0.02 or 0.5 os bal. oa |

Photoactivators
pa Tetra(sulfobenzo)tetraaza porphine zinc, tetrasodium salt
pb α, β, γ, δ - tetrakis (4-carboxyphenyl) porphine, tetrasodium salt
pc α, β, γ, δ - tetrakis (4-carboxyphenyl) porphine zinc, tetrasodium salt
pd α, β, γ, δ - tetrakis (4-N-methylpyridyl) porphine zinc, tetra (4-toluene sulfonate) salt
pe Tetra (2-sulfatoethyl sulfonamido benzo) tetraaza porphine zinc, tetrasodium salt
pf Tetrasulfobenzo triaza porphine, tetrasodium salt
pg Tetra (4-sulfophenyl) porphine, tetraammonium salt
ph Tetra (4-sulfophenyl) porphine zinc, tetrasodium salt
pi Trans-dichloro, tri (sulfobenzo)-monobenzo-tetraaza porphine tin (IV), tri potassium salt
pj tetrabenzo - α, β, γ, δ - tetrakis (4-N-methyl) pyridyl porphine tetraiodide
pk tetrakis (carboxybenzo) porphine zinc, tetrasodium salt
pl tetrakis (polyethoxy naphtho) - α, β, γ, δ - tetraphenyl porphine cadmium tetra-ammonium salt
pm 1, 3, 5, 7 - tetrakis (sulfato polyethoxy phenyl) - α, β, γ, δ - tetrakis (carboxy naphthyl) porphine, octapotassium salt
pn 1, 2, 3, 4 - tetrakis (phosphato phenyl) - α, β, γ, δ - tetraphenyl porphine, tetra(triethanolamine) salt
po dinaphtho - α, β, γ, δ - tetrakis (phosphatobenzo) porphine magnesium, tetralithium salt
pp 1, 3, 5, 7 - tetrakis (polyethoxy phenyl) - α, γ - di (polyethoxy phenyl) porphine
pq mono (polyethoxy benzo) - tribenzo - α, β, γ, δ - tetraphenyl porphine
pr Bromo, tetrabenzo - α - (4-N-methyl) pyridyl - β, γ, δ - pyridyl porphine scandium monobromide
ps 2, 4, 6, 8 - tetrakis (sulfophenyl-n-heptyl) tetraaza porphine, tetra (monoethanolamine) salt
pt tetrakis - (2-sulfatoethyl aminosulfonylbenzo) - tetraaza porphine zinc, tetrasodium salt
pu Trans dichloro, di (N-methyl pyrido) - α, β, γ, δ - tetrakis (carboxyphenyl) porphine tin (IV), tetrasodium salt
pv 1, 3, 5 - tri (4-polyethoxy) - α, β, γ - tri-(4-polyethoxy) -δ- aza - porphine
pw 2, 4, 6, 8 - tetrakis (carboxy methoxy) - α, β, γ, δ - tetraaza porphine, tetra(diethanolamine) salt
px tri (diphosphatobeno) - α -(phosphatomethylbenzyl)-β, γ, δ-triaaza porphine, tetrasodium salt
py tetra (carboxybenzo)-α, γ-di(carboxybenzo)-β, δ-diaza porphine zinc, hexasodium salt
pz trisulfobenzo-meso-tetraphenyl porphine, trisodium salt
pA tetrasulfpyrido-meso-tetraphenyl porphine zinc, tetrapotassium salt
pB tetrasulfonaphtho monoaza porphine, tetrasodium salt
pC benzotrisulfobenzo monoaza porphine magnesium, trisodium salt
pD benzotrisulfobenzo diaza porphine, trilithium salt
pE tetrasulfobenzo diaza porphine scandium, tetradiethanolamine salt
pF 1,2,3,4,5,6,7,8-octasulfophenyl porphine, octasodium salt
pG trans-dichloro, trisulfobenzo-tri(sulfo-2-pyridyl)-2-pyridyl porphine tin (IV), hexasodium salt
pH α, β, γ, δ-tetrakis (2-furyl, 5 sulfo) porphine zinc, tetrasodium salt
pI tetrasulfonaphtho-meso-tetraethyl porphine, tetrapotassium salt
pJ meso-sulfopyrryl-meso-trisulfophenyl porphine, tetrasodium salt Cationic Substances
ca tallow trimethyl ammonium chloride
cb ditallowdimethyl ammonium methyl sulfate
cc di(coconut alkyl) dimethyl ammonium chloride
cd ditallow dimethyl ammonium chloride
ce 1-methyl-1-[(stearoylamide)ethyl]-2-heptadecyl-4,5-dihydroimidazolinium methyl sulfate
df 1-methyl-1-[(palmitoylamide)ethyl]-2-octadecyl-4,5-dihydroimidoazolinium chloride
cg TAFLON-320A
ch $C_{14}$ pyridinium chloride
ci N-dodecyl-N-methyl morpholinium methylsulfate
cj trioctyl methyl ammonium chloride
ck coconut alkyl trimethyl ammonium chloride
cl N-octyl picolinium toluene sulfonatecm cetyl methyl piperidinium
cn myristyl quinolinium bromide
cc stearoyl choline ester quaternary ammonium bromide cp $C_{14}H_{29}-(CH_2CH_2O)_7-CH_2-\overset{O}{\overset{\|}{C}}-O-CH_2CH_2-N^{\oplus}-(CH_3)_3-Cl^{\ominus}$ cq $Br^{\ominus}\quad (CH_3)_3-N^{\oplus}-(CH_2)_2-O-\overset{O}{\overset{\|}{C}}-(CH_2)_{12}-\overset{O}{\overset{\|}{C}}-O-(CH_2)_2-N^{\oplus}-(CH_3)_3\quad Br^{\ominus}$ cr $C_{20}H_{41}-O(CH_2CH_2CH_2CH_2O)_3-\overset{O}{\overset{\|}{C}}-O-CH_2CH_2-N^{\oplus}-(CH_3)_3\quad I^{\ominus}$ cs octadecyl dimethyl dichlorobenzyl ammonium chloride
ct para-tetiaryoctylphenoxyethoxyethyldimethyl benzyl ammonium chloride
cu 2-phenyl-3-p-sulfamido-phenyl-5-undecyltetrazolium chloride cv $C_{16}H_{33}-NH-\overset{O}{\overset{\|}{C}}-(CH_2)_4-\overset{O}{\overset{\|}{C}}-NH-CH_2-N^{\oplus(C_2H_5)_3}\quad Cl^{\ominus}$ Other Components
oa $C_{15}$ alkyl polyethoxylate containing an average of of 4 moles ethylene oxide per mole
ob alkyl glyeryl ether having the formula $C_{12}H_{25}-OCH_2-CHOH-CH_2OH$
oc Nonyl phenol polyethoxylate containing an average of 15 moles ethylene oxide per mole
od sodium tripolyphosphate
oe sodium pyrophosphate
of sodium nitrilotriacetate
og sodium carbonate
oh sodium sulfate
oi monoethanolamine
oj sodium silicate solids, 2.4 ratio $SiO_2/Na_2O$
ok sodium aluminosilicate $Na_{12}(AlO_2 \cdot SiO_2)_{12} \cdot 27H_2O$
ol ethane-1-hydroxy-1,1-diphosphonate, sodium salt
om polyethylene glycol, molecular weight 6000
on perfume
oo potassium toluene sulfonate
op sodium carboxymethylcellulose
oq optical brightener (fluorescer)
or colorant
os protease
ot montmorrilonite clay
ou sodium perborate
ov ethanol
ow urea

What is claimed is:
1. A bleach composition consisting essentially of:
(a) from about 0.5% to about 50% by weight of the composition of a cationic substance;
(b) from 0.001% to 0.5% by weight of the composition of a water soluble photoactivator having the formula

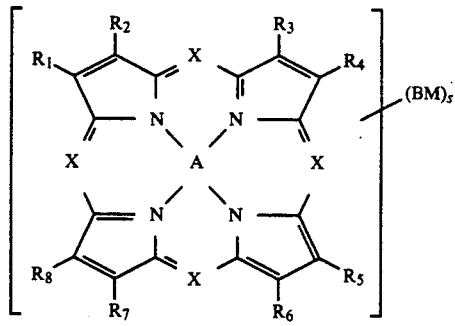

wherein each X is (=N—) or (=CY—), and the total number of (=N—) groups is 0, 1, 2, 3 or 4; wherein each Y, independently, is hydrogen or meso substituted alkyl, cycloalkyl, aralkyl, aryl, alkaryl or heteroaryl; wherein each R, independently, is hydrogen or pyrrole substituted alkyl, cycloalkyl, aralkyl, aryl, alkaryl or heteroraryl, or wherein adjacent pairs of R's are joined together with ortho-arylene groups to form pyrrole substituted alicyclic or heterocyclic rings; wherein A is 2(H) atoms bonded to diagonally opposite nitrogen atoms, or Zn(II), Cd(II), Mg(II), Sc(III), or Sn(IV); wherein B is an anionic, nonionic or cationic solubilizing group substituted into Y or R; wherein M is a counterion to the solubilizing groups; and wherein s is the number of solubilizing groups; and
(c) balance selected from the group consisting of water, alcohols, glycols and glycol ethers, hydrotropes, clay, substrate, nonionic surfactants used in ratio to cationic substance between about 5:3 and about 200:1, insoluble aluminosilicate builder, and alkanolamine.

2. A bleach composition consisting essentially of:
(a) from about 0.5% to about 50% by weight of the composition of a cationic substance;
(b) from 0.001% to 0.5% by weight of the composition of a water soluble photoactivator having the formula

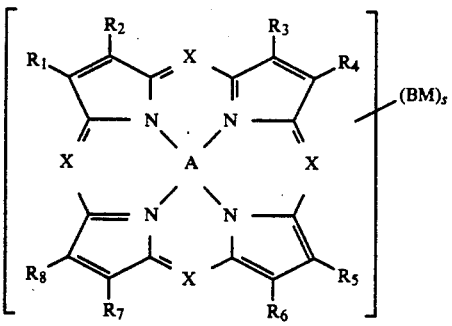

wherein each X is (=N—) or (=CY—), and the total number of (=N—) groups is 0, 1, 2, 3; wherein each Y, independently, is hydrogen or meso substituted alkyl, cycloalkyl, aralkyl, aryl, alkaryl or heteroaryl; wherein each R, independently, is hydrogen or pyrrole substituted alkyl, cycloalkyl, aralkyl, aryl, alkaryl or heteroraryl, or wherein adjacent pairs of R's are joined together with ortho-arylene groups to form pyrrole substituted alicyclic or heterocyclic rings; wherein A is 2(H) atoms bonded to diagonally opposite nitrogen atoms, or Zn(II), Ca(II), Cd(II), Mg(II), Sc(III), Al(III) or Sn(IV); wherein B is an anionic, nonionic or cationic solubilizing group substituted into Y or R; wherein M is a counterion to the solubilizing groups; and wherein s is the number of solubilizing groups (c) balance selected from the group consisting of water, alcohols, glycols and glycol ethers, hydrotropes, clay, substrate, nonionic surfactants used in ratio to cationic substance between about 5:3 and about 200:1, insoluble aluminosilicate builder, and alkanolamine.

3. The composition of claims 1 or 2 wherein, when B is cationic, M is an anion and s is from 1 to about 8; when B is nonionic, B is polyethoxylate, M is zero, s is from 1 to about 8, and the number of condensed ethylene oxide molecules per porphine molecule is from about 8 to about 50; when B is anionic and proximate, M is cationic and s is from 3 to about 8; when B is anionic and remote, M is cationic and s is from 2 to about 8; and when B is sulfonate the number of sulfonate groups is no greater than the number of aromatic and heteracylic substitutent groups.

4. The composition of claim 3 wherein B is quaternary pyridinium, quaternary ammonium, polyethoxylate, carboxylate, polyethoxy carboxylate, sulfate, polyethoxy sulfate, phosphate, polyethoxy sulfonate, or mixtures thereof.

5. The composition of claims 1 or 2 wherein the cationic substance comprises from about 0.5% to about 50% by weight of the composition, and the ratio of cationic substances to photoactivator is from about 1/1 to about 50,000/1.

6. The composition of claim 5 wherein the photoactivator comprises from 0.005% to about 0.1% by weight of the composition, the cationic substance comprises from about 2% to about 30% by weight of the composition, and the ratio of cationic substance to photoactivator is from about 20/1 to about 5,000/1.

7. The composition of claim 1 or 2 wherein the cationic substance is

 (1)

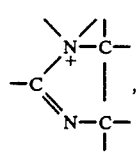 (2)

 (3)

 (4)

-continued

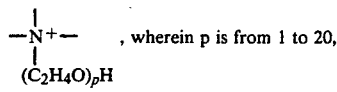 , wherein p is from 1 to 20,

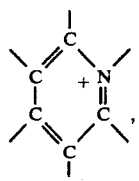 (6)

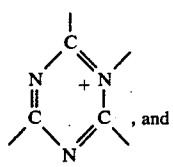 , and (7)

(8) mixtures thereof,

L is a number from 1 to 10, Z is an anion in a number to give electrical neutrality.

8. The composition of claim 7 wherein, in the cationic substance, L is equal to 1 and Y is

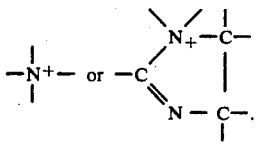

9. The composition of claim 8 wherein, in the cationic substance, m is equal to 1, X is equal to 3, $R^1$ is $C_{10}$–$C_{20}$ alkyl, and $R^2$ is methyl.

10. The composition of claim 8 wherein, in the cationic substance, m is equal to 2, X is equal to 2, $R^1$ is $C_{10}$–$C_{20}$ alkyl, and $R^2$ is methyl.

11. The composition of claim 8 wherein, in the cationic substance, m is equal to 3, X is equal to 1, $R^1$ is $C_8$–$C_{11}$ alkyl, and $R^2$ is methyl.

12. The composition of claim 1 and 2 wherein the cationic substance is selected from the group consisting of (a) quaternary ammonium salts having the following structure

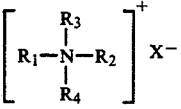

where $R_1$ has from about 9 to about 26 carbon atoms and is a hydrophobic group which is alkyl, aryl, alkaryl, aralkyl or alkyl heterocyclic; saturated or unsaturated; the alkyl chain of which is straight or branched; unsubstituted or substituted with halogen, hydroxy, amino, ester, or ether groups; where $R_2$, $R_3$ and $R_4$ each have from 1 to about 9 carbon atoms, and are the same or different, and have combined a total of from 3 to about 15 carbon atoms in groups which are alkyl, aryl, alkaryl, aralkyl or heterocyclic; saturated or unsaturated; the alkyl chains of which are straight or branched; unsubstituted or substituted with halogen, hydroxy, nitro, amino, sulfonamide, ester or ether groups; and where X is an anionic solubilizing group;

(b) Quaternary salts having the structure

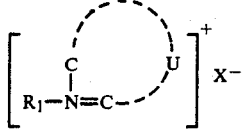

where $R_1$ and X are the same as defined immediately hereinbefore in paragraph (a) and U is an unsaturated heterocyclic group, unsubstituted or substituted with a short chain alkyl group;

(c) Quaternary salts having the structure

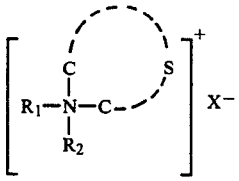

where R, $R_2$ and X are the same as defined hereinbefore in paragraph (a); and S is a saturated heterocyclic group, unsubstituted or substituted with a short chain alkyl group; and (d) polyamido quaternized biurets

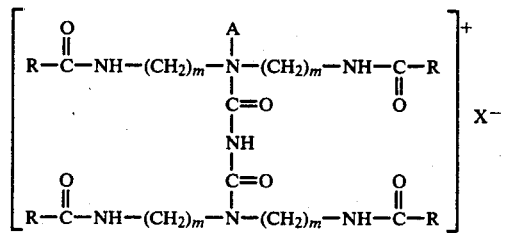

wherein R is an aliphatic hydrocarbyl group (saturated or unsaturated), a substituted aliphatic hydrocarbyl group, or an alkoxylated aliphatic hydrocarbyl group having from about 10 to 30 carbon atoms; A is a vicinal dihydroxy alkyl group containing at least 3 carbon atoms, m is 1 to about 8, and X is an anion selected from the halogen, acetate, phosphate, nitrate and methylsulfate radicals.

13. The composition of claim 12 wherein the cationic substance has the structure

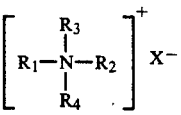

where $R_1$ has from about 12 to about 20 carbon atoms and is straight chained; where $R_2$ and $R_3$ are, independently, methyl or ethyl; where $R_4$ is methyl, ethyl, benzyl or chlorobenzyl; and where X is an organic or inorganic anion.

14. The composition of claim 12 wherein the cationic substance has the structure

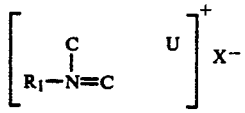

R₁ has from about 10 to about 20 carbon atoms and is straight chained and where the heterocyclic group is pyridine, picoline, quioline, quinalidine, thioazole, pyrrole, imidazole, pyrazole, oxacole, pyrazine, pyridiazine, or pyrimidine.

15. The composition of claim 12 wherein the cationic substance has the structure

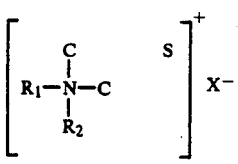

R₁ has from about 10 to about 20 carbon atoms and is straight chained and where the heterocyclic group is piperidine, piperazine, pyrrolidine, indoline, imidazolidine, pyrazolidine, or morpholine.

16. The composition of claim 12 wherein the cationic substance has the structure

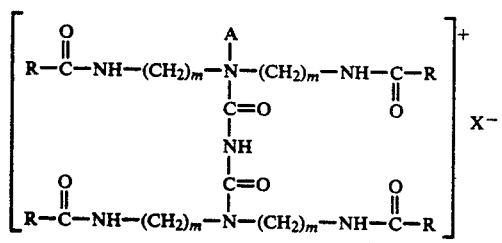

where R has from about 12 to about 22 carbon atoms, A has from 3 to about 8 carbon atoms, and m is 2 or 3.

17. The composition of claim 7 additionally containing a nonionic surfactant comprising an alkyl polyethoxylate having the formula $R(OCH_2CH_2)_nOH$ where R is a primary or secondary alkyl chain having from about 8 to about 22 carbon atoms, and the average value of n is from about 2 to about 9, said nonionic surfactant having an HLB from about 5 to about 17.

18. The composition of claim 4 wherein the cationic substance is

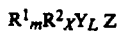

wherein each $R^1$ is an organic group containing a straight or branched alkyl or alkenyl group optionally substituted with up to 3 phenyl groups and optionally interrupted by up to 4 structures selected from the group consisting of

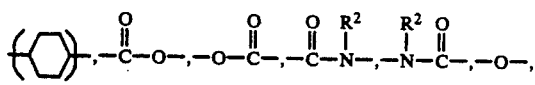

and mixtures thereof, and which contains from about 8 to 22 carbon atoms, and which may additionally contain up to 20 ethoxy groups, m is a number from one to three, no more than one $R^1$ in a molecule can have more than 12 carbon atoms when m is 3, each $R^2$ is an alkyl or hydroxyalkyl group containing from 1 to 4 carbon atoms or a benzyl group with no more than one $R^2$ in a molecule being benzyl, x is a number from 0 to 3, the remainder of any carbon or nitrogen atom positions being filled by hydrogens, Y is selected from the group consisting of

(1)

(2)

(3)

(4)

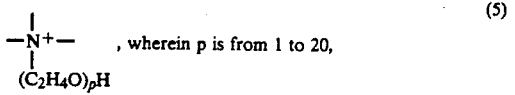
, wherein p is from 1 to 20,
(5)

(6)

, and
(7)

(8) mixtures thereof,

L is a number of 1 to 10, Z is an anion in a number to give electrical neutrality.

19. The composition of claim 18 wherein, in the cationic substance, L is equal to 1 and Y is

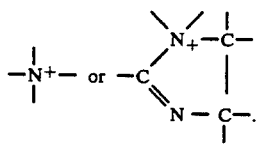

20. The composition of claim 4 wherein the cationic substance is selected from the group consisting of
(a) quaternary ammonium salts having the following structure

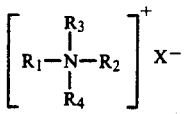

where $R_1$ has from about 9 to about 26 carbon atoms and is a hydrophobic group which is alkyl, aryl, alkaryl, aralkyl or alkyl heterocyclic; saturated or unsaturated; the alkyl chain of which is straight or branched; unsubstituted or substituted with halogen, hydroxy, amino, ester, or ether groups; where $R_2$, $R_3$ and $R_4$ each have from 1 to about 9 carbon atoms, and are the same or different, and have combined a total of from 3 to about 15 carbon atoms in groups which are alkyl, aryl, alkaryl, aralkyl or heterocyclic; saturated or unsaturated; the alkyl chains of which are straight or branched; unsubstituted or substituted with halogen, hydroxy, nitro, amino, sulfonamide, ester or ether groups; and where X is an anionic solubilizing group;

(b) Quaternary salts having the structure

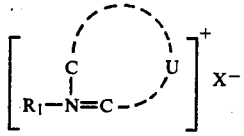

where $R_1$ and X are the same as defined immediately hereinbefore in paragraph (a) and U is an unsaturated heterocyclic group, unsubstituted or substituted with a short chain alkyl group;

(c) Quaternary salts having the structure

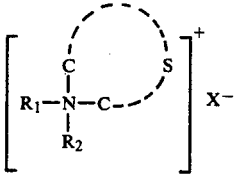

where R, $R_2$ and X are the same as defined hereinbefore in paragraph (a); and S is a saturated heterocyclic group, unsubstituted or substituted with a short chain alkyl group; and (d) polyamido quaternized biurets

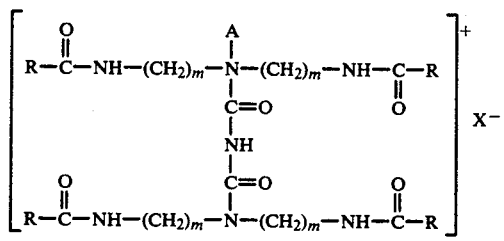

wherein R is an aliphatic hydrocarbyl group (saturated or unsaturated), a substituted aliphatic hydrocarbyl group, or an alkoxylated aliphatic hydrocarbyl group having from about 10 to 30 carbon atoms; A is a vicinal dihydroxy alkyl group containing at least 3 carbon atoms, m is 1 to about 8, and X is an anion selected from the halogen, acetate, phosphate, nitrate and methylsulfate radicals.

21. The composition of claim 20 wherein the cationic substance has the structure

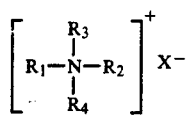

where $R_1$ has from about 12 to about 20 carbon atoms and is straight chained; where $R_2$ and $R_3$ are, independently, methyl or ethyl; where $R_4$ is methyl, ethyl, benzyl or chlorobenzyl; and where X is halide, nitrate, sulfate, hydroxide, methyl sulfate, toluene sulfonate, and carbonate, phosphate, acetate, propionate, benzoate tartrate, citrate, and salicylate.

22. The composition of claim 20 wherein the cationic substance has the structure

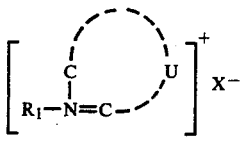

$R_1$ has from about 10 to about 20 carbon atoms and is straight chained and where the heterocyclic group is pyridine, picoline, quinoline, quinaldine, thiozole, pyrrole, imidazole, pyrazole, oxaxole, pyrazine pyridiazine, or pyrimidine.

23. The composition of claim 20 wherein the cationic substance has the structure

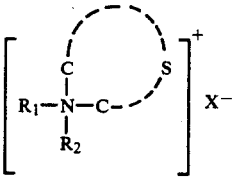

$R_1$ has from about 10 to about 20 carbon atoms and is straight chained and where the heterocyclic group is pyridine, piperazine, pyrrolidine, indoline, imidazolidine, pyrazolidine, or morpholine.

24. The composition of claim 20 wherein the cationic substance has the structure

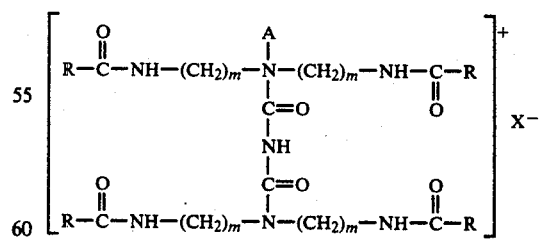

where R has from about 12 to about 22 carbon atoms, A has from 3 to about 8 carbon atoms, and m is 2 or 3.

25. The composition according to any of claims 1 or 2 wherein B is imidazolinium or quaternary ammonium.

26. The composition according to any of claims 1 or 2 wherein B is polyethoxylate.

27. The composition according to any of claims 1 or 2 wherein B is carboxylate, polyethoxycarboxylate, sulfate, polyethoxysulfate, phosphate, sulfonate, or mixtures thereof.

28. The composition according to any of claims 1 or 2 wherein the photoactivator is zinc phthaloxyanine sulfonate, tri- or tetra-sulfonate salt.

29. The composition according to any of claims 1 or 2 wherein the composition is incorported into substrate articles.

30. A process for removing stains from textiles which comprises treating the textiles, in the presence of visible light and oxygen, with an aqueous solution of the bleach composition of any of claims 1 or 2.

31. The composition according to any of claims 1 or 2 wherein the composition is incorporated into substrate articles and wherein the photoactivator is zinc phthalocyanine sulfonate, tri- or tetra-sulfonate salt.

32. The composition according to claim 18 wherein B is imidazolinium or quaternary ammonium.

33. The composition according to claim 20 wherein B is imidazolinium or quaternary ammonium.

34. The composition according to claim 18 wherein B is polyethoxylate.

35. The composition according to claim 20 wherein B is polyethoxylate.

36. The composition according to claim 18 wherein B is carboxylate, polyethoxycarboxylate, sulfate, polyethoxysulfate, phosphate, sulfonate, or mixtures thereof.

37. The composition according to claim 20 wherein B is carboxylate, polyethoxycarboxylate, sulfate, polyethoxysulfate, phosphate, sulfonate, or mixtures thereof.

38. The composition according to claim 18 wherein the photoactivator is zinc phthalocyanine sulfonate, tri- or tetra-sulfonate salt.

39. The composition according to claim 20 wherein the photoactivator is zinc phthalocyanine sulfonate, tri- or tetra-sulfonate salt.

40. The composition according to claim 18 wherein the composition is incorporated into substrate articles.

41. The composition according to claim 20 wherein the composition is incorporated into substrate articles.

42. A process for removing stains from textiles which comprises treating the textiles, in the presence of visible light and oxygen, with an aqueous solution of the bleach composition of claim 18.

43. A process for removing stains from textiles which comprises treating the textiles, in the presence of visible light and oxygen, with an aqueous solution of the bleach composition of claim 20.

44. The composition according to claim 18 wherein the composition is incorporated into substrate articles and wherein the photoactivator is zinc phthalocyanine sulfonate, tri- or tetra-sulfonate salt.

45. The composition according to claim 20 wherein the composition is incorporated into substrate articles and wherein the photoactivator is zinc phthalocyanine sulfonate, tr- or tetra-sulfonate salt.

* * * * *